United States Patent
Kuraoka et al.

(10) Patent No.: US 7,203,153 B2
(45) Date of Patent: Apr. 10, 2007

(54) RECORDING MEDIUM, RECORDING DEVICE, REPRODUCTION DEVICE, RECORDING METHOD AND REPRODUCTION METHOD

(75) Inventors: Tomotaka Kuraoka, Tokyo (JP); Shoei Kobayashi, Kanagawa (JP); Mitsutoshi Terada, Kanagawa (JP)

(73) Assignee: Sony Corporation, Tokyo (JP)

( * ) Notice: Subject to any disclaimer, the term of this patent is extended or adjusted under 35 U.S.C. 154(b) by 331 days.

(21) Appl. No.: 10/514,067

(22) PCT Filed: Mar. 11, 2004

(86) PCT No.: PCT/JP2004/003212

§ 371 (c)(1),
(2), (4) Date: Nov. 10, 2004

(87) PCT Pub. No.: WO2004/081936

PCT Pub. Date: Sep. 23, 2004

(65) Prior Publication Data

US 2005/0169132 A1    Aug. 4, 2005

(30) Foreign Application Priority Data

Mar. 12, 2003    (JP)    ............................. 2003-066661

(51) Int. Cl.
*G11B 7/00*    (2006.01)
(52) U.S. Cl. ................................. 369/275.3; 369/53.15
(58) Field of Classification Search ............ 369/275.3, 369/44.26, 53.14, 53.15, 53.17, 53.27, 53.22
See application file for complete search history.

(56) References Cited

U.S. PATENT DOCUMENTS 4,525,839 A    6/1985  Nozawa et al.
4,984,230 A *  1/1991  Satoh et al. ............. 369/53.17
5,202,876 A    4/1993  Takagi et al.

(Continued)

FOREIGN PATENT DOCUMENTS

EP    0 532 356 A2    3/1993

(Continued)

OTHER PUBLICATIONS

Patent Abstracts of Japan, JP 2002-329321, Nov. 15, 2002, (Reference previously filed in Japanese language).

(Continued)

*Primary Examiner*—Nabil Hindi
(74) *Attorney, Agent, or Firm*—Oblon, Spivak, McClelland, Maier & Neustadt, P.C.

(57) ABSTRACT

The present invention allows the usability of a write-once recording medium to be enhanced. The write-once recording medium is provided with an ordinary recording/reproduction area, an alternate area, a first alternate-address management information area (DMA) and a second alternate-address management information area (TDMA). In addition, written/unwritten state indication information (a space bitmap) is also recorded. The second alternate-address management information area is an area allowing alternate-address management information recorded therein to be renewed by adding alternate-address management information thereto. In addition, the written/unwritten state indication information indicates whether or not data has been recorded in each data unit (cluster) on the recording medium. Thus, it is possible to correctly execute management of defects and properly implement renewal of data in the write-once recording medium.

13 Claims, 33 Drawing Sheets

U.S. PATENT DOCUMENTS

| | | |
|---|---|---|
| 5,442,614 A | 8/1995 | Tamegai |
| 5,541,903 A | 7/1996 | Funahashi et al. |

FOREIGN PATENT DOCUMENTS

| | | |
|---|---|---|
| JP | 64-46280 | 2/1989 |
| JP | 2-183472 | 7/1990 |
| JP | 9-102173 | 4/1997 |
| JP | 2001-351334 | 12/2001 |
| JP | 2002-329321 | 11/2002 |
| JP | 2002-352522 | 12/2002 |

OTHER PUBLICATIONS

Patent Abstracts of Japan, JP 09-102173, Apr. 15, 1997, (Reference previously filed in Japanese language).
Patent Abstracts of Japan, JP 02-183472, Jul. 18,1990, (Reference previously filed in Japanese language).
Patent Abstracts of Japan, JP 2001-351334, Dec. 21, 2001, (Reference previously filed in Japanese language).
Patent Abstracts of Japan, JP 2002-352522, Dec. 6, 2002, (Reference previously filed in Japanese language).

* cited by examiner

F I G. 5

| BYTE POSITION | CONTENTS | BYTE COUNT |
|---|---|---|
| 0 | DDS IDENTIFIER = "DS" | 2 |
| 2 | DDS FORMAT NUMBER | 1 |
| 3 | RESERVED (00h) | 1 |
| 4 | DDS-UPDATING COUNT (= SEQUENCE NUMBER OF LAST TDDS) | 4 |
| 8 | RESERVED (00h) | 8 |
| 16 | DRIVE-AREA START PHYSICAL SECTOR ADDRESS (AD_DRV) IN DMA | 4 |
| 20 | RESERVED (00h) | 4 |
| 24 | DEFECT-LIST START PHYSICAL SECTOR ADDRESS (AD_DFL) IN DMA | 4 |
| 28 | RESERVED (00h) | 4 |
| 32 | START PHYSICAL SECTOR ADDRESS OF USER-DATA AREA | 4 |
| 36 | END LOGICAL SECTOR ADDRESS OF USER-DATA AREA | 4 |
| 40 | SIZE OF FIRST LAYER ALTERNATE AREA (ISA 0) ON INNER-SIDE CIRCUMFERENCE | 4 |
| 44 | SIZE OF ALTERNATE AREA (OSA 0 OR OSA 1) ON OUTER-SIDE CIRCUMFERENCE | 4 |
| 48 | SIZE OF SECOND LAYER ALTERNATE AREA (ISA 1) ON INNER-SIDE CIRCUMFERENCE | 4 |
| 52 | SPARE AREA FULL FLAGS | 1 |
| 53 | RESERVED (00h) | 65483 |

1 SECTOR (65536 BYTES)

FIG. 7

| CLUSTER NUMBER | CONTENTS | BYTE COUNT |
|---|---|---|
| 0 | DFL INDENTIFIER NUMBER = "DF" | 2 |
| 2 | DFL FORMAT NUMBER | 1 |
| 3 | RESERVED 00h | 1 |
| 4 | DFL-UPDATING COUNT | 4 |
| 8 | RESERVED 00h | 4 |
| 12 | NUMBER OF CATALOGED DFL ENTRIES (N_DFL) | 4 |
| 16 | RESERVED 00h | 8 |
| 24 | CLUSTER COUNT INDICATING SIZE OF ISA/OSA FREE AREA | 4 |
| 28 | RESERVED 00h | 36 |

64 BYTES

[STATUS 1]
0000: NORMAL ALTERNATE
0101: BURST-TRANSFER START ADDRESS
1010: BURST-TRANFER END ADRESS
VALUES OTHER THAN THE ABOVE VALUES ARE RESERVED.

FIG. 9

| CLUSTER NUMBER | CONTENTS | CLUSTER COUNT |
|---|---|---|
| 1 | SPACE BITMAP FOR LAYER 0 | 1 |
| 2 | SPACE BITMAP FOR LAYER 1 | 1 |
| 3 | TDFL (TEMPORARY DEFECT LIST) | 1-4 |
| ... | | |
| 2048 | | |

2048 CLUSTERS

FIG. 11

| BYTE POSITION | CONTENTS | BYTE COUNT |
|---|---|---|
| 0 | DEFECT-LIST MANAGEMENT INFORMATION | 64 |
| 64 | ALTERNATE-ADDRESS INFORMATION ati #1 | 8 |
| 72 | ALTERNATE-ADDRESS INFORMATION ati #2 | 8 |
| ... | ... | ... |
| | ALTERNATE-ADDRESS INFORMATION ati #N | 8 |
| 64 + 8 × N | ALTERNATE-ADDRESS INFORMATION TERMINATOR | 8 |
| | 00h | |
| 65536 × N − 2048 | TEMPORARY DDS (TDDS) | 2048 |

1 TO 4 CLUSTERS

FIG. 12

| BYTE POSITION | CONTENTS | BYTE COUNT |
|---|---|---|
| 0 | DDS IDENTIFIER = "DS" | 2 |
| 2 | DDS FORMAT NUMBER | 1 |
| 3 | RESERVED (00h) | 1 |
| 4 | TDDS SEQUENCE NUMBER | 4 |
| 8 | RESERVED (00h) | 8 |
| 16 | DRIVE-AREA START PHYSICAL SECTOR ADDRESS (AD_DRV) IN TDMA | 4 |
| 20 | RESERVED (00h) | 4 |
| 24 | DEFECT-LIST START PHYSICAL SECTOR ADDRESS (AD_DFL) IN TDMA | 4 |
| 28 | RESERVED (00h) | 4 |
| 32 | START PHYSICAL SECTOR ADDRESS OF USER-DATA AREA | 4 |
| 36 | END LOGICAL SECTOR ADDRESS OF USER-DATA AREA | 4 |
| 40 | SIZE OF FIRST LAYER ALTERNATE AREA (ISA 0) ON INNER-SIDE CIRCUMFERENCE | 4 |
| 44 | SIZE OF ALTERNATE AREA (OSA 0 OR OSA 1) ON OUTER-SIDE CIRCUMFERENCE | 4 |
| 48 | SIZE OF SECOND LAYER ALTERNATE AREA (ISA 1) ON INNER-SIDE CIRCUMFERENCE | 4 |
| 52 | SPARE AREA FULL FLAGS | 1 |
| 53 | RESERVED (00h) | 971 |
| 1024 | PHYSICAL SECTOR ADDRESS (LRA) OF LAST RECORDING OF USER DATA | 4 |
| 1028 | START PHYSICAL SECTOR ADDRESS (AD_BP0) OF MOST RECENT SPACE BITMAP FOR FIRST LAYER IN TDMA | 4 |
| 1032 | START PHYSICAL SECTOR ADDRESS (AD_BP1) OF MOST RECENT SPACE BITMAP FOR SECOND LAYER IN TDMA | 4 |
| 1036 | FLAG INDICATING WHETHER AN OVERWRITE FUNCTION IS USABLE (1:OVERWRITE FUNCTION IS USABLE) | 1 |
| 1037 | RESERVED (00h) | 1011 |

1 SECTOR (2048 BYTES)

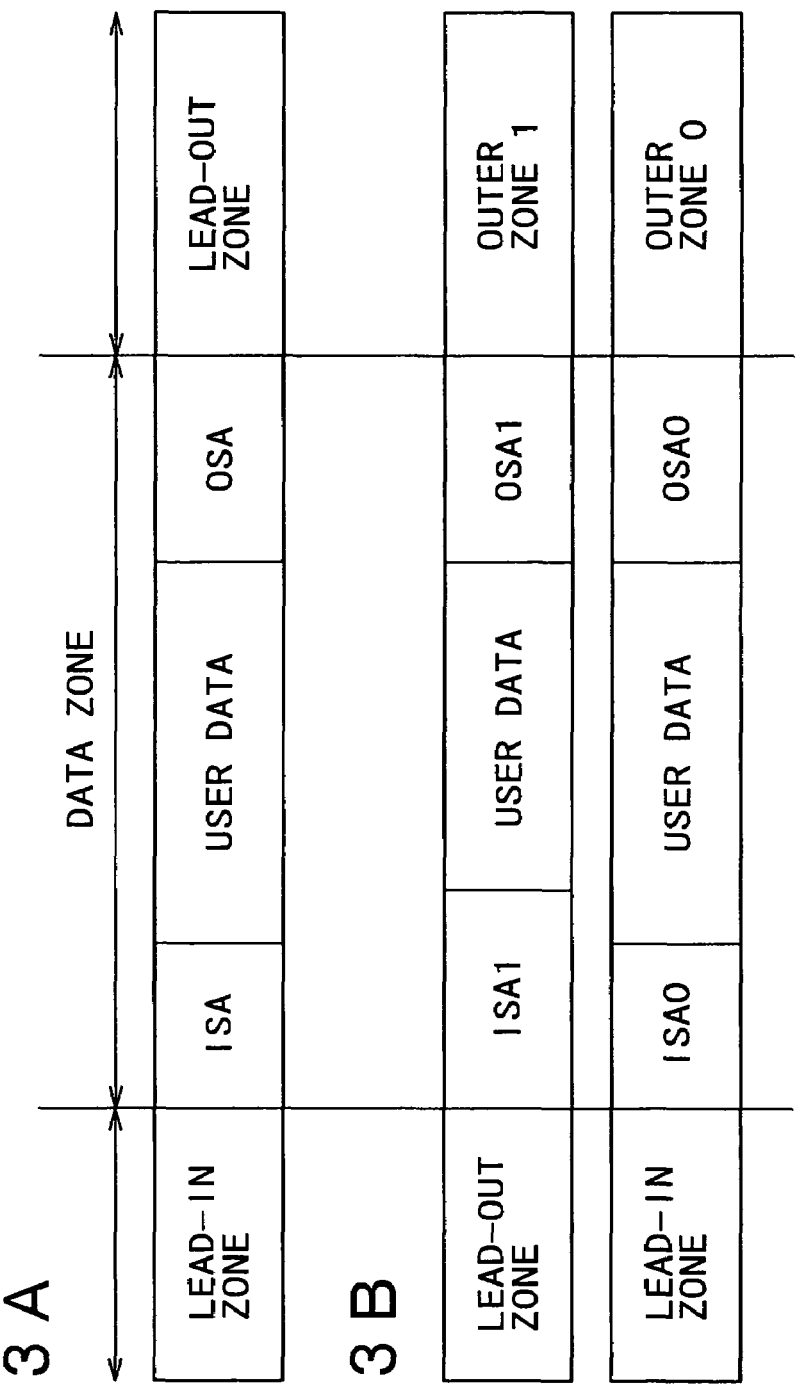

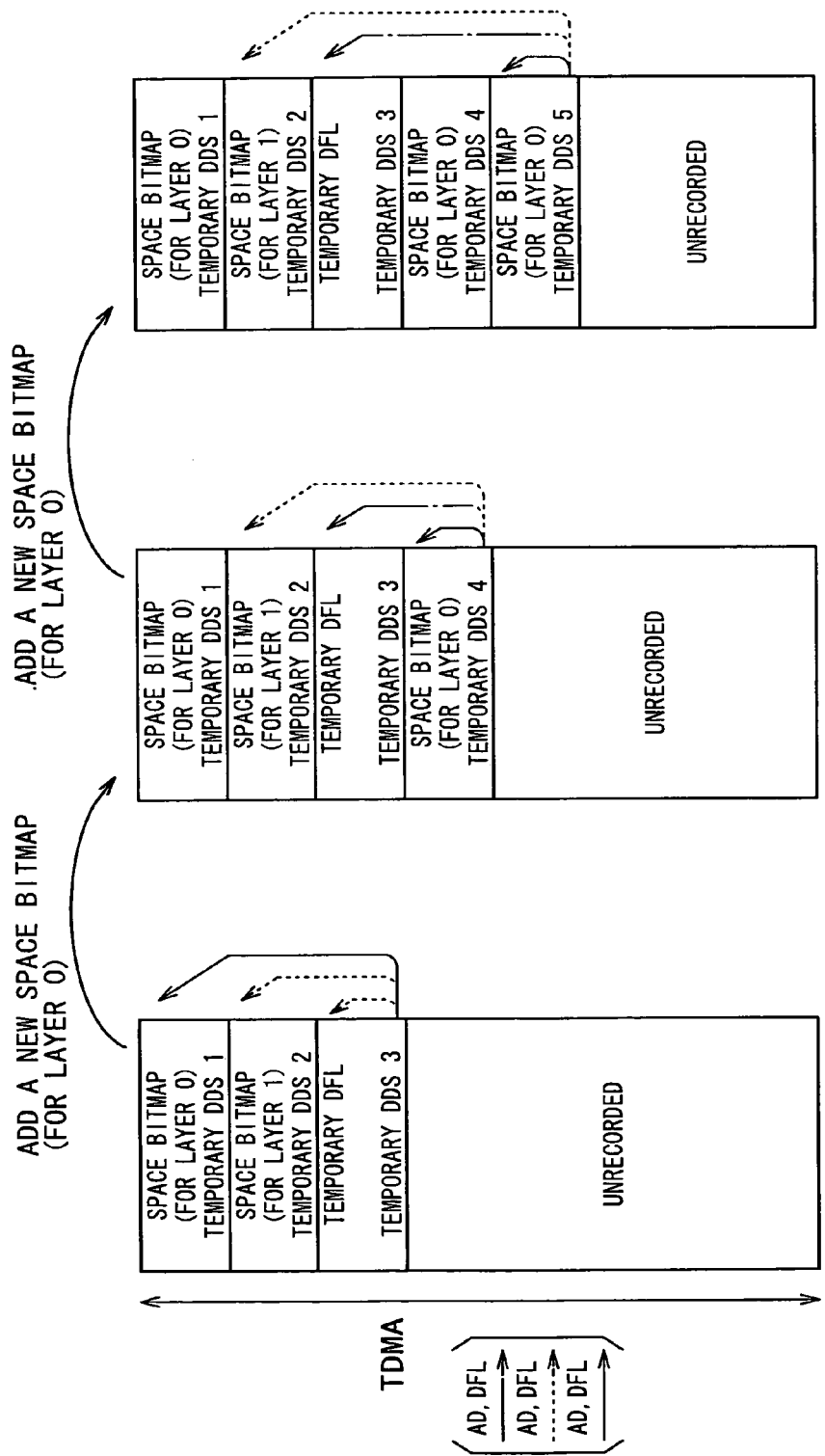

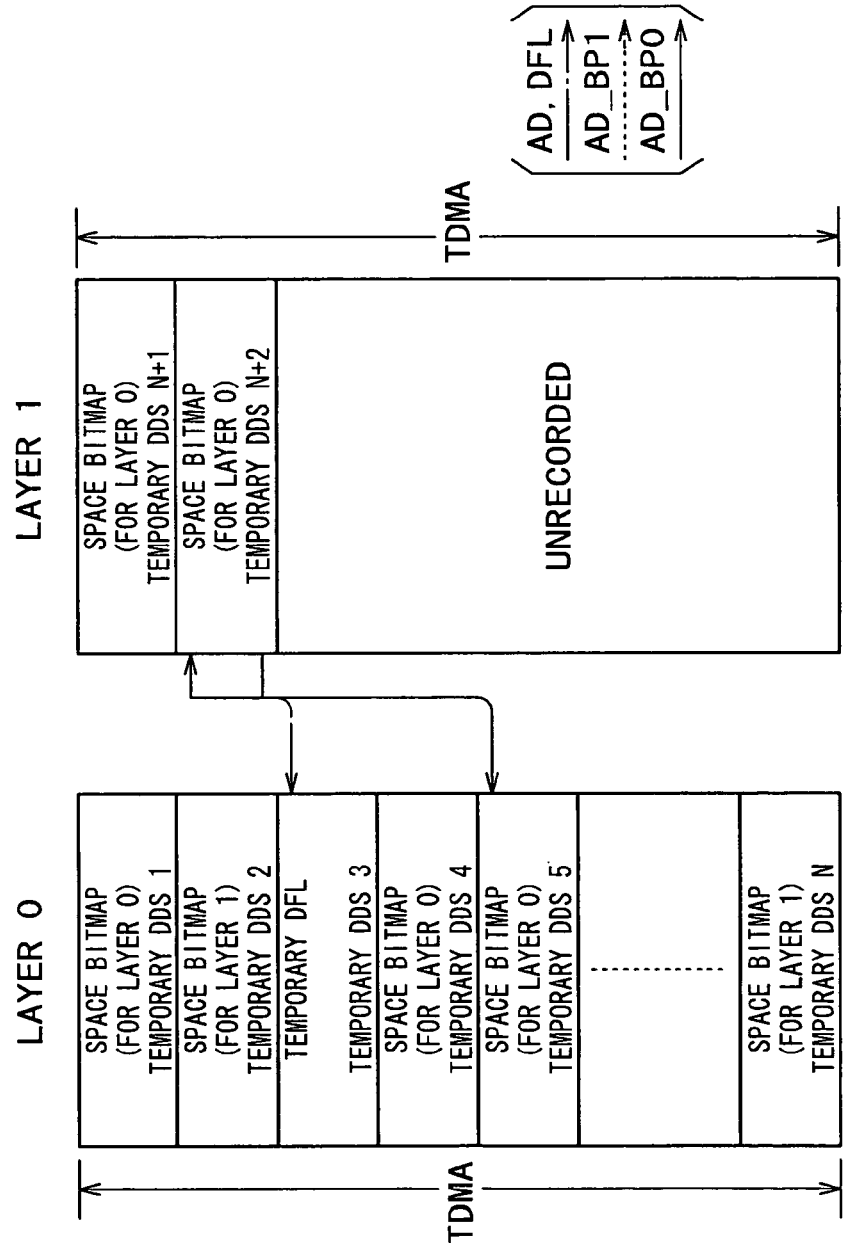

F I G. 2 2
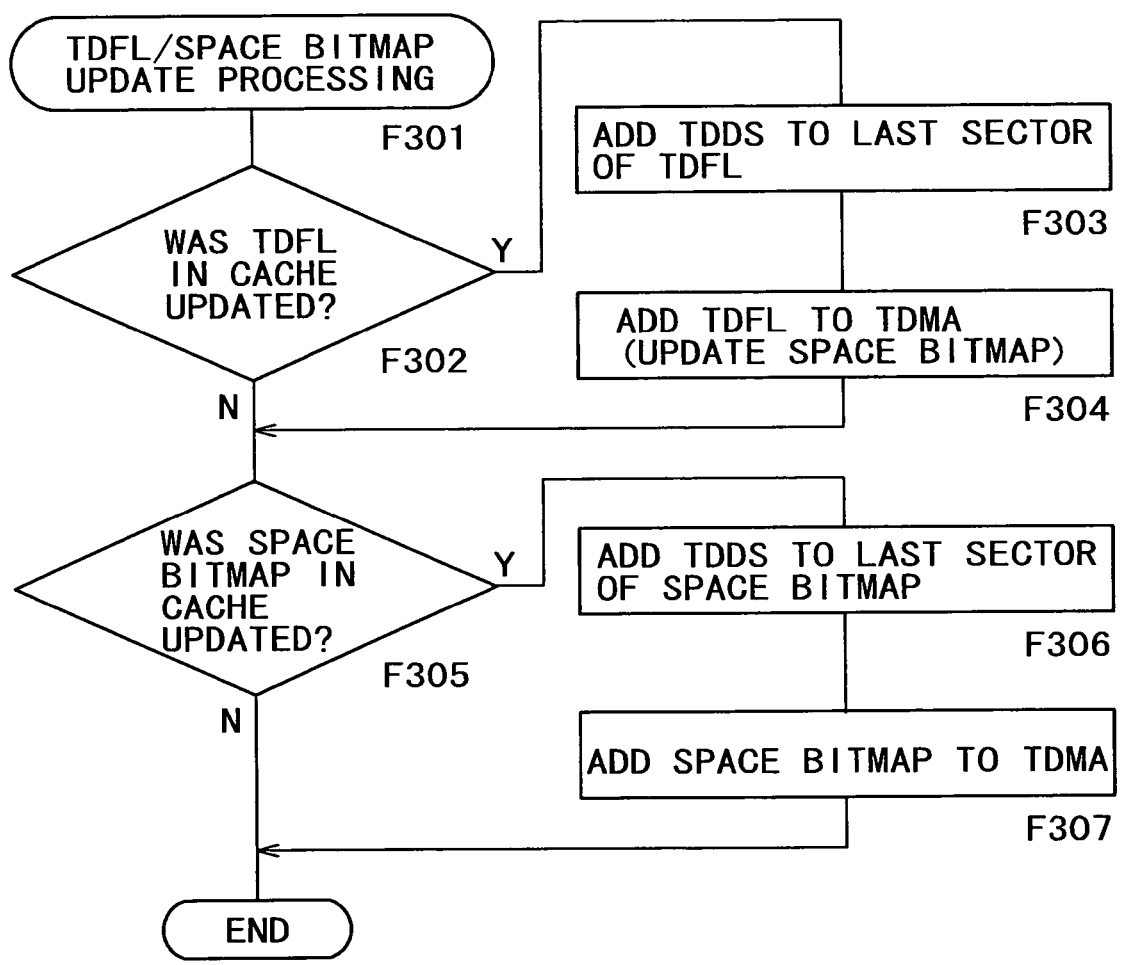

|  | STATUS 1 | ALTERNATE SOURCE ADDRESS |  | ALTERNATE DESTINATION ADDRESS |
|---|---|---|---|---|
| ati#w | 0000 | CL1 | – | CL11 |
| ati#x | 0000 | CL2 | – | CL12 |
| ati#y | 0000 | CL3 | – | CL13 |
| ati#z | 0000 | CL4 | – | CL14 |

⇩ ati RESTRUCTURING

| 0101 | CL1 | – | CL11 |
|---|---|---|---|
| 1010 | CL4 | – | CL14 |

FIG. 26

| CLUSTER NUMBER | CONTENTS | CLUSTER COUNT |
|---|---|---|
| 1(-4) | TEMPORARY DEFECT LIST (TDFL) | 1-4 |
| n | TEMPORARY DDS (TDDS) | 1 |
| | | |
| | | |
| | | |
| 2048 | | |

2048 CLUSTERS

FIG. 27

| BYTE POSITION | CONTENTS | BYTE COUNT |
|---|---|---|
| 0 | DDS IDENTIFIER = "DS" | 2 |
| 2 | DDS FORMAT NUMBER | 1 |
| 3 | RESERVED (00h) | 1 |
| 4 | TDDS-UPDATING COUNT (= SEQUENCE NUMBER OF LAST TDDS) | 4 |
| 8 | RESERVED (00h) | 8 |
| 16 | DRIVE-AREA START PHYSICAL SECTOR ADDRESS (AD_DRV) | 4 |
| 20 | RESERVED (00h) | 4 |
| 24 | DEFECT-LIST START PHYSICAL SECTOR ADDRESS (AD_DFL) IN TDMA | 4 |
| 28 | RESERVED (00h) | 4 |
| 32 | START PHYSICAL SECTOR ADDRESS OF USER-DATA AREA | 4 |
| 36 | END LOGICAL SECTOR ADDRESS OF USER-DATA AREA | 4 |
| 40 | SIZE OF FIRST LAYER ALTERNATE AREA (ISA 0) ON INNER-SIDE CIRCUMFERENCE | 4 |
| 44 | SIZE OF ALTERNATE AREA (OSA 0 OR OSA 1) ON OUTER-SIDE CIRCUMFERENCE | 4 |
| 48 | SIZE OF SECOND LAYER ALTERNATE AREA (ISA 1) ON INNER-SIDE CIRCUMFERENCE | 4 |
| 52 | SPACE AREA FULL FLAGS | 1 |
| 53 | RESERVED (00h) | 65483 |

1 SECTOR (65536 BYTES)

FIG. 29A

| b0 | b1 | b2 | b3 | b4 | b5 | b6 | b7 |
|---|---|---|---|---|---|---|---|
| ISA FULL FLAG ← [1] | OSA FULL FLAG | RESERVED | | | | | |

FIG. 29B

| b0 | b1 | b2 | b3 | b4 | b5 | b6 | b7 |
|---|---|---|---|---|---|---|---|
| ISA (L0) FULL FLAG ← [1] | OSA (L0) FULL FLAG | OSA (L1) FULL FLAG | ISA (L1) FULL FLAG ← [1] | RESERVED | | | |

RECORDING MEDIUM, RECORDING DEVICE, REPRODUCTION DEVICE, RECORDING METHOD AND REPRODUCTION METHOD

TECHNICAL FIELD

The present invention relates to a recording medium such as an optical recording medium used particularly as write-once recording media as well as relates to a recording apparatus, a recording method, a reproduction apparatus and a reproduction method, which are provided for the recording medium.

BACKGROUND ART

As a technology for recording and reproducing digital data, there is known a data-recording technology for using optical disks including magneto-optical disks as recording media. Examples of the optical disks are a CD (Compact Disk), an MD (Mini-Disk) and a DVD (Digital Versatile Disk). The optical disk is the generic name of recording media, which is a metallic thin plate protected by plastic. When a laser beam is radiated to the optical disk, the optical disk emits a reflected signal, from which changes can be read out as changes representing information recorded on the disk.

The optical disks can be classified into a read-only category including a CD, a CD-ROM and a DVD-ROM, which the user is already familiar with, and a writable category allowing data to be written therein as is generally known. The writable category includes an MD, a CD-R, a CD-RW, a DVD-R, a DVD-RW, a DVD+RW and a DVD-RAM. By adopting a magneto-optical recording method, a phase-change recording-method or a pigmented-coat change recording-method for the writable category, data can be recorded onto a disk of this category. The pigmented-coat change recording-method is also referred to as a write-once recording-method. Since this pigmented-coat change recording-method allows data recording once and inhibits renewal of data onto the disk, the disk is good for data-saving applications or the like. On the other hand, the magneto-optical recording method and the phase-change recording-method are adopted in a variety of applications allowing renewal of data. The applications allowing renewal of data include mainly an application of recording various kinds of content data including musical data, movies, games and application programs.

In addition, in recent years, a high-density optical disk called a blue-ray disc has been developed in an effort to produce the product on a very large scale.

Typically, data is recorded onto a high-density optical disk and read out from the disk under a condition requiring a combination of a laser with a wavelength of 405 nm and an objective lens with an NA of 0.85 to be reproduced. The laser required in this condition is the so-called blue laser. With the optical disk having a track pitch of 0.32 µm, a line density of 0.12 µm/bit, a formatting efficiency of about 82% and a diameter of 12 cm, data of the amount of up to 23.3 GB (gigabytes) can be recorded onto and reproduced from the disk in recording/reproduction units, which are each a data block of 64 KB (kilobytes).

There are also two types of optical disk having such a high density, i.e., optical disks of a write-once type and optical disks of a writable type.

In an operation to record data onto an optical disk allowing data to be recorded therein by adoption of the magneto-optical recording method, the pigmented-coat change recording-method or the phase-change recording-method, guide means for tracking data tracks is required. Thus, a groove is created in advance to serve as a pregroove. The groove or a land is used as a data track. A land is a member having a shape resembling a section plateau between two adjacent grooves.

In addition, it is also necessary to record addresses so that data can be recorded at a predetermined location indicated by an address as a location on a data track. Such addresses are recorded on grooves by wobbling the grooves in some cases.

That is to say, a track for recording data is created in advance as typically a pregroove. In this case, addresses are recorded by wobbling the side walls of the pregroove.

By recording addresses in this way, an address can be fetched from wobbling information conveyed by a reflected light beam. Thus, data can be recorded at a predetermined location and reproduced from a predetermined location without creating for example pit data showing an address or the like in advance on the track.

By adding addresses as a wobbling groove, it is not necessary to discretely provide an address area or the like on tracks as an area for recording typically pit data representing addresses. Since such an address area is not required, the capacity for storing actual data is increased by a quantity proportional to the eliminated address area.

It is to be noted that absolute-time (address) information implemented by a groove wobbled as described above is called an ATIP (Absolute Time In Pregroove) or an ADIP (Address in Pregroove).

In addition, in the case of recording media usable as media for recording these kinds of data or not as reproduction-only media, there is known a technology for changing a data-recording location on the disk by providing an alternate area. That is to say, this technology is a defect management technology whereby an alternate recording-area is provided so that, if a location improper for recording data exits on the disk due to a defect such as an injury on the disk, the alternate recording-area can be used as an area serving as a substitute for the defective location to allow proper recording and reproduction operations to be carried out properly.

The defect management technology is disclosed in documents including Japanese Unexamined Patent Publication No. 2002-521786, and Japanese Patent Laid-open Nos. Sho 60-74020 and Hei 11-39801.

By the way, it is naturally impossible to record data into an already recorded area in a write-once optical recording medium, that is, an area in which data has been recorded before. Examples of the write-once optical recording medium are a CD-R, a DVD-R and a high-density recording medium, which function as a write-once disk.

Specifications of most file systems to be recorded on an optical recording medium are defined by assuming the use of the optical recording medium as a ROM-type disk or a RAM-type disk. The ROM-type disk is a reproduction-only medium and the RAM-type disk is a writable optical disk. Specifications of a file system for a write-once recording medium allowing data to be stored therein only once limit functions of the ordinary file system and include special functions.

The specifications of a file system for a write-once recording medium are a reason why the file system does not become widely popular. On the other hand, a FAT file system capable of keeping up with a variety of OSes of an information-processing apparatus and other file systems cannot be applied to write-once media as they are.

Write-once media is widely used typically in applications of preserving data. If the write-once media can also be used for the FAT file system by keeping the general specifications of the file system as they are, the usability of the write-once media can be further enhanced.

In order to allow a widely used file system such as the FAT file system and a file system for RAMs or hard disks to be applied to write-once media as it is, however, a function to write data into the same address as that of existing data is required. That is to say, a capability of renewing data is required. Of course, one of characteristics of the write-once media is that data cannot be written onto the media for the second time. Thus, it is impossible to use a file system for such a writable recording medium as it is in the first place.

In addition, when the optical disk is mounted on a disk drive or dismounted from it, the recording face of the disk may be injured in dependence on the state in which the disk is kept in the drive and the way in which the disk is used. For this reason, the aforementioned technique of managing defects has been proposed. Of course, even the write-once media must be capable of coping with a defect caused by an injury.

In addition, in the case of the conventional write-once optical disk, data is recorded in a state of being compacted sequentially in areas starting from the inner side. To put it in detail, there is no space left between an area already including recorded data and an area in which data is to be recorded next. This is because the conventional disk is developed with a ROM-type disk used as a base so that, if an unrecorded area exists, a reproduction operation cannot be carried out. Such a situation limits the freedom of a random-access operation carried out on the write-once media.

In addition, for a disk drive or a recording/reproduction apparatus, an operation requested by a host computer to write data at an address specified in the operation as an address in a write-once optical disk or an operation to read out data from such an address is a process of a heavy load.

From what is described above, contemporary write-once media or, in particular, write-once media implemented by a high-density optical disk having a recording capacity of at least 20 GB like the aforementioned blue-ray disk, is required to meet the following requirements. The write-once media shall be capable of renewing data and managing defects by execution of proper management, improving the random accessibility, reducing the processing load borne by the recording/reproduction apparatus, keeping up with a general-purpose file system by the capability of renewing data and maintaining compatibility with writable optical disks as well as reproduction-only disks.

DISCLOSURE OF INVENTION

It is thus an object of the present invention addressing such a situation to improve usability of a write-once recording medium by allowing data stored on the write-once recording medium to be renewed and by executing proper management of defects.

A recording medium provided by the present invention has a write-once area allowing data to be recorded therein once and including a main data area as well as a management/control area for recording management/control information for recording data into the main data area and reproducing data from the main data area.

The main data area includes a regular recording/reproduction area which data is recorded into and reproduced from as well as an alternate area for recording data due to a defect existing in the regular recording/reproduction area or for recording data in a process to renew data. On the other hand, the management/control area includes a first alternate-address management information area for recording first alternate-address management information for managing alternate-address processes using the alternate area and a second alternate-address management information area for recording the alternate-address management information in an updateable state in an updating process prior to a finalization process. In addition, the main data area or the management/control area is used for recording written/unwritten state indication information for each data unit of the main data area and each data unit of the management/control area as information indicating whether or not data has been written into the data unit.

On top of that, in accordance with the alternate-address process, alternate-address management information is additionally recorded in the second alternate-address management information area and information indicating effective alternate-address management information is also recorded.

In addition, in accordance with a data-writing process, the written/unwritten state indication information is additionally recorded in the second alternate-address management information area and information indicating effective alternate-address management information is also recorded.

As an alternative, a written/unwritten state indication information area for recording the written/unwritten state indication information is provided in the main data area, in accordance with a data-writing process, the written/unwritten state indication information is additionally recorded in the written/unwritten state indication information area and last written/unwritten state indication information in the written/unwritten state indication information area is made effective.

In this case, a portion in an alternate area of the main data area is used as the written/unwritten state indication information area, and information is recorded to indicate that the portion of the alternate area is used as the written/unwritten state indication information area and, hence, cannot serve as an area used for the alternate-address process.

A recording apparatus provided by the present invention is a recording apparatus designed for the recording medium described above. The recording apparatus has write means for writing data onto the recording medium, confirmation means for determining whether or not data has been recorded at an address related to a data-writing request to write data in the main data area on the basis of the written/unwritten state indication information, determination means for determining whether or not an alternate-address process using the alternate area as well as the second alternate-address management information area can be carried out and write control means.

The write control means controls the write means to write data at the address related to the data-writing request and updates the written/unwritten state indication information if the confirmation means determines that data has not been recorded at the address related to the data-writing request. However, the write control means controls the write means to write data related to the data-writing request in the alternate area as well as updates the alternate-address management information and the written/unwritten state indication information if the confirmation means determines that data has been recorded at the address related to the data-writing request whereas the determination means determines that the alternate-address process can be carried out.

In addition, the write control means also updates the alternate-address management information by additionally recording alternate-address management information in the second alternate-address management information area of the recording medium and records information indicating effective alternate-address management information.

On top of that, the write control means also updates the written/unwritten state indication information by additionally recording written/unwritten state indication information in the second alternate-address management information area of the recording medium and records information indicating effective written/unwritten state indication information.

As an alternative, the write control means updates the written/unwritten state indication information by additionally recording written/unwritten state indication information in the main data area of the recording medium.

In addition, the recording apparatus further has set means for setting an indicator as to whether or not data can be renewed on the basis of information recorded on the recording medium as information indicating that the portion of the alternate area in the main data area of the recording medium is used as the written/unwritten state indication information area and, hence, cannot serve as an area used for the alternate-address process and on the basis of the substance of data recorded in the portion existing in the alternate area as the written/unwritten state indication information area in a configuration wherein the write control means uses the portion of the alternate area as the written/unwritten state indication information area and additionally records the written/unwritten state indication information in the written/unwritten state indication information area.

A reproduction apparatus provided by the present invention is a reproduction apparatus designed for the recording medium described above. The reproduction apparatus includes read means for reading out data from the recording medium, first confirmation means for determining whether or not data has been recorded at an address related to a read request to read out data from the main data area on the basis of the written/unwritten state indication information, second confirmation means for determining whether or not the address related to the read request to read out data from the main data area is an address completing an alternate-address process on the basis of the alternate-address management information and read control means.

The read control means controls the read means to read out data from the address related to the read request if the first confirmation means determines that data has been recorded at the address related to the read request and the second confirmation means determines that the address related to the read request is not an address completing an alternate-address process. However, the read control means controls the read means to read out data related to the read request from the alternate area on the basis of the alternate-address management information if the first confirmation means determines that data has been recorded at the address related to the read request and the second confirmation means determines that the address related to the read request is an address completing an alternate-address process.

A recording method provided by the present invention is a recording method designed for the recording medium described above. The recording method includes: a confirmation step of determining whether or not data has been recorded at an address related to a data-writing request to write data in the main data area on the basis of the written/unwritten state indication information; a determination step of determining whether or not an alternate-address process using the alternate area and the second alternate-address management information area can be carried out; a first write step of writing data at the address related to the data-writing request and updating the written/unwritten state indication information if a determination result obtained at the confirmation step indicates that data has not been recorded at the address related to the data-writing request; and a second write step of writing data related to the data-writing request in the alternate area as well as updating the alternate-address management information and the written/unwritten state indication information if a determination result obtained at the confirmation step indicates that data has been recorded at the address related to the data-writing request whereas a determination result obtained at the determination step indicates that the alternate-address process can be carried out.

A reproduction method provided by the present invention is a reproduction method designed for the recording medium described above. The reproduction method includes: a first confirmation step of determining whether or not data has been recorded at an address related to a read request to read out data from the main data area on the basis of the written/unwritten state indication information; a second confirmation step of determining whether or not the address related to the read request to read out data from the main data area is an address completing an alternate-address process on the basis of the alternate-address management information; a first read step of reading out data from the address related to the read request if a determination result obtained at the first confirmation step indicates that data has been recorded at the address related to the read request and a determination result obtained at the second confirmation step indicates that the address related to the read request is not an address completing an alternate-address process; and a second read step of reading out data related to the read request from the alternate area on the basis of the alternate-address management information if a determination result obtained at the first confirmation step indicates that data has been recorded at the address related to the read request and a determination result obtained at the second confirmation step indicates that the address related to the read request is an address completing an alternate-address process.

That is to say, the write-once recording medium provided by the present invention includes a regular recording/reproduction area, an alternate area, a first alternate-address management information and a second alternate-address management information area. In addition, written/unwritten state indication information is recorded. By additionally recording alternate-address management information related to an alternate-address process in the second alternate-address management information area, the second alternate-address management information area can be used as an area for implementing renewal of data.

In addition, the written/unwritten state indication information is used as information for determining whether or not data has been recorded in each data unit (or a cluster) on the recording medium. Thus, it is possible to implement management of defects and renewal of data in write-once media.

When the recording apparatus receives a data-writing request, for example, the written/unwritten state indication information can be used as information for determining whether or not data has been recorded at an address specified in the request. If data has been recorded at the address specified in the request, data to be written is recorded in the alternate area. In addition, by updating alternate-address management information through addition of information on the alternate-address process carried out in recording the data to be written in the alternate area, virtually, a data renewal is implemented. Defect management can also be executed by updating alternate-address management information through addition of information on the alternate-address process carried out in recording the data to be written in the alternate area due to a defect existing at the address specified in the request.

When the reproduction apparatus receives a data reproduction request, the written/unwritten state indication information can be used as information for determining whether or not data has been recorded at an address specified in the request. If data has been recorded at the address specified in the request, the data to be reproduced is read out from the recording medium. If the address specified in the data reproduction request is an address shown in most recently updated alternate-address management information, the data to be reproduced is read out from an alternate destination address shown in the most recently updated alternate-address management information, that is, the data to be reproduced is read out from an address in the alternate area. Thus, it is possible to correctly read out data resulting from a renewal or data subjected to an alternate-address process in the past due to the existence of a defect.

BRIEF DESCRIPTION OF THE DRAWINGS

FIG. 5 is a diagram showing the contents of a DDS of a disk provided by the embodiment;

FIG. 7 is a diagram showing defect list management information of a DFL and TDFL of a disk provided by the embodiment;

FIG. 9 is an explanatory diagram showing a TDMA of a disk provided by the embodiment;

FIG. 11 is an explanatory diagram showing a TDFL of a disk provided by the embodiment;

FIG. 12 is an explanatory diagram showing a TDDS of a disk provided by the embodiment;

FIG. 13 is an explanatory diagram showing an ISA and OSA of a disk provided by the embodiment;

FIG. 14 is an explanatory diagram showing a data-recording order in a TDMA of a disk provided by the embodiment;

FIG. 15 is an explanatory diagram showing a utilization stage of a TDMA of the two-layer disk provided by the embodiment;

FIG. 22 shows a flowchart representing a TDFL/space-bitmap update process provided by the embodiment;

FIG. 26 is an explanatory diagram showing a TDMA of a disk provided by another embodiment;

FIG. 27 is an explanatory diagram showing a TDDS of a disk provided by the other embodiment;

FIGS. 29A and 29B are each an explanatory diagram showing spare area full flags provided by the other embodiment;

BEST MODE FOR CARRYING OUT THE INVENTION

The following description explains an embodiment provided by the present invention as an embodiment implementing an optical disk and a disk drive employed in a recording apparatus and/or a reproduction apparatus as a disk drive designed for the optical disk. The description comprises chapters arranged in the following order:

1: Disk Structure
2: DMAs
3: First TDMA Method
   3-1: TDMAs
   3-2: ISAs and OSAs
   3-3: TDMA-Using Method
4: Disk Drive
5: Operations for the First TDMA Method
   5-1: Data Writing
   5-2: Data Fetching
   5-3: Updating of the TDFL/Space Bitmap
   5-4: Conversion into Compatible Disks
6: Effects of the First TDMA Method
7: Second TDMA Method
   7-1: TDMAs
   7-2: ISAs and OSAs 8: Operations for the Second TDMA Method
  8-1: Data Writing
  8-2: Data Fetching
  8-3: Updating of the TDFL/Space Bitmap and Conversion into Compatible Disks
9: Effects for the Second TDMA Method 1: Disk Structure First of all, an optical disk provided by the embodiment is explained. The optical disk can be implemented by a write-once optical disk referred to as the so-called blue-ray disk. The blue-ray disk pertains to the category of high-density optical disks.

Typical physical parameters of the high-density optical disk provided by the embodiment are explained as follows.

The disk size of the optical disk provided by the embodiment is expressed in terms of a diameter of 120 mm and a disk thickness of 1.2 mm. That is to say, from the external-appearance point of view, the optical disk provided by the embodiment is similar to a disk of a CD (Compact Disk) system and a disk of a DVD (Digital Versatile Disk) system.

As a recording/reproduction laser, the so-called blue laser is used. By using an optical system having a high NA of typically 0.85, setting the track pitch at a small value of typically 0.32 microns and setting the line density at a high value of typically 0.12 microns per bit, it is possible to implement a user-data storage capacity of about 23 Gbyte to 25 Gbyte for an optical disk with a diameter of 12 cm.

In addition, a two-layer disk is also developed. A two-layer disk is an optical disk having two recording layers. In the case of a two-layer disk, a user-data capacity of about 50 G can be achieved.

Figure 1:
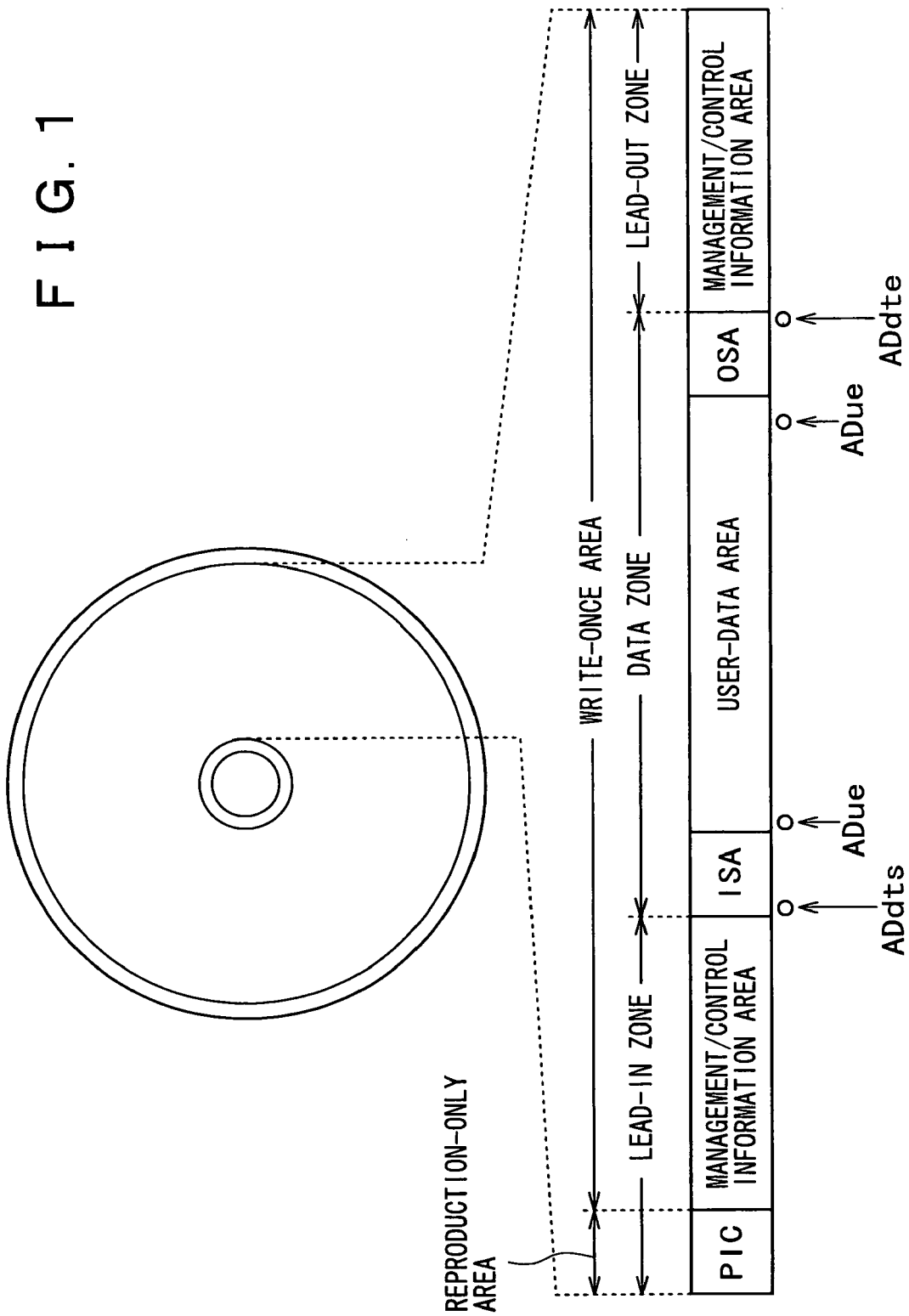
FIG. 1 is an explanatory diagram showing the area structure of a disk provided by an embodiment of the present invention.

FIG. 1 is an explanatory diagram showing the layout (or the area structure) of the entire disk.

The recording area of the disk includes a lead-in zone on the innermost circumference, a data zone on a middle circumference and a lead-out zone on the outermost circumference.

The lead-in zone, the data zone and the lead-out zone serve as recording and reproduction areas as follows. A prerecorded information area PIC on the innermost side of the lead-in zone is a reproduction-only area. An area starting with a management/control information area of the lead-in zone and ending with the lead-out zone is used as a write-once area allowing data to be written therein only once.

In the reproduction-only area and the write-once area, a spiral recording track is created as a wobbling groove. The wobbling groove serves as a tracking guide in a tracing operation using a laser spot. The wobbling groove is thus a recording track, which data is recorded onto or read out from.

It is to be noted that, this embodiment assumes an optical disk allowing data to be recorded on the groove. However, the scope of the present invention is not limited to the optical disk with such a recording track. For example, the present invention can also be applied to an optical disk adopting a land recording-technique whereby data is recorded on a land between two adjacent grooves. In addition, the present invention can also be applied to an optical disk adopting a land/groove recording-technique whereby data is recorded on a land and a groove.

In addition, the groove used as a recording track in an optical disk has a shape wobbled by a wobbling signal. Thus, a disk drive for such an optical disk detects both edge positions of the groove from a reflected light beam of a laser spot radiated to the groove. Then, by extracting components fluctuating in the radial direction of the disk as fluctuations of both the edge positions in an operation to move the laser spot along the recording track, the wobble signal can be reproduced.

This wobble signal is modulated by information on addresses of recording locations on the recording track. The information on addresses includes physical addresses and other additional information. Thus, by demodulating the wobble signal to produce the information on addresses, the disk drive is capable of controlling addresses, at which data are to be recorded or reproduced.

The lead-in zone shown in FIG. 1 is an area on the inner side a circumference having a typical radius of 24 mm.

An area between a circumference with a radius of 22.2 mm and a circumference with a radius of 23.1 mm in the lead-in zone is the prerecorded information area PIC.

The prerecorded information area PIC is used for storing reproduction-only information as the wobbling state of the groove. The reproduction-only information includes disk information such as recording/reproduction power conditions, information on areas on the disk and information used for copy protection. It is to be noted that these pieces of information can also be recorded on the disk as emboss pits or the like.

A BCA (Burst Cutting Area) not shown in the figure may be provided on a circumference on the inner side of the prerecorded information area PIC in some cases. The BCA is used for storing a unique ID peculiar to the disk recording medium in such a state that the ID cannot be renewed. The unique ID is recorded marks created in a concentric-circle shape to form recorded data in a bar-code format.

An area between a circumference with a radius of 23.1 mm and a circumference with a radius of 24.0 mm in the lead-in zone is a management/control information area.

The management/control information area has a predetermined area format to include a control data area, a DMA (Defect Management Area), a TDMA (Temporary Defect Management Area), a test write area (OPC) and a buffer area.

The control data area included in the management/control information area is used for recording management/control information such as a disk type, a disk size, a disk version, a layer structure, a channel-bit length, BCA information, a transfer rate, data-zone position information, a recording line speed and recording/reproduction laser power information.

The test write area (OPC) included in the management/control information area is used for a trial writing process carried out in setting data recording/reproduction conditions such as a laser power to be used in recording/reproduction operations. That is, the test write area is a region for adjusting the recording/reproduction conditions.

In the case of an ordinary optical disk, the DMA included in the management/control information area is used for recording alternate-address management information for managing defects. In the case of a write-once optical disk provided by the embodiment, however, the DMA is used for recording not only the alternate-address management information of defects but also management/control information for implementing data renewals in the optical disk. In this case, particularly, the DMA is used for recording ISA management information and OSA management information, which will be described later.

In order to make renewal of data possible by making use of an alternate-address process, the contents of the DMA must also be updated when data is renewed. For updating the contents of the DMA, the TDMA is provided.

Alternate-address management information is added and/or recorded in the TDMA and updated from time to time. Last (most recent) alternate-address management information recorded in the TDMA is eventually transferred to the DMA.

The DMA and the TDMA will be described later in detail.

The area on the circumferences with radii in the range 24.0 to 58.0 mm external to the lead-in zone is used as a data zone. The data zone is an area, which user data is actually recorded into and reproduced from. The start address ADdts and end address ADdte of the data zone are included in the data zone position information recorded in the control data area described earlier.

An ISA (Inner Spare Area) is provided on the innermost circumference of the data zone. On the other hand, an OSA (Outer Spare Area) is provided on the outermost circumference of the data zone. As will be described later, the ISA and the OSA are each used as an alternate area provided for defects and for implementing data renewals (overwriting).

The ISA begins from the start position of the data zone and includes a predetermined number of clusters each having a size of 65,536 bytes.

On the other hand, the OSA includes a predetermined number of clusters, which terminate at the end position of the data zone. The sizes of the ISA and the OSA are described in the DMA.

A user-data area in the data zone is an area sandwiched by the ISA and the OSA. This user-data area is an ordinary recording/reproduction area, which user data is generally recorded into and reproduced from.

The start address ADus and end address ADue of the user-data area define the location of the user-data area and are recorded in the DMA.

The area on the circumferences with radii in the range 58.0 to 58.5 mm external to the data zone is the lead-out zone. The lead-out zone is a management/control information area having a predetermined format to include a control data area, a DMA and a buffer area. Much like the control data area included in the lead-in zone, the control data area of the lead-out zone is used for storing various kinds of management/control information. By the same token, much like the DMA included in the lead-in zone, the DMA of the lead-out zone is used as an area for recording management information of the ISA and management information of the OSA.

Figure 2:
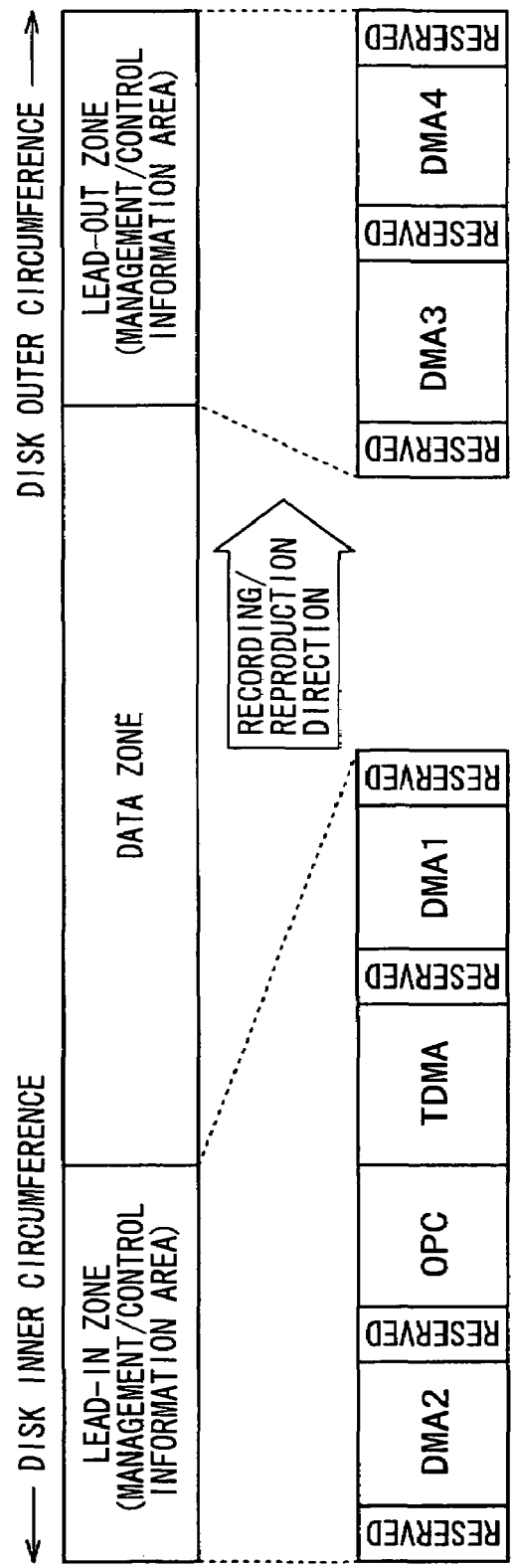
FIG. 2 is an explanatory diagram showing the structure of a one-layer disk provided by the embodiment.

FIG. 2 is a diagram showing a typical structure of the management/control information area on a one-layer disk having only one recording layer.

As shown in the figure, in addition to undefined segments (reserved segments), the lead-in zone includes a variety of areas such as DMA 2, an OPC (a test write area), a TDMA and DMA 1. On the other hand, in addition to undefined segments (reserved segments), the lead-out zone includes a variety of areas such as DMA 3 and DMA 4.

It is to be noted that the control data area described above is not shown in the figure. This is because, in actuality, a portion of the control data area is used as a DMA for example. Since the structure of a DMA is an essential of the present invention, the control data area is not shown in the figure.

As described above, the lead-in and lead-out zones include four DMAs, i.e., DMA 1 to DMA 4. DMA 1 to DMA 4 are each used as an area for recording the same alternate-address management information.

However, a TDMA is provided as an area used for temporarily recording alternate-address management information and, every time an alternate-address process is carried out due to renewal of data or a defect, new alternate-address management information is additionally recorded in the TDMA to update the information already recorded therein.

Thus, till the disk is finalized, for example, the DMAs are not used. Instead, the alternate-address management is carried out and new alternate-address management information is added to the TDMA and/or recorded in the TDMA. As the disk is finalized, alternate-address management information recorded on the TDMA most recently is transferred to the DMAs so that the alternate-address process based on the DMA can be carried out.

Figure 3:
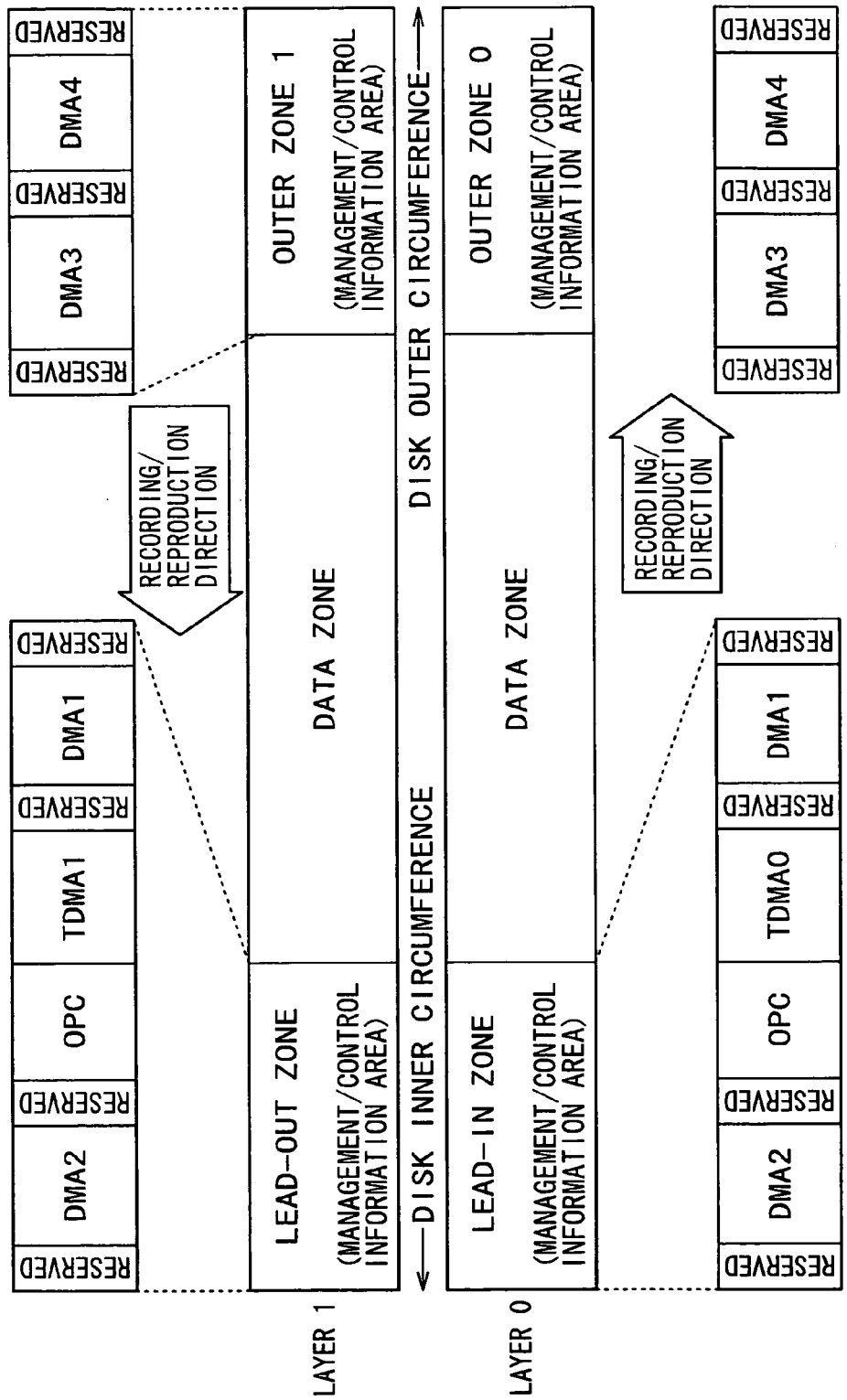
FIG. 3 is an explanatory diagram showing the structure of a two-layer disk provided by the embodiment.

FIG. 3 is a diagram showing a two-layer disk having two recording layers. The first recording layer is referred to as layer 0 and the second recording layer is called layer 1. Data is recorded onto and reproduced from layer 0 in a direction from the inner side of the disk to the outer side thereof, as same as in the case of one-layer disk. On the other hand, data is recorded onto and reproduced from layer 1 in a direction from the outer side of the disk to the inner side thereof.

The value of the physical address increases in the directions. That is to say, the value of the physical address on layer 0 increases in the direction from the inner side of the disk to the outer side thereof, and the value of the physical address on layer 1 increases in the direction from the outer side of the disk to the inner side thereof.

Much like the one-layer disk, the lead-in zone on layer 0 includes a variety of areas such as DMA 2, an OPC (a test write area), TDMA 0 and DMA 1. Since the outermost circumference on layer 0 is not a lead-out zone, it is referred to simply as outer zone 0, which includes DMA 3 and DMA 4.

The outermost circumference on layer 1 is referred to simply as outer zone 1, which includes DMA 3 and DMA 4. The innermost circumference of layer 1 is a lead-out zone, which includes a variety of areas such as DMA 2, an OPC (a test write area), TDMA 1 and DMA 1.

As described above, the lead-in zone, outer zones 0 and 1 and the lead-out zone include eight DMAs. In addition, each of the recording layers includes a TDMA.

The size of the lead-in zone on layer 0 and the size of the lead-out zone on layer 1 are equal to the size of the lead-in zone on the one-layer disk. On the other hand, the sizes of outer zones 0 and 1 are equal to the size of the lead-out zone on the one-layer disk.

2: DMAs

The data structure of each DMA recorded in the lead-in zone and the lead-out zone is explained below. In the case of a two-layer disk, the DMAs also include the DMAs in outer zones 0 and 1.

Figure 4:
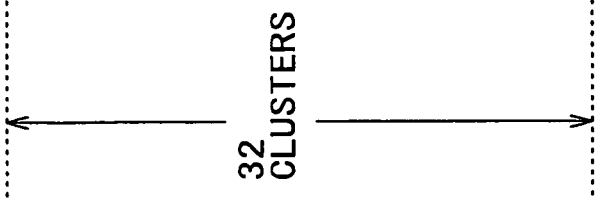
FIG. 4 is an explanatory diagram showing a DMA of a disk provided by the embodiment.

FIG. 4 is a diagram showing the structure of the DMA.

The size of the DMA shown in the figure is 32 clusters (=32×65,536 bytes). It is to be noted that a cluster is the smallest data-recording unit. Of course, the size of a DMA is not limited to 32 clusters. In FIG. 4, the 32 clusters are identified by cluster numbers 1 to 32, which each indicate a data position of each content of the DMA. The size of each content is expressed as a cluster count.

In the DMA, cluster numbers 1 to 4 identify four clusters forming a segment for recording a DDS (disc definition structure), which describes the disc in detail.

The contents of the DDS will be described later by referring to FIG. 5. In actually, since the size of the DDS is one cluster, four identical DDSes are recorded in the segment.

Cluster numbers 5 to 8 identify four clusters forming a segment for recording DFL #1, which is the first recording area of a DFL (defect list). The data structure of the defect list will be described later by referring to FIG. 6. The size of data stored in the defect list is four clusters forming a list of information on alternate addresses.

Cluster numbers 9 to 12 identify four clusters forming a segment for recording DFL #2, which is the second recording area of the defect list. The second recording area is followed by the third and subsequent recording areas DFL #3 to DFL #6, which each have a size of four clusters. The four-cluster segment DFL #7 used as the seventh recording area of the defect list is identified by cluster numbers 29 to 32.

As is obvious from the above description, the DMA having a size of 32 clusters includes seven recording areas of the defect list, i.e., DFL #1 to DFL #7.

In a write-once optical disk allowing data to be recorded therein once as is the case with the disk provided by the embodiment, in order to record contents of a DMA, it is necessary to carry out a process referred to as 'finalize'. In this case, the same contents are recorded in seven recording areas DFL #1 to DFL #7.

FIG. 5 is a diagram showing the data structure of the contents of the DDS recorded at the beginning of the DMA shown in FIG. 4. As described above, the DDS has a size of one cluster (=65,536 bytes).

In the figure, byte 0 is the position of the beginning of the DDS having a size of 65,536 bytes. A byte-count column shows the number of bytes included in each data content.

Two bytes indicated by byte positions 0 to 1 are used as bytes for recording "DS", which is a DDS identifier indicating that this cluster is the DDS.

One byte indicated by byte position 2 is used as a byte for recording a DDS format number of the version of the DDS format.

Four bytes indicated by byte positions 4 to 7 are used as bytes for recording the number of times the DDS has been updated. It is to be noted that, in this embodiment, in the finalize process, alternate-address management information is additionally written into the DMA itself instead of being used for updating the DMA. The alternate-address management information is stored in the TDMA before being written into the DMA in the finalize process. Thus, when the finalize process is eventually carried out, a TDDS (temporary DDS) of the TDMA contains the number of times the TDDS has been updated. The aforementioned number of times the DDS has been updated is the number of times the TDDS has been updated.

Four bytes indicated by byte positions 16 to 19 are used as bytes for recording AD_DRV, which is the start physical sector address of a drive area in the DMA.

Four bytes indicated by byte positions 24 to 27 are used as bytes for recording AD_DFL, which is the start physical sector address of a defect list DFL in the DMA.

Four bytes indicated by byte positions 32 to 35 are used as bytes for recording a PSN (physical sector number or a physical sector address) of the start position of the user-data area in the data zone. That is to say, the four bytes are used as bytes for recording a PSN indicating the position of an LSN (logical sector number) of 0.

Four bytes indicated by byte positions 36 to 39 are used as bytes for recording an LSN (logical sector number) of the end position of the user-data area in the data zone.

Four bytes indicated by byte positions 40 to 43 are used as bytes for recording the size of the ISA in the data zone. The ISA is the ISA of a one-layer disk or the ISA on layer 0 of a two-layer disk.

Four bytes indicated by byte positions 44 to 47 are used as bytes for recording the size of each OSA in the data zone.

Four bytes indicated by byte positions 48 to 51 are used as bytes for recording the size of the ISA in the data zone. The ISA is the ISA on layer 1 of a two-layer disk.

One byte indicated by byte position 52 is used as a byte for recording spare area full flags showing whether or not data can be renewed by using an ISA or an OSA. That is to say, the spare area full flag are used to indicate that the ISA and the OSA are being used entirely.

Byte positions other than the byte positions described above are reserved (or undefined) and all filled with codes of 00h.

As described above, the DDS is used as an area for storing the addresses of the user-data area, the sizes of each ISA and each OSA and spare area full flags. That is to say, the DDS is used for storing information for managing and controlling areas of each ISA and each OSA in the data zone.

Figure 6:
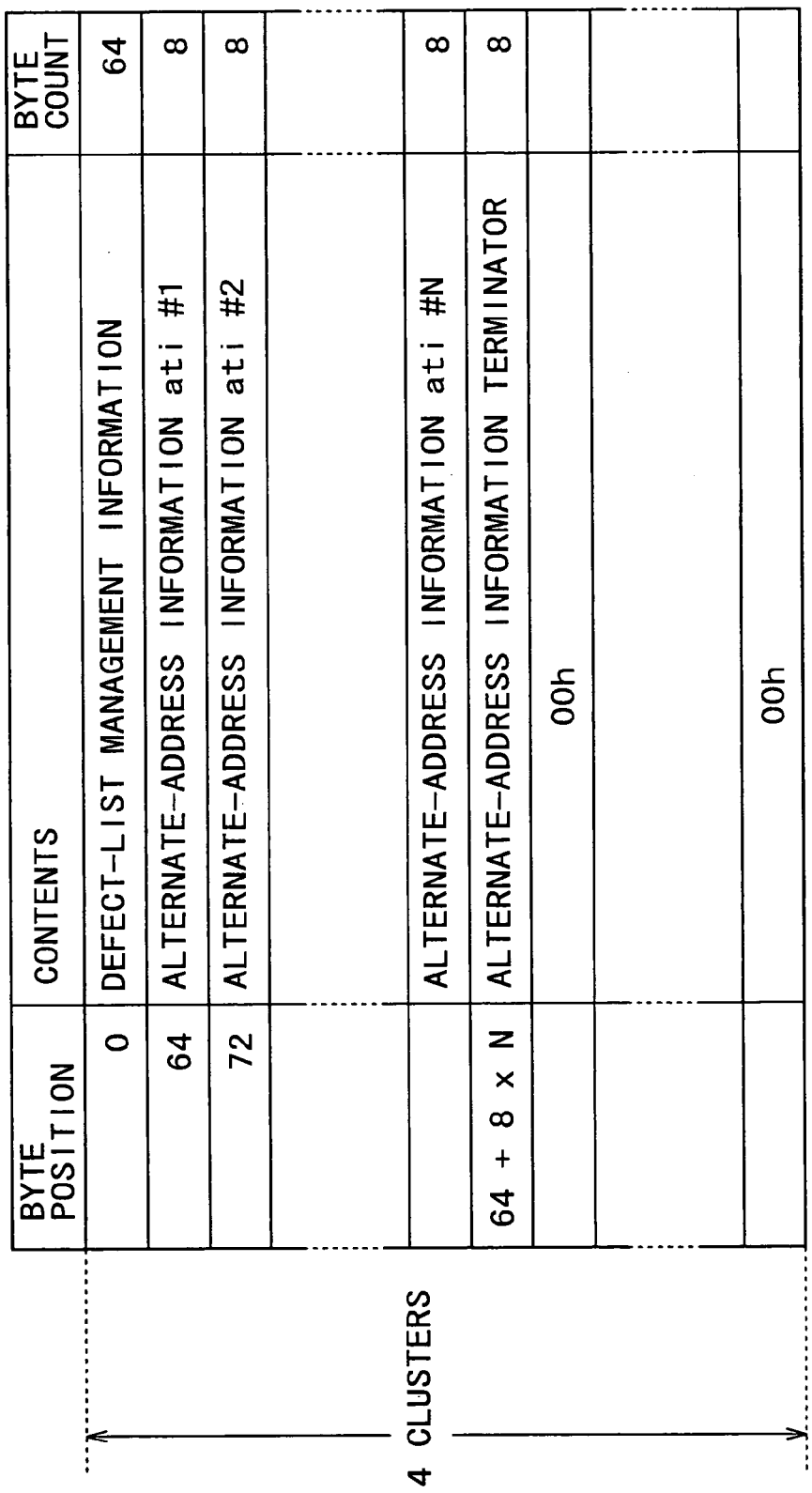
FIG. 6 is a diagram showing the contents of a DFL of a disk provided by the embodiment.

Next, the data structure of the defect list DFL is explained by referring to FIG. 6. As explained earlier by referring to FIG. 4, the defect list DFL is recorded in an area having a size of four clusters.

In the defect list DFL shown in FIG. 6, a byte-position column shows data positions of each data content of the defect list having a size of four clusters. It is to be noted that one cluster is 32 sectors occupying 65,536 bytes. Thus, one sector has a size of 2,048 bytes.

A byte-count column shows the number of bytes composing each data content.

The first 64 bytes of the defect list DFL are used as bytes for recording management information of the defect list DFL. The management information of the defect list DFL includes information indicating that this cluster is the defect list DFL, a version, the number of times the defect list DFL has been updated and the number of entries forming the defect list DFL.

The bytes following the $64^{th}$ byte are used as bytes for recording contents of each entry of the defect list DFL. Each entry is alternate-address information ati having a length of eight bytes.

A terminator having a length of eight bytes serves as an alternate-address end immediately following ati #N, which is the last one of pieces of effective alternate-address information.

In this DFL, an area following the alternate-address end is filled up with 00h codes till the end of the clusters.

The defect-list management information having a length of 64 bytes is shown in FIG. 7.

Two bytes starting with a byte at byte position 0 are used as bytes for recording a character string DF representing the identifier of the defect list DFL.

One byte at byte position 2 is used as a byte for recording the format number of the defect list DFL.

Four bytes starting with a byte at byte position 4 are used as bytes for recording the number of times the defect list DFL has been updated. It is to be noted that this value is actually the number of times the TDFL (temporary defect list) to be described later has been updated and, thus, a value transferred from the TDFL.

Four bytes starting with a byte at byte position 12 are used as bytes for recording the number of entries in the defect list DFL, that is, the number of pieces of alternate-address information ati.

Four bytes starting with a byte at byte position 24 are used as bytes for recording cluster counts indicating the sizes of free areas available in the alternate areas ISA 0, ISA 1, OSA 0 and OSA 1.

Byte positions other than the byte positions described above are reserved and all filled with codes of 00h.

Figure 8:
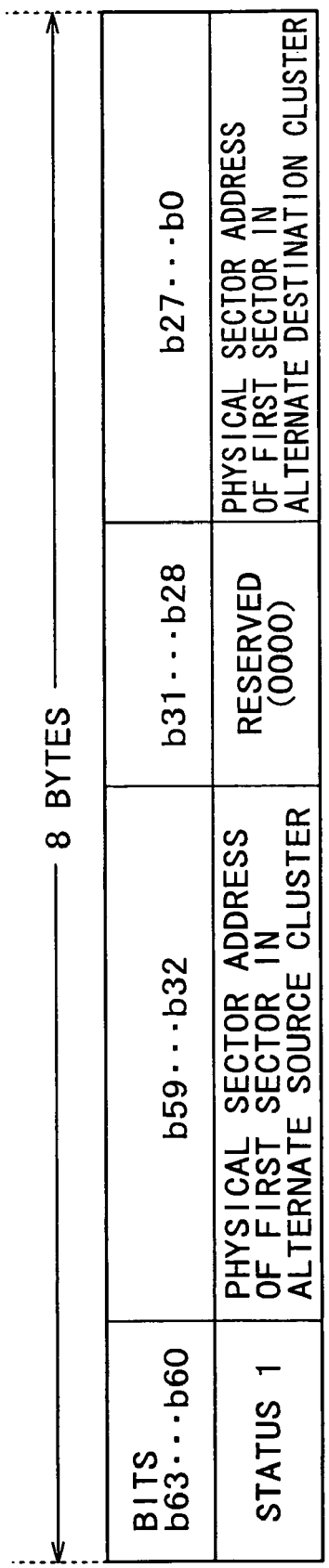
FIG. 8 is a diagram showing alternate-address information of a DFL and TDFL of a disk provided by the embodiment.

FIG. 8 is a diagram showing the data structure of an alternate-address information ati. The data structure includes information showing the contents of an entry completing an alternate-address process.

In the case of a one-layer disk, the total number of pieces of alternate-address information ati can be up to a maximum of 32,759.

Each piece of alternate-address information ati comprises eight bytes (or 64 bits, i.e., bits b63 to b0). Bits b63 to b60 are used as bits for recording status 1, which is the status of the entry. In the defect list DFL, the status is set at a value of '0000' indicating an ordinary alternate-address process entry. Other values of the status will be explained later in a description of the alternate address in the TDFL of the TDMA.

Bits b59 to b32 are used as bits for recording the PSN (physical sector address) of the first sector in an alternate source cluster. That is to say, in this data structure, a cluster subjected to an alternate-address process due to a defect or renewal of data is expressed by the physical sector address PSN of the first sector of the cluster.

Bits b31 to b28 are reserved. It is to be noted that these bits can also be used as bits for recording status 2, which is other status in this entry.

Bits b27 to b0 are used as bits for recording the physical sector address PSN of the first sector in an alternate destination cluster. That is to say, in this data structure, a destination cluster required in an alternate-address process due to a defect or renewal of data is expressed by the physical sector address PSN of the first sector of the cluster.

As described above, the alternate-address information ati is treated as an entry showing an alternate source cluster and an alternate destination cluster. Then, such an entry is cataloged in the defect list DFL having a structure shown in FIG. 6.

In the DMA, information on an alternate-address management information is recorded in a data structure like the one described above. As explained above, however, these kinds of information are recorded in a process to finalize the disk. In this process, most recent information on an alternate-address management information is transferred from the TDMA to the DMA.

Information on defect processing and information on an alternate-address management carried out due to renewal of data are recorded in the TDMA described below and updated from time to time.

3: First TDMA Method 3-1: TDMAs

The following description explains the TDMA (temporary DMA) provided in the management/control information area as shown in FIGS. 2 and 3. Much like the DMA, the TDMA is used as an area for recording information on alternate-address processes. Every time an alternate-address process is carried out to follow renewal of data or follow detection of a defect, information on the alternate-address process is added to the TDMA or recorded in the TDMA as an update.

FIG. 9 is a diagram showing the data structure of the TDMA.

The size of the TDMA is typically 2,048 clusters. As shown in the figure, the first cluster indicated by a cluster number of 1 is used as a cluster for recording a space bitmap for layer 0. A space bitmap comprises bits each representing a cluster of a main data area including the data zone as well as a management/control area including the lead-in zone and the lead-out zone (and the outer zones in the case of a two-layer disk). The value of each bit is write existence/non-existence information indicating whether or not data has been written into a cluster represented by the bit. All clusters ranging from the lead-in zone to the lead-out zone (including the outer zones in the case of a two-layer disk) are each represented by a bit of the space bitmap as described above, and the size of the space bitmap itself is one cluster.

A cluster indicated by a cluster number of 2 is used as a cluster for recording a space bitmap for layer 1 (or the second layer). It is to be noted that, in the case of a one-layer disk, a space bitmap for layer 1 is of course unnecessary.

If an alternate-address process is carried out in, for example, an operation to change data contents, a TDFL (temporary defect list) is additionally recorded to a cluster at the beginning of an unrecorded area in the TDMA. Thus, in the case of a two-layer disk, the first TDFL is recorded in an area starting from the position indicated by a cluster number of 3 as shown in the figure. In the case of a one-layer disk, a space bitmap for layer 1 is not necessary as described above. Thus, the first TDFL is recorded in an area starting from the position indicated by a cluster number of 2. Then, every time an alternate-address process is carried out thereafter, a TDFL is additionally recorded at a subsequent cluster position without providing a gap between the subsequent cluster position and the preceding cluster position.

The size of a TDFL is in the range 1 to up to 4 clusters. Since a space bitmap shows recording states of clusters, the bitmap is updated every time data is written into any of the clusters to update the cluster. When the space bitmap is updated, much like a TDFL, a new space bitmap is additionally recorded in a TDMA area starting from the beginning of a free area in the TDMA.

That is to say, a space bitmap and/or a TDFL is additionally recorded in the TDMA from time to time.

It is to be noted that the configurations of a space bitmap and a TDFL will be described later. Anyway, a TDDS (temporary disc definition structure) is recorded in the last 2,048-byte sector of a cluster used for recording a space bitmap and the last 2,048-byte sector of 1 to 4 clusters used for recording a TDFL. The TDDS is detailed information on the optical disk.

Figure 10:
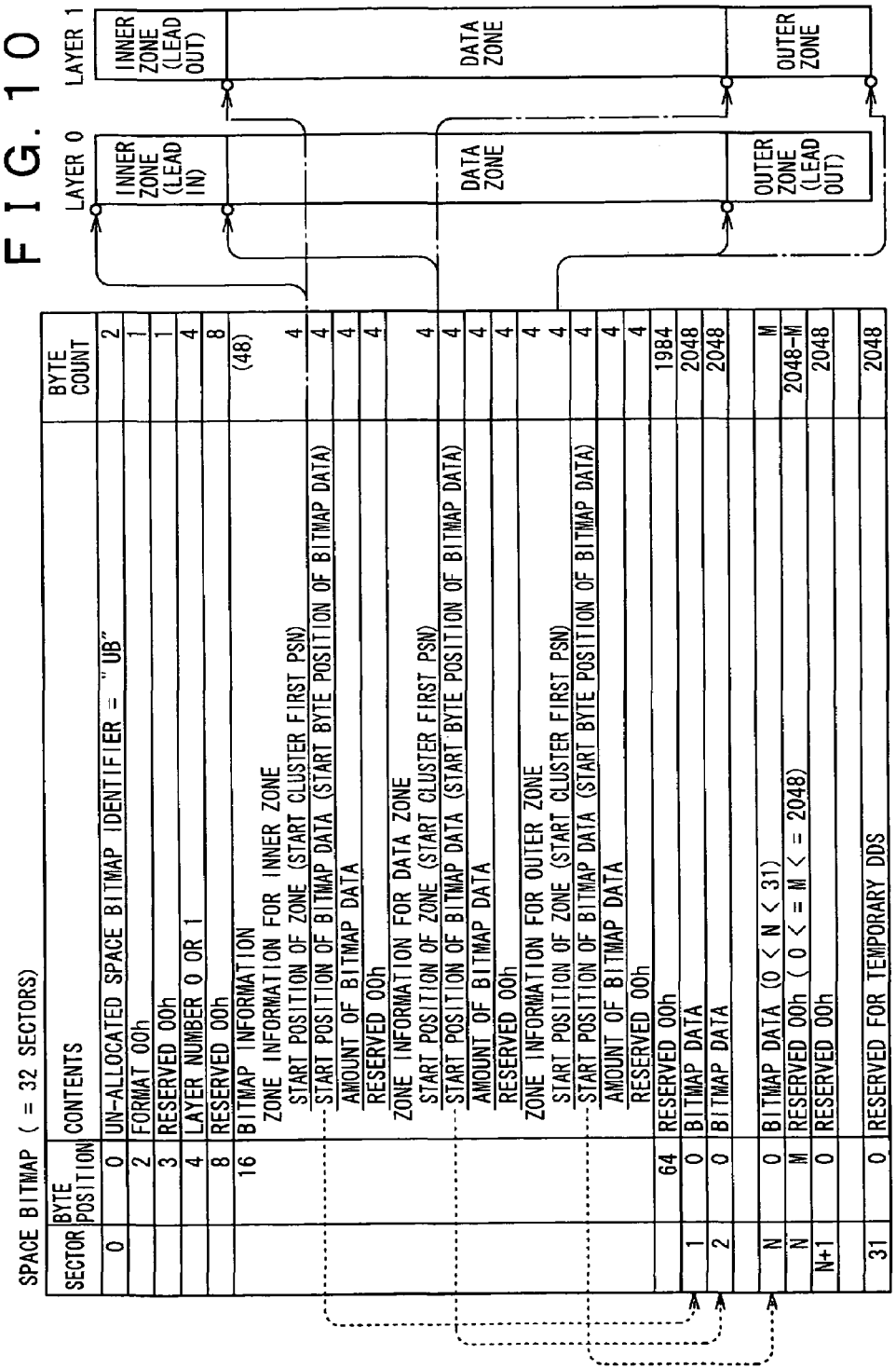
FIG. 10 is an explanatory diagram showing a space bitmap of a disk provided by the embodiment.

FIG. 10 is a diagram showing the data structure of a space bitmap.

As described above, each bit of a space bitmap represents the recording state of one cluster on the disk, that is, each bit indicates whether or not data has been recorded in the cluster represented thereby. For example, if data has not been recorded in a cluster, a bit representing the cluster is set at 1. It is to be noted that, in the case of a two-layer disk, a space bitmap is provided for each layer and information recorded in one of the space bitmaps is independent of information recorded in the other space bitmap.

For one sector=2,048 bytes, clusters on a layer having a storage capacity of 25 GB can be represented by a space bitmap with a size of 25 sectors. Since one cluster comprises 32 sectors, the space bitmap itself can be formed from one cluster.

In the data structure of a space bitmap shown in FIG. 10, a cluster allocated as the bitmap comprises 32 sectors, i.e., sectors 0 to 31. A byte-position column shows byte positions of each of the sectors.

Sector 0 at the beginning of the space bitmap is used as a sector for recording management information of the bitmap.

Two bytes at byte positions 0 and 1 in sector 0 are used as bytes for recording an UB, which is an unallocated space bitmap ID (identifier).

One byte at byte position 2 is used as a byte for recording a format version such as a version of 00h.

Four bytes starting from byte position 4 are used as bytes for recording a layer number indicating whether this space bitmap corresponds to layer 0 or layer 1.

48 bytes starting from byte position 16 are used as bytes for recording bitmap information.

The bitmap information comprises pieces of zone information for three zones, i.e., the inner zone, the data zone and the outer zone. The pieces of zone information are zone information for the inner zone, zone information for the data zone and zone information for the outer zone.

The size of each of the pieces of zone information is 16 bytes. Each of the pieces of zone information comprises a start cluster first PSN, a start byte position of bitmap data, a validate bit length in bitmap data and a reserved area, which each have a size of four bytes.

The start cluster first PSN is a PSN (physical sector address) indicating a start position of the zone on the disk. That is to say, the PSN is a start address, which is used when the zone is mapped onto the space bitmap.

The start byte position of bitmap data is a byte count indicating the start position of bitmap data for the zone as a position relative to the unallocated space bit map identifier located at the beginning of the space bit map.

The validate bit length in bitmap data is also a byte count representing the amount of bitmap data of the zone.

Actual bitmap data is recorded on sector 1 in an area starting from byte position 0 of the sector. Sector 1 is the second sector of the space bitmap. In this area, one sector of the space bitmap represents 1 GB data. The actual bitmap data is followed by reserved areas ending with an area immediately preceding sector 31, which is the last sector of the space bitmap. The reserved areas are filled with codes of 00h.

Sector 31, which is the last sector of the space bitmap, is used as a sector for recording a TDDS.

The pieces of bitmap information described above are managed as follows. First of all, the description explains a space bitmap with the layer number at byte position 4 indicating layer 0. That is to say, the description explains a space bitmap for a one-layer disk or a space bitmap for layer 0 of a two-layer disk.

In this case, the zone information for the inner zone is information for the inner zone of layer 0, that is, information for a lead-in zone.

The start cluster first PSN of the zone is a PSN of the start position of the lead-in zone as shown by a solid-line arrow.

The start byte position of bitmap data is used for recording information indicating the position of bitmap data corresponding to the lead-in zone in the space bitmap as shown by a dashed-line arrow, that is, information indicating byte position 0 of sector 1.

The value of the validate bit length in bitmap data is the size of the bitmap data for the lead-in zone.

The zone information for the data zone is information on the data zone of layer 0.

The start cluster first PSN of the zone is a PSN of the start position of the data zone as shown by a solid-line arrow.

The start byte position of bit map data is used for recording information indicating the position of bitmap data corresponding to the data zone in the space bitmap as shown by a dashed-line arrow, that is, information indicating byte position 0 of sector 2.

The value of the validate bit length in bitmap data is the size of the bitmap data for the data zone.

The zone information for the outer zone is information for the outer zone of layer 0, that is, information for a lead-out zone on a one-layer disk or outer zone 0 of a two-layer disk.

The start cluster first PSN of the zone is a PSN of the start position of the lead-out zone or outer zone 0 as shown by a solid-line arrow.

The start byte position of bitmap data is used for recording information indicating the position of bitmap data corresponding to the lead-out zone (or outer zone 0) in the space bitmap as shown by a dashed-line arrow, that is, information indicating byte position 0 of sector N.

The value of the validate bit length in bitmap data is the size of the bitmap data for the lead-out zone or outer zone 0.

Next, the description explains a space bitmap with the layer number at byte position 4 indicating layer 1. That is to say, the description explains a space bitmap for layer 1 of a two-layer disk.

In this case, the zone information for the inner zone is information for the inner zone of layer 1, that is, information for a lead-out zone.

The start cluster first PSN of the zone is a PSN of the start position of the lead-out zone as shown by a dotted-line arrow. Since the address direction on layer 1 is a direction from an outer side to an inner side, a position indicated by the dotted-line arrow is a start position.

The start byte position of bit map data is used for recording information indicating the position of bitmap data corresponding to the lead-out zone in the space bitmap as shown by a dashed-line arrow, that is, information indicating byte position 0 of sector 1.

The value of the validate bit length in bitmap data is the size of the bitmap data for the lead-out zone.

The zone information for the data zone is information on the data zone of layer 1.

The start cluster first PSN of the zone is a PSN of the start position of the data zone as shown by a dotted-line arrow.

The start byte position of bitmap data is used for recording information indicating the position of bitmap data corresponding to the data zone in the space bitmap as shown by a dashed-line arrow, that is, information indicating byte position 0 of sector 2.

The value of the validate bit length in bitmap data is the size of the bitmap data for the data zone.

The zone information for the outer zone is information for the outer zone 1 of layer 1.

The start cluster first PSN of the zone is a PSN of the start position of the outer zone 1 as shown by a dotted-line arrow.

The start byte position of bitmap data is used for recording information indicating the position of bitmap data corresponding to outer zone 1 in the space bitmap as shown by a dashed-line arrow. The information is information indicating byte position 0 of sector N.

The value of the validate bit length in bitmap data is the size of the bitmap data for outer zone 1.

Next, the data structure of a TDFL is explained. As described above, a TDFL is recorded in a free area following a space bitmap in a TDMA. Every time an updating operation is carried out, a TDFL is recorded at the beginning of the remaining free area.

FIG. 11 is a diagram showing the data structure of a TDFL.

The TDFL comprises 1 to 4 clusters. By comparing with the DFL shown in FIG. 6, it is obvious that the contents of the TDFL are similar to those of the DFL in that the first 64 bytes of the defect list are used as bytes for recording management information of the defect list, the bytes following the 64$^{th}$ byte are used as bytes for recording contents of pieces of alternate-address information ati each having a length of 8 bytes, and a terminator having a length of 8 bytes serves as an alternate-address end immediately following ati #N, which is the last one of pieces of effective alternate-address information.

However, the TDFL composed of 1 to 4 clusters is different from the DFL in that a DDS (or a TDDS) is recorded in 2,048 bytes composing the last sector of the TDFL.

It is to be noted that, in the case of the TDFL, an area preceding the last sector of a cluster to which the alternate-address information terminator pertains is filled up with codes of 00h. As described above, the last sector is used as a sector for recording a TDDS. If the alternate-address information terminator pertains to the last sector of a specific cluster, an area between the specific cluster and the last sector of a cluster immediately preceding the specific cluster is filled up with codes of 0 and the last sector of the immediately preceding cluster is used as a sector for recording a TDDS.

The defect-list management information having a size of 64 bytes is identical with the defect-list management information explained earlier by referring to FIG. 7 as information included in of the defect list DFL.

However, as the number of times the defect list has been updated, the four bytes starting with a byte at byte position 4 are used as bytes for recording the sequence number of the defect list. That is to say, a sequence number included in defect-list management information in a most recent TDFL is the number of times the defect list has been updated.

Besides, the four bytes starting with a byte at byte position 12 are used as bytes for recording the number of entries, that is, the number of pieces of alternate-address information ati. In addition, the four bytes starting with a byte at byte position 24 are used as bytes for recording values of cluster counts at the time the TDFL is updated. This cluster counts represent the sizes of free areas available in the alternate areas ISA 0, ISA 1, OSA 0 and OSA 1.

The data structure of the alternate-address information ati in the TDFL is similar to the data structure shown in FIG. 8 as the structure of the alternate-address information ati in the DFL. The alternate-address information ati is included in the TDFL as an entry showing an alternate source cluster and an alternate destination cluster, which are involved in an alternate-address process. Such an entry is cataloged in the temporary defect list TDFL having a data structure shown in FIG. 11.

In the case of the TDFL, however, the value of status 1 included in the alternate-address information ati in the TDFL may have a value of 0101 or 1010 in addition to 0000.

Status 1 having a value of 0101 or 1010 indicates that an alternate-address process carried out on a plurality of physically continuous clusters is a burst transfer process, which handles the clusters collectively.

To be more specific, status 1 having a value of 0101 indicates that the start sector physical address of an alternate source cluster and the start sector physical address of an alternate destination cluster, which are included in the alternate-address information ati, are respectively the physical address of the first sector in the first cluster of the physically continuous clusters serving as the alternate source and the physical address of the first sector in the first cluster of the physically continuous clusters serving as the alternate destination.

On the other hand, status 1 having a value of 1010 indicates that the start sector physical address of an alternate source cluster and the start sector physical address of an alternate destination cluster, which are included in the alternate-address information ati are respectively the physical address of the first sector in the last cluster of the physically continuous clusters serving as the alternate source and the physical address of the first sector in the last cluster of the physically continuous clusters serving as the alternate destination.

Thus, in an alternate-address process collectively treating a plurality of physically continuous clusters, it is not necessary to catalog an entry describing the alternate-address information ati for each of all the clusters. Instead, it is necessary to specify only one entry of alternate-address information ati including two physical addresses of first sectors in first clusters and another entry of alternate-address information ati including two physical addresses of first sectors in last clusters as described above.

As described above, basically, the TDFL has a data structure identical with that of a DFL. However, the TDFL is characterized in that the size of the TDFL can be extended to up to four clusters, the last sector is used as a sector for recording a TDDS, and management of burst transfers can be executed by using alternate-address information ati.

As shown in FIG. 9, the TDMA is used as an area for recording space bitmaps and TDFLs. As described earlier, however, the 2,048-byte last sector of each of the space bitmaps and each of the TDFLs is used as a sector for recoding a TDDS (temporary disc definition structure).

FIG. 12 is a diagram showing the structure of the TDDS.

The TDDS occupies one sector having a size of 2,048 bytes. The TDDS has the same contents as the DDS in a DMA. It is to be noted that, even though the DDS has a size of one cluster consisting of 65,536 bytes, only a portion not beyond byte position 52 is virtually defined as contents of the DDS as explained earlier by referring to FIG. 5. That is to say, actual contents are recorded in the first sector of the cluster. Thus, in spite of the fact that the TDDS has a size of only one sector, the TDDS covers all the contents of the DDS.

As is obvious from comparison of FIG. 12 with FIG. 5, contents of the TDDS at byte positions 0 to 53 are identical with those of the DDS. It is to be noted, however, that bytes starting from byte position 4 are used as bytes for recording the sequence number of the TDDS, bytes starting from byte position 16 are used as bytes for recording the physical address of the first sector in a drive area in the TDMA and bytes starting from byte position 24 are used as bytes for recording the physical address AD_DFL of the first sector of the TDFL in the TDMA.

Bytes at byte position 1,024 and subsequent byte positions in the TDDS are used as bytes for recording information, which does not exist in the DDS.

Four bytes starting from byte position 1,024 are used as bytes for recording the physical address LRA of a sector on an outermost circumference included in the user-data area as a circumference on which user data has been recorded.

Four bytes starting from byte position 1,028 are used as bytes for recording the physical address AD_BP0 of the first sector in a most recent space bitmap for layer 0 in the TDMA.

Four bytes starting from byte position 1,032 are used as bytes for recording the physical address AD_BP1 of the first sector in a most recent space bitmap for layer 1 in the TDMA.

One byte at byte position 1,036 is used as a byte for recording a flag for controlling the use of an overwrite function.

Bytes at byte positions other than the byte positions described above are reserved and filled with codes of 00h.

As described above, the TDDS includes addresses in the user-data area, ISA and OSA sizes and spare area full flags. That is to say, the TDDS includes management/control information for managing ISAs and OSAs in the data zone. At this point, the TDDS is similar to the DDS.

Also as described above, the TDDS also includes pieces of information such as the physical address AD_BP0 of the first sector in the effective most recent space bitmap for layer 0, the physical address AD_BP1 of the first sector in the effective most recent space bitmap for layer 1 and the physical address AD_DFL of the first sector in the effective most recent TDFL (temporary DFL).

Since a TDDS is recorded in the last sector of the space bitmap and the last sector of the TDFL every time a space bitmap or a TDFL is added, the recorded TDDS is a new TDDS. Thus, in the TDMA shown in FIG. 9, a TDDS included in a space bitmap added last or a TDDS included in a TDFL added last is the most recent TDDS. In the most recent TDDS, the most recent space bitmap and the most recent TDFL are shown.

3-2: ISAs and OSAs

FIG. 13 is a diagram showing positions of each ISA and each OSA.

An ISA (inner space area) and an OSA (outer space area) are each an area allocated in the data zone as an alternate area used in an alternate-address process carried out on a defective cluster.

In addition, an ISA or an OSA is also used in an operation to write new data into a desired address as an alternate area for actually recording the new data supposed to be written into the desired address, at which other data has been recorded previously. The operation to write the new data into the desired address is thus an operation to renew the other data with the new data.

FIG. 13A is a diagram showing the positions of an ISA and an OSA on a one-layer disk. As shown in the diagram, the ISA is located on the innermost-circumference side of the data zone whereas the OSA is located on the outermost-circumference side of the data zone.

On the other hand, FIG. 13B is a diagram showing the positions of each ISA and each OSA on a two-layer disk. As shown in the diagram, ISA 0 is located on the innermost-circumference side of the data zone on layer 0 whereas the OSA 0 is located on the outermost-circumference side of the data zone on layer 0. On the other hand, ISA 1 is located on the innermost-circumference side of the data zone on layer 1 whereas the OSA 1 is located on the outermost-circumference side of the data zone on layer 1.

On the two-layer disk, the size of ISA 0 may be different from that of ISA 1. However, the size of OSA 0 is equal to that of OSA 1.

The sizes of the ISA (or ISA 0 and ISA 1) and the sizes of the OSA (or OSA 0 and OSA 1) are defined in the DDS and the TDDS, which have been described earlier.

The size of the ISA is determined at an initialization time and remains fixed thereafter. However, the size of the OSA may be changed even after data has been recorded therein. That is to say, the OSA size recorded in the TDDS can be changed in an operation to update the TDDS to increase the size of the OSA.

An alternate-address process using the ISA or the OSA is carried out as follows. An operation to renew data is taken as an example. For example, new data is written into the user-data zone. To be more specific, the data is written into a cluster, in which existing data has already been written previously. That is to say, a request is made as a request to renew the existing data. In this case, since the disk is recognized as a write-once optical disk, the new data cannot be written into the cluster. Thus, the new data is written into a cluster in the ISA or the OSA. This operation is referred to as an alternate-address process.

This alternate-address process is managed as the alternate-address information ati described above. The alternate-address information ati is treated as a TDFL entry including the address of a cluster, in which the existing data has been recorded from the very start, as an alternate source address. The TDFL entry of the alternate-address information ati also includes the address of an ISA or OSA cluster, in which the new data has been written as alternate-address data, as an alternate destination address.

That is to say, in the case of renewal of existing data, alternate-address data is recorded in the ISA or the OSA and the alternate-address process carried out on the data locations for the renewal of the existing data is controlled as alternate-address information ati cataloged on the TDFL in the TDMA. Thus, while the disk is a write-once optical disk, virtually, renewal of data is implemented. In other words, as seen from the OS of a host system, a file system or other systems, renewal of data is implemented.

The alternate-address process can also be applied to management of defects in the same way. To put it in detail, if a cluster is determined to be a defective area, by carrying out the alternate-address process, data supposed to be written in the cluster is written in a cluster of the ISA or the OSA. Then, for the management of this alternate-address process, one alternate-address information ati is cataloged as an entry on the TDFL.

3-3: TDMA-Using Method

As described above, every time data is renewed or an alternate-address process is carried out, a space bitmap and a TDFL in a TDMA are updated.

FIG. 14 is a diagram showing the state of updating contents of a TDMA.

FIG. 14A shows a state in which a space bitmap for layer 0, a space bitmap for layer 1 and a TDFL have been recorded in the TDMA.

As described above, the last sector of each of the space bitmaps and the last sector of the TDFL are each used for recording a TDDS (temporary DDS). They are referred to as TDDS 1, TDDS 2 and TDDS 3.

In the case of the state shown in FIG. 14A, the TDFL is related to most recently written data. Thus, TDDS 3 recorded in the last sector of the TDFL is the most recent TDDS.

As explained earlier by referring to FIG. 12, this TDDS includes AD BP0, AD BP1 and AD DFL. AD BP0 and AD BP1 are information showing the locations of effective most recent space bitmaps. On the other hand, AD DFL is information showing the location of an effective most recent TDFL. In the case of TDDS 3, AD BP0, AD BP1 and AD DFL are pieces of effective information pointing to the locations of the space bitmaps and the TDFL as shown by a solid-line arrow, a dashed-line arrow and a dotted-line arrow respectively. That is to say, AD DFL in TDDS 3 is used as an address for specifying a TDFL including TDDS 3 itself as an effective TDFL. On the other hand, AD BP0 and AD BP1 in TDDS 3 are used as addresses for specifying space bitmaps for layers 0 and 1 respectively as effective space bitmaps.

Later on, data is written and, since the space bitmap for layer 0 is updated, a new space bitmap for layer 0 is added to the TDMA. As shown in FIG. 14B, the new space bitmap is recorded at the beginning of a free area. In this case, TDDS 4 recorded in the last sector of the new space bitmap becomes the most recent TDDS. AD BP0, AD BP1 and AD DFL in TDDS 4 are used as addresses for specifying pieces of effective information.

To be more specific, AD BP0 in TDDS 4 is used as an address for specifying a space bitmap for layer 0 as a space bitmap, which includes TDDS 4 itself and serves as effective information. Much like the state shown in FIG. 14A, AD BP1 in TDDS 4 is used as an address for specifying a space bitmap for layer 1 as effective information, and AD DFL in TDDS 4 is used as an address for specifying a TDFL as an effective TDFL.

Later on, data is written again and, since the space bitmap for layer 0 is updated, a new space bitmap for layer 0 is added to the TDMA. As shown in FIG. 14C, the new space bitmap is recorded at the beginning of the free area. In this case, TDDS 5 recorded in the last sector of the new space bitmap becomes the most recent TDDS. AD BP0, AD BP1 and AD DFL in TDDS 5 are used as addresses for specifying pieces of effective information.

To be more specific, AD BP0 in TDDS 4 is used as an address for specifying a space bitmap for layer 0 as a space bitmap, which includes TDDS 4 itself and serves as effective information. Much like the state shown in FIGS. 14A and 14B, AD BP1 is used as an address for specifying a space bitmap for layer 1 as effective information, and AD DFL is used as an address for specifying a TDFL as an effective TDFL.

As described above, when a TDFL and/or a space bitmap are updated, a TDDS recorded in the last sector of the most recent information includes addresses indicating effective information such as space bitmaps and a TDFL, which are included in the TDMA. The effective information is defined as the most recent space bitmaps and the most recent TDFL, which are cataloged in the TDMA before a finalize process.

Thus, the disk drive is capable of grasping an effective TDFL and effective space bitmaps by referring to a TDDS included in a last recorded TDFL or a last recorded space bitmap recorded in the TDMA.

By the way, FIG. 14 is a diagram showing the state of updating contents of a TDMA for a two-layer disk. That is to say, the TDMA includes a space bitmap for layer 0 and a space bitmap for layer 1.

The two space bitmaps and the TDFL are initially cataloged in the TDMA for layer 0. That is to say, only the TDMA for layer 0 is used and, every time a TDFL and/or a space bitmap are updated, the new TDFL and/or the new space bitmap are added to the TDMA as shown in FIG. 14.

The TDMA for layer 1 as the second layer is used after the TDMA for layer 0 has been all used up.

Then, the TDMA for layer 1 is also used for cataloging TDFLs and/or space bitmaps one after another by starting from the beginning of the TDMA.

FIG. 15 is a diagram showing a state in which the TDMA for layer 0 is all used up after recording a TDFL or a space bitmap N times. Then, a TDFL or a space bitmap is cataloged continuously in the TDMA provided for layer 1 to serve as a continuation of the TDMA provided for layer 0 as shown in FIG. 14C.

In the state shown in FIG. 15, after the TDMA for layer 0 has been used up, two space bitmaps for layer 1 are further cataloged in the TDMA for layer 1. In this state, TDDS N+2 recorded in the last sector of the most recent space bitmap for layer 1 is the most recent TDDS. Much like the state shown in FIG. 14, in the most recent TDDS, AD BP0, AD BP1 and AD DFL point to pieces of effective information as shown by a solid-line arrow, a dashed-line arrow and a dotted-line arrow respectively. That is to say, AD BP1 in TDDS N+2 is used as an address for specifying a space bitmap for layer 1 as a space bitmap, which includes TDDS N+2 itself and serves as effective information. On the other hand, AD BP0 in TDDS N+2 is used as an address for specifying a space bitmap for layer 0, that is, the same space bitmap as that shown in FIG. 14C, and AD DFL in TDDS N+2 is used as an address for specifying a TDFL as effective information or most recently updated information.

It is needless to say that, if the TDFL, the space bitmap for layer 0 or the space bitmap for layer 1 is updated thereafter, the updated TDFL or space bitmap is cataloged at the beginning of a free area in the TDMA for layer 1.

As described above, the TDMAs for recording layers 0 and 1 are used one after another for cataloging updated TDFLs and space bitmaps. Thus, the TDMAs for the recording layers can be used jointly as a large single TDMA. As a result, a plurality of DMAs can be utilized with a high degree of efficiency.

In addition, by searching only a TDDS recorded last without regard to whether the TDMA is provided for layer 0 or 1, an effective TDFL and/or space bitmap can be grasped.

In this embodiment, a one-layer disk and a two-layer disk are assumed as described above. It is to be noted, however, that a disk having three or more recording layers is also conceivable. Also in the case of a disk having three or more recording layers, the TDMAs for the layers can be used one after another in the same way.

4: Disk Drive

The following description explains a recording/reproduction apparatus serving as a disk drive for the write-once optical disks described above.

The disk drive provided by the embodiment is capable of forming a layout of a write-once optical disk in a state explained earlier by referring to FIG. 1 by formatting the disk in a state wherein, typically, only the prerecorded information area PIC shown in FIG. 1 has been created but no write-once area has been formed. In addition, the disk drive records data into the user-data area of the disk formatted in this way and reproduces data from the user-data. If necessary, the disk drives also updates a TDMA by recording information therein and records data into an ISA or an OSA.

Figure 16:
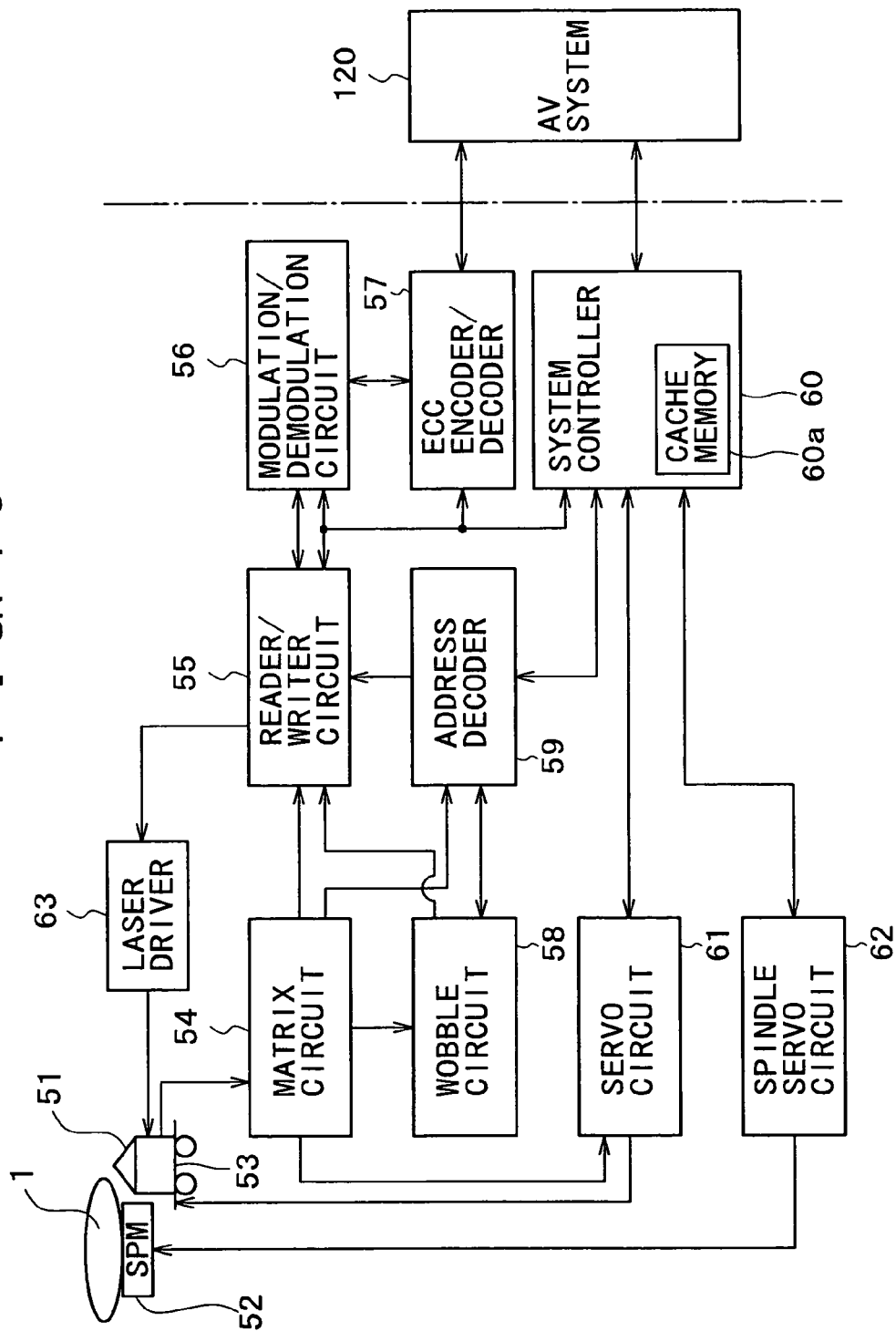
FIG. 16 is a block diagram of a disk drive provided by the embodiment.

FIG. 16 is a diagram showing the configuration of the disk drive.

A disk 1 is the write-once optical disk described above. The disk 1 is mounted on a turntable not shown in the figure.

In a recording/reproduction operation, the turntable is driven into rotation at a CLV (constant linear velocity) by a spindle motor 52.

An optical pickup (optical head) 51 reads out ADIP addresses embedded on the disk 1 as a wobbling shape of a groove track and management/control information as information prerecorded on the disk 1.

At an initialization/formatting time or in an operation to record user data onto the disk 1, the optical pickup 51 records management/control information and user data onto a track in a write-once area. In a reproduction operation, on the other hand, the optical pickup 51 reads out data recorded on the disk 1.

The optical pickup 51 includes a laser diode, a photo detector, an objective lens and an optical system, which are not shown in the figure. The laser diode is a device serving as a source for generating a laser beam. The photo detector is a component for detecting a beam reflected by the disk 1. The objective lens is a component serving as an output terminal of the laser beam. The optical system is a component for radiating the laser beam to a recording face of the disk 1 by way of the objective lens and leading the reflected beam to the photo detector.

In the optical pickup 51, the objective lens is held by a biaxial mechanism in such a way that the mechanism is capable of moving the objective lens in tracking and focus directions.

In addition, the entire optical pickup 51 can be moved in the radial direction of the disk 1 by a thread mechanism 53.

The laser diode included in the optical pickup 51 is driven to emit a laser beam by a drive current generated by a laser driver 63 as a drive signal.

The photo detector employed in the optical pickup 51 detects information conveyed by a beam reflected by the disk 1, converts the detected information into an electrical signal proportional to the light intensity of the reflected beam and supplies the electrical signal to a matrix circuit 54.

The matrix circuit 54 has a current/voltage conversion circuit, which is used for converting a current output by the photo detector comprising a plurality of light-sensitive devices into a voltage, and a matrix processing/amplification circuit for carrying out matrix processing to generate necessary signals. The necessary signals include a high-frequency signal (or a reproduced-data signal) representing reproduced data as well as a focus error signal and a tracking error signal, which are used for servo control.

In addition, a push-pull signal is also generated as a signal related to wobbling of the groove. The signal related to wobbling of the groove is a signal for detecting the wobbling of the groove.

It is to be noted that the matrix circuit 54 may be physically integrated inside the optical pickup 51.

The reproduced-data signal output by the matrix circuit 54 is supplied to a reader/writer circuit 55. The focus error signal and the tracking error signal, which are also generated by the matrix circuit 54, are supplied to a servo circuit 61. The push-pull signal generated by the matrix circuit 54 is supplied to a wobble circuit 58.

The reader/writer circuit 55 is a circuit for carrying out processing such as a binary conversion process on the reproduced-data signal and a process to generate a reproduction clock signal by adopting a PLL technique to generate data read out by the optical pickup 51. The generated data is then supplied to a modulation/demodulation circuit 56.

The modulation/demodulation circuit 56 comprises a functional member serving as a decoder in a reproduction process and a functional member serving as an encoder in a recording process.

In a reproduction process, the modulation/demodulation circuit 56 implements demodulation process for run-length limited code as decoding process on the basis of the reproduction clock signal.

An ECC encoder/decoder 57 is a component for carrying out an ECC encoding process to add error correction codes to data to be recorded onto the disk 1 and an ECC decoding process for correcting errors included in data reproduced from the disk 1.

At a reproduction time, data demodulated by the modulation/demodulation circuit 56 is stored in an internal memory to be subjected to error detection/correction processing and processing such as a de-interleave process to generate the eventual reproduced data.

The reproduced data obtained as a result of a decoding process carried out by the ECC encoder/decoder 57 is read out from the internal memory and transferred to an apparatus connected to the disk drive in accordance with a command given by a system controller 60. An example of the apparatus connected to the disk drive is an AV (Audio-Visual) system 120.

As described above, the push-pull signal output by the matrix circuit 54 as a signal related to the wobbling state of the groove is processed in the wobble circuit 58. The push-pull signal conveying ADIP information is demodulated in the wobble circuit 58 into a data stream composing ADIP addresses. The wobble circuit 58 then supplies the data stream to an address decoder 59.

The address decoder 59 decodes the data received thereby to generate addresses and then supplies the addresses to the system controller 60.

The address decoder 59 also generates a clock signal by carrying out a PLL process using the wobble signal supplied by the wobble circuit 58 and supplies the clock signal to other components for example as a recording-time encode clock signal.

The push-pull signal output by the matrix circuit 54 as a signal related to the wobbling state of the groove is a signal originated from the prerecorded information PIC. In the wobble circuit 58, the push-pull signal is subjected to a band-pass filter process before being supplied to the reader/writer circuit 55, which carries out a binary conversion process to generate a data bit stream. The data bit stream is then supplied to the ECC encoder/decoder 57 for carrying out ECC-decode and de-interleave processes to extract data representing the prerecorded information. The extracted prerecorded information is then supplied to the system controller 60.

On the basis of the fetched prerecorded information, the system controller 60 is capable of carrying out processes such as processing to set a variety of operations and copy protect processing.

At a recording time, data to be recorded is received from the AV system 120. The data to be recorded is buffered in a memory employed in the ECC encoder/decoder 57.

In this case, the ECC encoder/decoder 57 carries out processes on the buffered data to be recorded. The processes include processing to add error correction codes, interleave processing and processing to add sub-codes.

The data completing the ECC encoding process is subjected to a demodulation process such as demodulation adopting an RLL (1-7) PP method in the modulation/demodulation circuit 56 before being supplied to the reader/writer circuit 55.

In these encoding processes carried out at a recording time, the clock signal generated from the wobble signal as described above is used as the encoding clock signal, which serves as a reference signal.

After completing these encoding processes, the data to be recorded is supplied to the reader/writer circuit 55 to be subjected to recording compensation processing such as fine adjustment of a recording power to produce a power value optimum for factors including characteristics of the recording layer, the spot shape of the laser beam and the recording linear speed as well as adjustment of the shape of the laser drive pulse. After completing the recording compensation processing, the data to be recorded is supplied to the laser driver 63 as laser drive pulses.

The laser driver 63 passes on the laser drive pulses to the laser diode employed in the optical pickup 51 to drive the generation of a laser beam from the diode. In this way, pits suitable for the recorded data are created on the disk 1.

It is to be noted that the laser driver 63 includes the so-called APC (Auto Power Control) circuit for controlling the laser output to a fixed value independent of ambient conditions such as the ambient temperature by monitoring the laser output power. A detector is provided in the optical pickup 51 to serve as a monitor for monitoring the laser output power. The system controller 60 gives a target value of the laser output power for each of recording and reproduction processes. The level of the laser output is controlled to the target value for the recording or reproduction process.

The servo circuit 61 generates a variety of servo drive signals from the focus error signal and the tracking error signal, which are received from the matrix circuit 54, to carry out servo operations. The servo drive signals include focus, tracking and thread servo drive signals.

To put it concretely, the focus and tracking drive signals are generated in accordance with the focus error signal and the tracking error signal respectively to drive respectively focus and tracking coils of the biaxial mechanism employed in the optical pickup 51. Thus, tracking and focus servo loops are created as loops comprising the optical pickup 51, the matrix circuit 54, the servo circuit 61 and the biaxial mechanism.

In addition, in accordance with a track jump command received from the system controller 60, the servo circuit 61 turns off the tracking servo loop and carries out a track jump operation by outputting a jump drive signal.

On top of that, the servo circuit 61 generates a thread drive signal on the basis of a thread error signal and an access execution control signal, which is received from the system controller 60, to drive the thread mechanism 53. The thread error signal is obtained as a low-frequency component of the tracking error signal. The thread mechanism 53 has a mechanism comprising a transmission gear, a thread motor and a main shaft for holding the optical pickup 51. The thread mechanism 53 drives the thread motor in accordance with the thread drive signal to slide the optical pickup 51 by a required distance. It is to be noted that the mechanism itself is not shown in the figure.

A spindle servo circuit 62 controls the spindle motor 52 to rotate at a CLV.

The spindle servo circuit 62 obtains a clock signal generated in a PLL process for the wobble signal as information on the present rotational speed of the spindle motor 52 and compares the present rotational speed with a predetermined CLV reference speed to generate a spindle error signal.

In addition, a reproduction clock signal generated at a data reproduction time by a PLL circuit employed in the reader/writer circuit 55 is used as the reference clock signal of a decoding process as well as the information on the present rotational speed of the spindle motor 52. Thus, by comparing this reproduction clock signal with the predetermined CLV reference speed, a spindle error signal can be generated.

Then, the spindle servo circuit 62 outputs the spindle drive signal, which is generated in accordance with the spindle error signal, to carry out the CLV rotation of the spindle motor 52.

In addition, the spindle servo circuit 62 also generates a spindle drive signal in accordance with a spindle kick/brake control signal received from the system controller 60 to carry out operations to start, stop, accelerate and decelerate the spindle motor 52.

A variety of operations carried out by the servo system and the recording/reproduction system as described above are controlled by the system controller 60 based on a microcomputer.

The system controller 60 carries out various kinds of processing in accordance with commands received from the AV system 120.

When a write instruction (or a command to write data) is received from the AV system 120, for example, the system controller 60 first of all moves the optical pickup 51 to an address into which the data is to be written. Then, the ECC encoder/decoder 57 and the modulation/demodulation circuit 56 carry out the encoding processes described above on the data received from the AV system 120. Examples of the data are video and audio data generated in accordance with a variety of methods such as MPEG2. Subsequently, as described above, the reader/writer circuit 55 supplies laser drive pulses representing the data to the laser driver 63 in order to actually record the data on the disk 1.

On the other hand, when a read command to read out data such as MPEG2 video data from the disk 1 is received from the AV system 120, for example, the system controller 60 first of all carries out a seek operation to move the optical pickup 51 to a target address at which the data is to be read out from the disk 1. That is to say, the system controller 60 outputs a seek command to the servo circuit 61 to drive the optical pickup 51 to make an access to a target address specified in the seek command.

Thereafter, necessary control of operations is executed to transfer data of a specified segment to the AV system 120. That is to say, the data is read out from the disk 1, processing such as the decoding and buffering processes is carried out in the reader/writer circuit 55, the modulation/demodulation circuit 56 and the ECC encoder/decoder 57, and the requested data is transferred to the AV system 120.

It is to be noted that, in the operations to record data into the disk 1 and reproduce data from the disk 1, the system controller 60 is capable of controlling accesses to the disk 1 and the recording/reproduction operations by using ADIP addresses detected by the wobble circuit 58 and the address decoder 59.

In addition, at predetermined points of time such as the time the disk 1 is mounted on the disk drive, the system controller 60 reads out a unique ID from the BCA on the disk 1 in case the BCA exists on the disk 1 and prerecorded information (PIC) recorded on the disk 1 as a wobbling groove from the reproduction-only area.

In this case, control of seek operations is executed with the BCA and the prerecorded data zone PR set as targets of the seek operations. That is to say, commands are issued to the servo circuit 61 to make accesses by using the optical pickup 51 to the innermost-circumference side of the disk 1.

Later on, the optical pickup 51 is driven to carry out reproduction tracing to obtain a push-pull signal as information conveyed by a reflected beam. Then, decoding processes are carried out in the wobble circuit 58, reader/writer circuit 55 and ECC encoder/decoder 57 to generate BCA information and prerecorded information as reproduced data.

On the basis of the BCA information and the prerecorded information, which are read out from the disk 1 as described above, the system controller 60 carries out processing such as a process to set laser powers and a copy protect process.

In the configuration shown in FIG. 16, a cache memory 60a is employed in the system controller 60. The cache memory 60a is used for holding typically a TDFL and/or a space bitmap, which are read out from the TDMA recorded on the disk 1, so that the TDFL and/or the space bitmap can be updated without making an access to the disk 1.

When the disk 1 is mounted on the disk drive, for example, the system controller 60 controls components of the disk drive to read out a TDFL and/or a space bitmap from the TDMA recorded on the disk 1 and store them in the cache memory 60a.

Later on, when an alternate-address process is carried out to renew data or due to a defect, the TDFL or the space bitmap stored in the cache memory 60a is updated.

Every time an alternate-address process is carried out to write or renew data in the disk 1 and the TDFL or the space bitmap is updated, for example, the updated TDFL or space bitmap can be additionally cataloged in the TDMA recorded on the disk 1. By doing so, however, the TDMA recorded on the disk 1 will be used up at an early time.

In order to solve this problem, only the TDFL or the space bitmap stored in the cache memory 60a is updated till the disk 1 is ejected from the disk drive. As the disk 1 is ejected from the disk drive, for example, the last (most recent) TDFL or space bitmap stored in the cache memory 60a is transferred to the TDMA recorded on the disk 1. In this way, the TDMA recorded on the disk 1 is updated only after the TDFL and/or the space bitmap, which are stored in the cache memory 60a, has been updated a large number of times so that the amount of the TDMA consumption can be reduced.

The explanation given thereafter is based on a method to reduce the amount of consumption of the TDMA recorded on the disk 1 by using the cache memory 60a in processing such as a recording process to be described later. It is needless to say, nevertheless, that the present invention can be implemented without the cache memory 60a. Without the cache memory 60a, however, every time a TDFL or a space bitmap is updated, the updated TDFL or the updated space bitmap must be cataloged in the TDMA recorded on the disk 1.

By the way, the typical configuration of the disk drive shown in FIG. 16 is the configuration of a disk drive connected to the AV system 120. However, the disk drive provided by the present invention can be connected to an apparatus such as a personal computer.

In addition, the disk drive may be designed into a configuration that cannot be connected to an apparatus. In this case, unlike the configuration shown in FIG. 16, the disk drive includes an operation unit and a display unit or an interface member for inputting and outputting data. That is to say, data is recorded onto a disk and reproduced from the disk in accordance with an operation carried out by the user, and a terminal is required as a terminal for inputting and outputting the data.

Of course, other typical configurations are conceivable. For example, the disk drive can be designed as a recording-only apparatus or a reproduction-only apparatus.

5: Operations for the First TDMA Method 5-1: Data Writing

By referring to flowcharts shown in FIGS. 17 to 20, the following description explains processing carried out by the system controller 60 in a process to record data onto the disk 1 mounted on the disk drive.

It is to be noted that, at the time the data-writing process explained below is carried out, the disk 1 has already been mounted on the disk drive, and a TDFL as well as a space bitmap have been transferred from a TDMA on the disk 1 mounted on the disk drive to the cache memory 60a.

In addition, when a request for a write operation or a read operation is received from a host apparatus such as the AV system 120, the target address is specified in the request as a logical sector address. The disk drive carries out logical/physical address conversion processing to convert the logical sector address into a physical sector address but the description of the conversion process for each request from time to time is omitted.

It is to be noted that, in order to convert a logical sector address specified by a host into a physical sector address, it is necessary to add 'the physical address of the first sector in a user-data area' recorded in the TDDS to the logical sector address.

Assume that a request to write data into address N has been received from a host apparatus such as the AV system 120 by the system controller 60. In this case, the system controller 60 starts processing represented by the flowchart shown in FIG. 17. First of all, at a step F101, a space bitmap stored in the cache memory 60a is referred to in order to determine whether or not data has been recorded in a cluster at the specified address. The space bitmap stored in the cache memory 60a is a space bitmap updated most recently.

Figure 18:
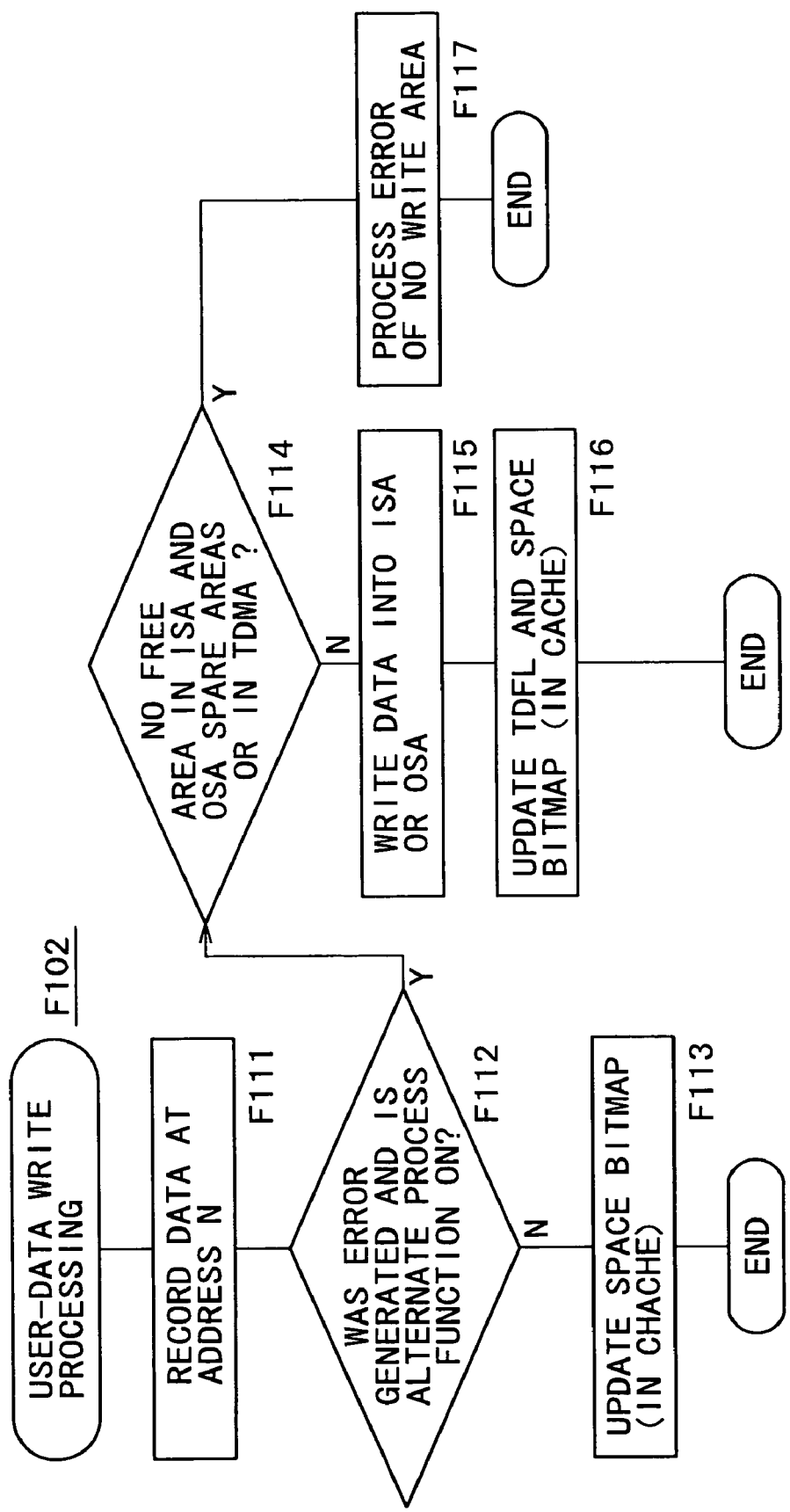
FIG. 18 shows a flowchart representing a user-data-writing process provided by the embodiment.

If no data has been recorded at the specified address, the flow of the processing goes on to a step F102 to carry out a process to write user data into the address as represented by the flowchart shown in FIG. 18.

Figure 19:
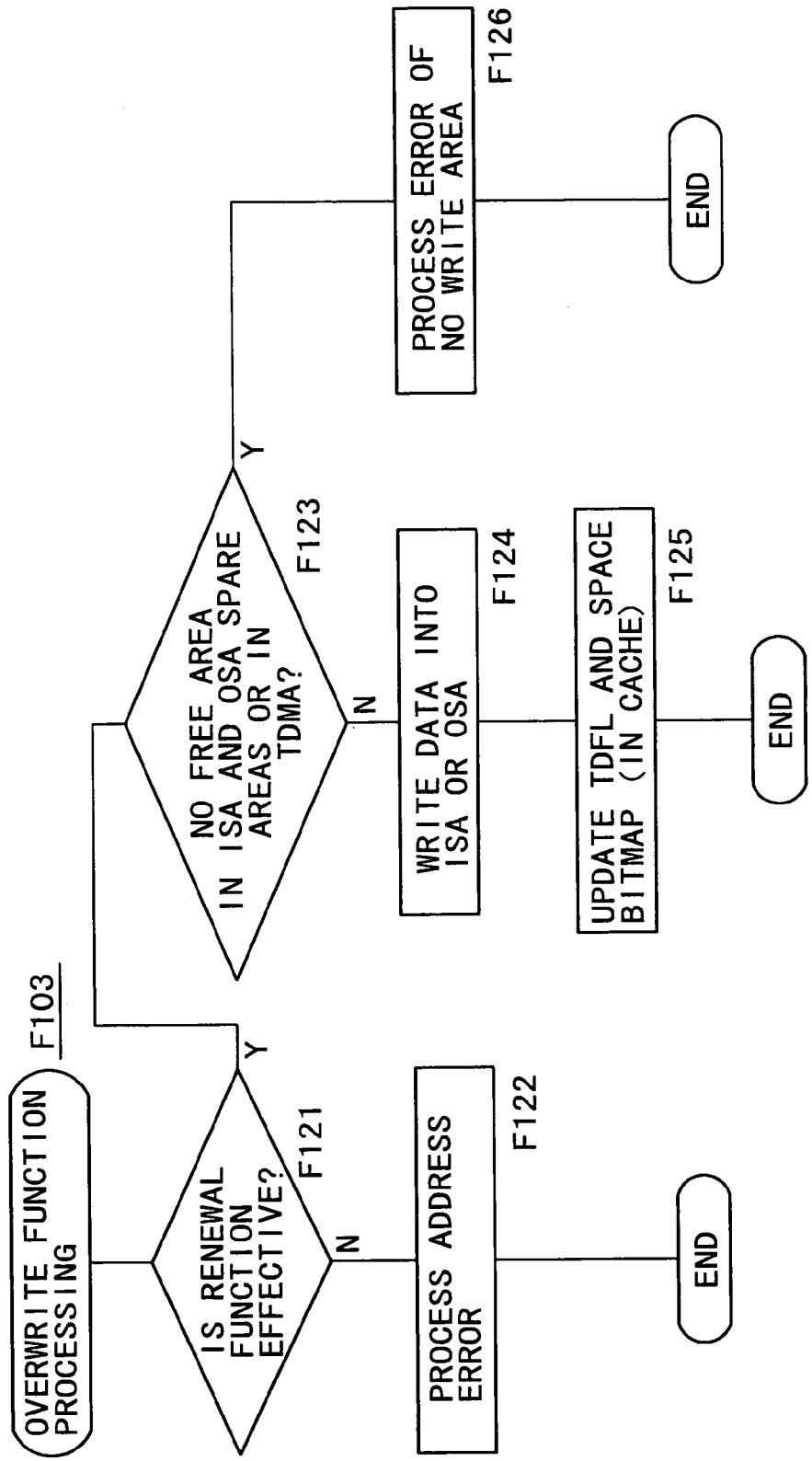
FIG. 19 shows a flowchart representing an overwrite function process provided by the embodiment.

If data has already been recorded at the specified address so that the process to write the data of this time can not be implemented, on the other hand, the flow of the processing goes on to a step F103 to carry out an overwrite process represented by the flowchart shown in FIG. 19.

The process to write user data into the address as represented by the flowchart shown in FIG. 18 is a process requested by a command to write the data into the address at which no data has been recorded. Thus, the process to write user data into the address as represented by the flowchart shown in FIG. 18 is an ordinary write process. If an error is generated in the course of the write process due to a defect such as an injury on the disk 1, however, an alternate-address process may be carried out in some cases.

First of all, at a step F111, the system controller 60 executes control to write the data into the specified address. That is to say, the optical pickup 51 is driven to make an access to the specified address and record the data of the write request into the address.

If the operation to write the data into the address is completed normally, the flow of the processing goes on from the step F112 to the step F113 at which the space bitmap stored in the cache memory 60a is updated. To put it in detail, the space bitmap is searched for a bit corresponding to a cluster in which the data has been written this time, and the bit is set to a value indicating that data has been written into the cluster. Then, the execution of the processing for the write request is ended.

If the operation carried out at the step F111 to write the data into the address is not completed normally and an alternate-address process function is in an on state, on the other hand, the flow of the processing goes on from the step F112 to the step F114.

It is to be noted that the step F112 is executed also to determine whether or not the alternate-address process function is in an on state by checking whether or not an ISA and/or an OSA have been defined. If at least either an ISA or an OSA has been defined, an alternate-address process can be carried out. In this case, the alternate-address process function is determined to be in an on state.

An ISA or an OSA is determined to have been defined if the size of the ISA or the OSA in the TDDS of the TDMA has been set at a value other than a zero. That is to say, at a formatting time of the disk 1, at least either an ISA or an OSA is defined as an actually existing alternate area by specifying its size at a value other than a zero in a TDDS and recording the TDDS in the first TDMA. As an alternative, for example, an OSA can be redefined by setting its size at a value other than a zero in an operation to update a TDDS in a TDMA.

After all, if at least either an ISA or an OSA exists, the alternate-address process function is determined to be in an on state. In this case, the flow of the processing goes on to the step S114.

If the determination result obtained at the step F112 indicates that neither an ISA nor an OSA exists, indicating that the alternate-address process function has been made ineffective, on the other hand, the flow of the processing goes on to the step S113. It is to be noted that, at this step, the space bitmap stored in the cache memory 60a is searched for a bit corresponding to a cluster at the specified address and the bit is set at a value indicating that data has been recorded in the cluster. Then, the execution of the processing is ended. In this case, however, the write request is ended in an error.

In spite of the fact that a write error has been generated, at the bit in the space bitmap, a flag indicating that data has been recorded in the cluster corresponding to the bit is set in the same way as a normal termination of the processing. The setting of the flag means that the defective area is managed by using the space bitmap as a cluster in which data has been recorded. Thus, even if a request is received as a request to write data into the defective area, in which the error has been generated, by referring to the space bitmap, the processing of the request can be carried out with a high degree of efficiency.

As described above, if the alternate-address process function is determined at the step F112 to be in an on state, the flow of the processing goes on to the step F114, first of all, to determine whether or not the alternate-address process can be actually carried out.

In order to carry out the alternate-address process, the spare area, that is, either the ISA or the OSA, must have a free area for at least recording the data requested in the write operation. In addition, the TDMA must have a margin allowing an entry of the alternate-address information ati for managing this alternate-address process to be added, that is, allowing the TDFL to be updated.

It is possible to determine whether or not the ISA or the OSA has such a free area by checking the number of unused ISA/OSA clusters included in the defect-list management information shown in FIG. 7. As described earlier, the defect-list management information is included in a TDFL as shown in FIG. 11.

If at least either the ISA or the OSA has a free area and the TDMA has a margin for update, the flow of the processing carried out by the system controller 60 goes on from the step F114 to a step F115 at which the optical pickup 51 is driven to make an access to the ISA or the OSA and record the data requested in the write operation into the free area in the ISA or the OSA respectively.

Then, at the next step F116, after the write operation requiring the alternate-address process, the TDFL and the space bitmap, which have been stored in the cache memory 60a, are updated.

To put it in detail, the contents of the TDFL are updated by newly adding an entry of the alternate-address information ati representing the present alternate-address process as shown in FIG. 8 to the TDFL. In addition, in accordance with the addition of such an entry, the number of cataloged DFL entries in the defect-list management information shown in FIG. 7 is increased while the number of unused ISA/OSA clusters in the defect-list management information shown in FIG. 7 is decreased. If the alternate-address process is carried out on one cluster, the number of cataloged DFL entries is incremented by one while the number of unused ISA/OSA clusters is decremented by one. It is to be noted that a process to generate the alternate-address information ati will be described later.

In addition, a bit included in the space bitmap as a bit corresponding to a cluster at the address, at which an error of the requested write operation has been generated, is set at a value indicating that data has been recorded in the cluster. By the same token, a bit included in the space bitmap as a bit corresponding to an ISA or OSA cluster, in which the data has been actually recorded, is set at a value indicating that data has been recorded in the cluster.

Then, the execution of the processing of the write request is ended. In this case, however, a write error has been generated at the address specified in the write request, by carrying out the alternate-address process, the write operation can be completed. From the standpoint of the host apparatus, the processing of the write is ended normally.

If the determination result obtained at the step F114 indicates that neither the ISA nor the OSA has a free area or the TDMA does not have a margin for TDFL to be updated, the flow of the processing carried out by the system controller 60 goes on to a step F117 at which an error report is returned to the host apparatus and the execution of the processing is ended.

Figure 17:
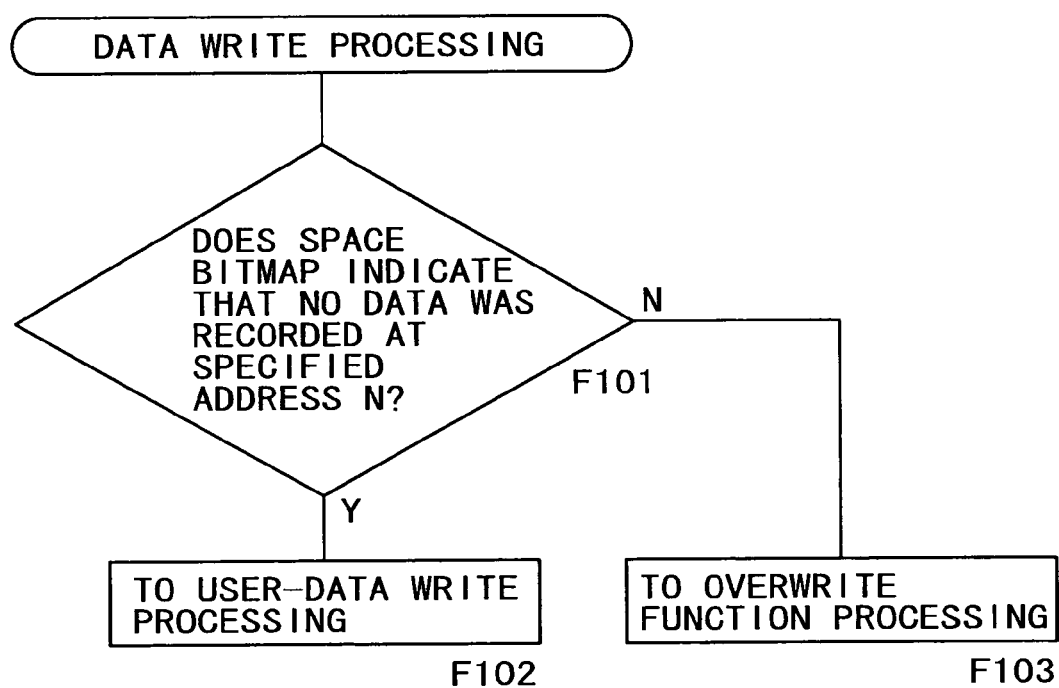
FIG. 17 shows a flowchart representing a data-writing process provided by the embodiment.

If the determination result obtained at the step F101 of the flowchart shown in FIG. 17 indicates that data has already been recorded at the address specified in the write request made by the host apparatus as evidenced by the fact that a bit included in the space bitmap as a bit corresponding to a cluster at the address has been set at a value indicating that data has been recorded in the cluster, the flow of the processing goes on to the step F103 as described earlier. At this step, the overwrite function process represented by the flowchart shown in FIG. 19 is carried out.

The flowchart begins with a step F121 at which the system controller 60 determines whether or not the overwrite function or the data renewal function is effective. The system controller 60 is capable of determining whether or not the overwrite function is effective by referring to a flag included in the TDDS shown in FIG. 12 as a flag indicating whether or not the overwrite function is usable.

If the flag indicating whether or not the overwrite function is usable is not set at 1 indicating that the function is not effective, the flow of the processing goes on to a step F122 at which an error report indicating incorrect specification of the address is returned to the host apparatus and the execution of the processing is ended.

If the flag indicating whether or not the overwrite function is usable is set at 1 indicating that the data renewal function is effective, on the other hand, the processing of the data renewal function is started.

In this case, the flow of the processing goes on to a step F123 first of all to determine whether or not the alternate-address process can be carried out. As described above, in order to carry out the alternate-address process, the spare area, that is, either the ISA or the OSA, must have a free area for at least recording the data requested in the write operation and, in addition, the TDMA must have a margin allowing an entry of the alternate-address information ati for managing this alternate-address process to be added, that is, allowing the TDFL to be updated.

If at least either the ISA or the OSA has a free area and the TDMA has a margin allowing an entry of the alternate-address information ati for managing this alternate-address process to be added, the flow of the processing carried out by the system controller 60 goes on from the step F123 to a step F124 at which the optical pickup 51 is driven to make an access to the ISA or the OSA and record the data requested in the write operation into the free area in the ISA or the OSA respectively.

Then, at the next step F125, after the write operation requiring execution of the alternate-address process, the TDFL and the space bitmap, which have been stored in the cache memory 60a, are updated. To put it in detail, the contents of the TDFL are updated by newly adding an entry of the alternate-address information ati representing the present alternate-address process as shown in FIG. 8 to the TDFL.

However, data at the same address may have been renewed before and an entry of the alternate-address information ati representing the alternate-address process for the renewal has thus been cataloged on the TDFL. In such a case, first of all, all pieces of alternate-address information ati cataloged in the TDFL are searched for an entry including the address as an alternate source address. If alternate-address information ati has been cataloged in the TDFL as an entry including the address as an alternate source address, the alternate destination address included in the alternate-address information ati is changed to the address in the ISA or the OSA. Since the TDFL containing such alternate-address information ati as an entry has been stored in the cache memory 60a at the present point of time, the change of the alternate destination address of the alternate-address information ati can made with ease. It is to be noted that, without the cache memory 60a, every time the TDFL recorded on the disk 1 is updated, the already cataloged entry must be deleted from the TDFL before adding a new entry to the TDFL.

If a new entry of the alternate-address information ati is added to the TDFL, the number of cataloged DFL entries in the defect-list management information shown in FIG. 7 is increased while the number of unused ISA/OSA clusters in the defect-list management information shown in FIG. 7 is decreased.

In addition, a bit included in the space bitmap as a bit corresponding to an ISA or OSA cluster, in which the data has been actually recorded, is set at a value indicating that data has been recorded in the cluster.

Then, the execution of the processing of the write request is ended. By carrying out the processing to use the ISA or the OSA as described above, the system controller 60 is capable of coping with a data renewal request, which is a request to write data into an address at which data has been recorded.

If the determination result obtained at the step F123 indicates that neither the ISA nor the OSA has a free area or the TDMA does not have a margin allowing an entry of the alternate-address information ati for managing this alternate-address process to be added, on the other hand, the flow of the processing carried out by the system controller 60 goes on to a step F126 at which an error report indicating no free write area is returned to the host apparatus and the execution of the processing is ended.

Figure 20:
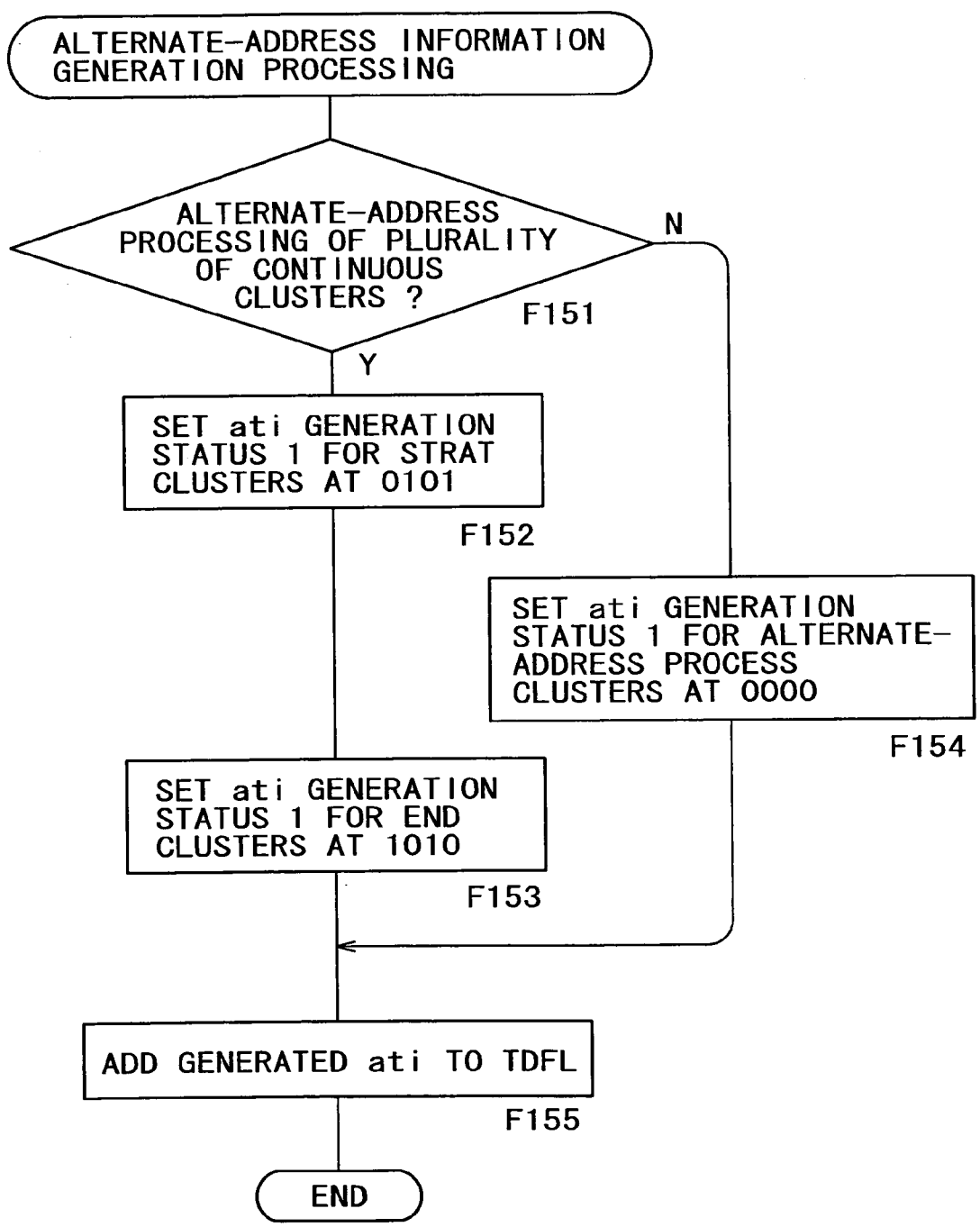
FIG. 20 shows a flowchart representing a process of generating alternate-address information in accordance with by the embodiment.

By the way, at the step F116 of the flowchart shown in FIG. 18 and the step F125 of the flowchart shown in FIG. 19, alternate-address information ati is newly generated for the alternate-address process by the system controller 60 in processing represented by the flowchart shown in FIG. 20.

The flowchart shown in FIG. 20 begins with a step F151 to determine whether or not the alternate-address process is a process carried out on a plurality of physically continuous clusters.

If the alternate-address process is a process carried out on a cluster or a plurality of physically discontinuous clusters, the flow of the processing goes on to a step F154 at which alternate-address information ati is generated for the cluster or each of the physically discontinuous clusters. In this case, status 1 of the data structure shown in FIG. 8 is set at 0000 for each alternate-address information ati as is the case with the normal alternate-address process. Then, at the next step F155, each alternate-address information ati generated in this way is added to the TDFL.

If the alternate-address process is a process carried out on a plurality of physically continuous alternate source and alternate destination clusters, on the other hand, the flow of the processing goes on to a step F152 at which, first of all, alternate-address information ati is generated for clusters at the beginnings of the alternate source and alternate destination clusters, and status 1 of the alternate-address information ati is set at 0101. Then, at the next step F153, alternate-address information ati is generated for clusters at the ends of the alternate source and alternate destination clusters, and status 1 of the alternate-address information ati is set at 1010. Then, at the next step F155, the two pieces of alternate-address information ati generated in this way are added to the TDFL.

By carrying out the processing described above, even an alternate-address process for three or more physically continuous clusters can be managed by using only two pieces of alternate-address information ati.

5-2: Data Fetching

Figure 21:
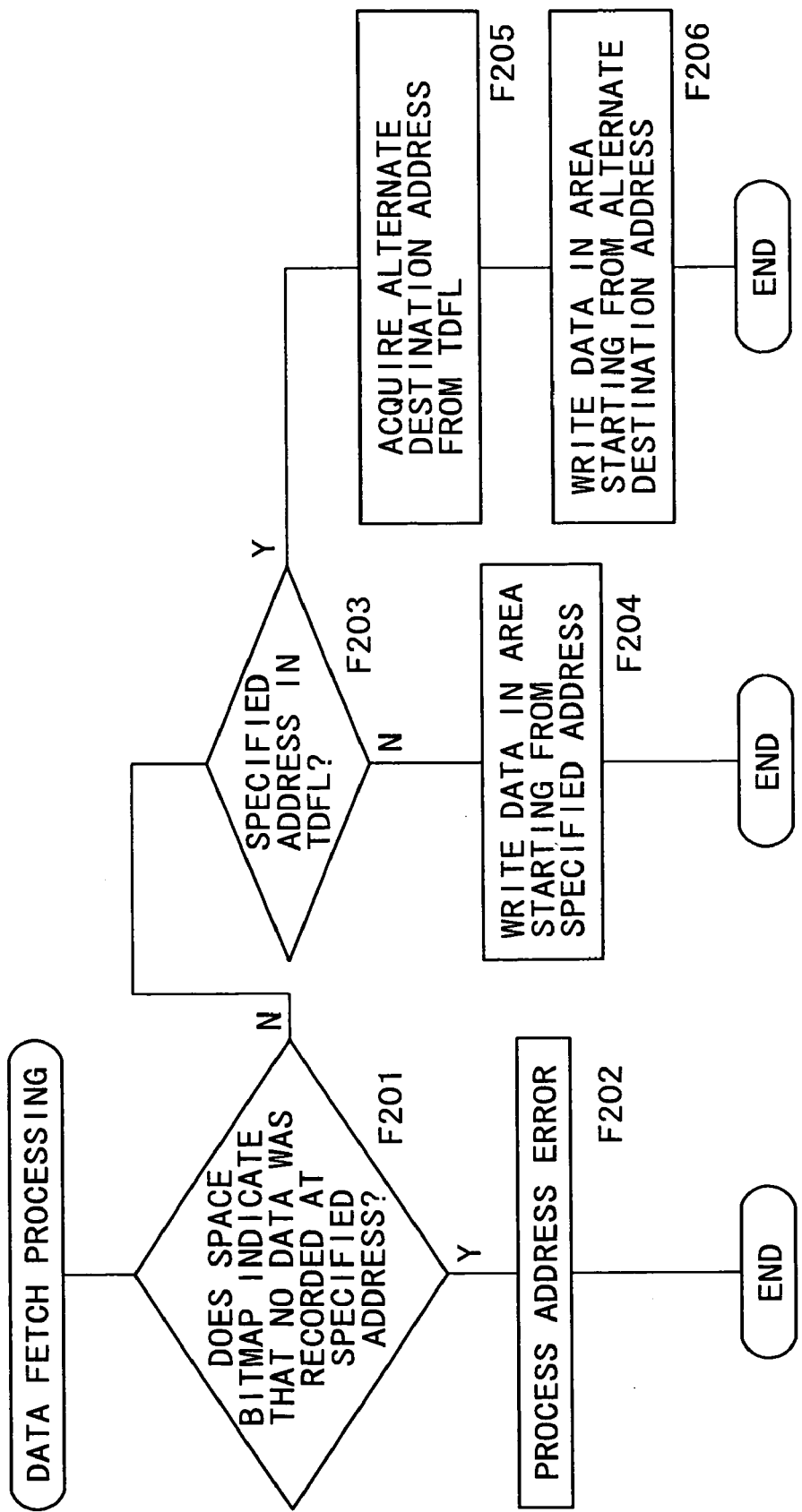
FIG. 21 shows a flowchart representing a data-fetching process provided by the embodiment.

By referring to a flowchart shown in FIG. 21, the following description explains processing carried out by the system controller 60 to reproduce data from the disk 1 mounted on the disk drive.

Assume that the system controller 60 receives a request to read out data recorded at an address specified in the request from a host apparatus such as the AV system 120. In this case, the flowchart representing the processing begins with a step F201 at which the system controller 60 refers to a space bitmap to determine whether or not data has been stored in the address specified in the request.

If no data has been stored in the address specified in the request, the flow of the processing goes on to a step F202 at which an error report indicating that the specified address is an incorrect address is returned to the host apparatus.

If data has been stored in the address specified in the request, on the other hand, the flow of the processing goes on to a step F203 at which the TDFL is searched for alternate-address information ati including the specified address as an alternate source address in order to determine whether or not an entry including the specified address has been cataloged on the TDFL.

If alternate-address information ati including the specified address as an alternate source address is not found in the search, the flow of the processing goes on from the step F203 to a step F204 at which data is reproduced from an area starting at the specified address before ending the execution of the processing, which is a normal process to reproduce data from the user-data area.

If the determination result obtained at the step F203 indicates that alternate-address information ati including the specified address as an alternate source address has been found in the search, on the other hand, the flow of the processing goes on from the step F203 to a step F205 at which an alternate destination address is acquired from the alternate-address information ati. This alternate destination address is an address in an ISA or an OSA.

Then, at the next step F206, the system controller 60 reads out data from the ISA or OSA address, which has been cataloged in the alternate-address information ati as an alternate destination address, and transfers the reproduced data to the host apparatus such as the AV system 120 before ending the execution of the processing.

By carrying out the processing described above, even if a request to reproduce data is received after the data has been renewed, the most recent data can be reproduced appropriately and transferred to the host.

5-3: Updating of the TDFL/Space Bitmap

In the processing described above, the TDFL stored in the cache memory 60a is updated in case the process to write data into a cluster is accompanied by an alternate-address process and the space bitmap also stored in the cache memory 60a is updated to reflect the data write process. At a certain point of time, the updated TDFL and space bitmap need to be transferred to the TDMA recorded on the disk 1. That is to say, it is necessary to update the state of management based on alternate-address processes and the recording state, which are states recorded on the disk 1.

It is most desirable to update the TDMA recorded on the disk 1 at a point of time the disk 1 is about to be ejected from the disk drive even though the timing to update the TDMA is not limited to the timing to eject the disk 1. Besides the timing to eject the disk 1, the TDMA can also be updated when the power supply of the disk drive is turned off or updated periodically.

FIG. 22 shows a flowchart representing process to update the TDMA recorded on the disk 1. At an ejection time or the like, the system controller 60 determines whether or not it is necessary to update the contents of the TDMA, that is, whether or not it is necessary to catalog the updated TDFL or space bitmap in the TDMA. If necessary, a process to update information in the TDMA is carried out.

At an ejection time or the like, the system controller 60 carries out processing to update the TDFL and/or the space bitmap. This processing starts at a step F301 of the flowchart shown in FIG. 22.

The flowchart actually begins with a step F302 to determine whether or not the TDFL stored in the cache memory 60a has been updated. If the TDFL has been updated, the flow of the processing goes on to a step F303 at which a TDDS shown in FIG. 12 is added to the updated TDFL, being recorded in the last sector of the TDFL.

Then, at the next step F304, the optical pickup 51 is driven to record the TDFL at the beginning of a free area in the TDMA recorded on the disk 1. It is to be noted that, at that time, since data is newly recorded in the TDMA, the space bitmap stored in the cache memory 60a is also updated.

Then, after the TDFL is recorded in the TDMA, the flow of the processing goes on to a step F305. The flow of the processing also goes on to the step F305 from the step F302 because the TDFL was not updated. In either case, the space bitmap stored in the cache memory 60a is checked to determine whether or not the bitmap has been updated.

If the TDFL has been updated as described above, at least, the space bitmap has also been updated at that time. This is because an alternate-address process has been carried out so that the space bitmap has also been updated as well in accordance with the alternate-address process. In addition, the space bitmap is also updated in accordance with an operation to record data in a cluster even if no alternate-address process has been carried out.

If the space bitmap stored in the cache memory 60a has been updated in one of the situations described above, the flow of the processing goes on to a step F306, at which the TDDS shown in FIG. 12 is added to the updated space bitmap stored in the cache memory 60a, being recorded in the last sector of the space bitmap. Then, at the next step F307, the optical pickup 51 is driven to record the space bitmap at the beginning of a free area in the TDMA recorded on the disk 1. Finally, the execution of the processing to record the updated TDFL and/or the updated space bitmap in the TDMA at an ejection time or the like is ended.

It is to be noted that, if no data has been written into the disk 1 at all since the disk 1 was mounted on the disk drive, the flow of the processing represented by the flowchart shown in FIG. 22 goes from the step F302 to the end by way of the step F305 without recording an updated TDFL and/or an updated space bitmap in the TDMA.

At the steps F304 and F307, the TDFL and the space bitmap are recorded sequentially at the beginning of a free area in the TDMA recorded on the disk 1 as explained earlier by referring to FIGS. 14 and 15. In the case of a two-layer disk, the TDMA on layer 0 is used first as an area for recording the TDFL and the space bitmap and, after no more free area is left in the TDMA on layer 0, the TDMA on layer 1 is used.

In addition, in the case of both the one-layer disk and the two-layer disk, a TDDS added to the last TDFL or space bitmap in the TDMA, being recorded in the last sector of the last TDFL or the last sector of the last space bitmap is the effective TDDS, which points to the effective TDFL and the effective space bitmap.

By the way, when a TDFL is additionally recorded in the TDMA at the step F303, F304, a technique may also be adopted as a conceivable technique for restructuring pieces of alternate-address information ati stored in the cache memory 60a.

Figure 23:
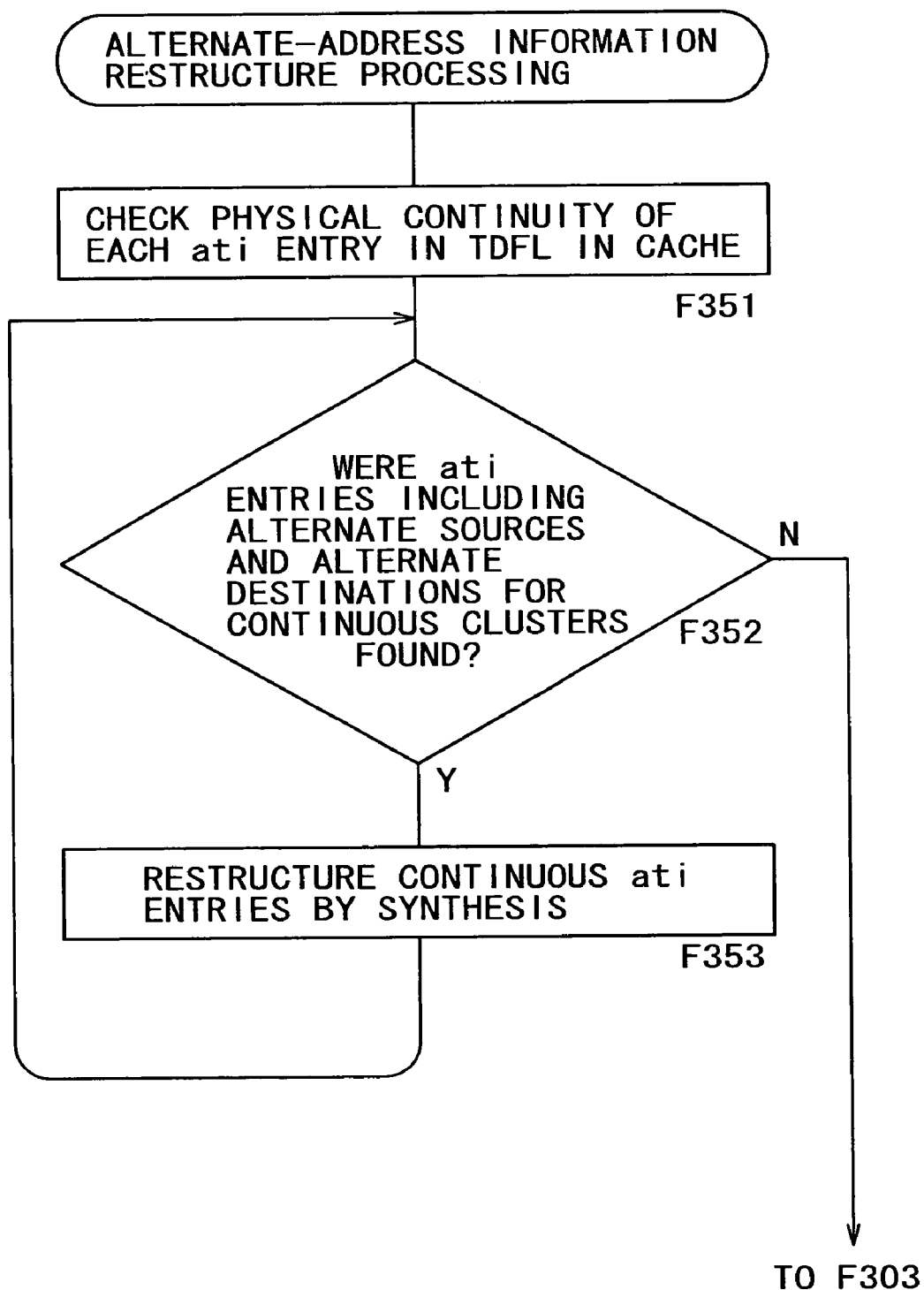
FIG. 23 shows a flowchart representing a process of restructuring alternate-address information in accordance with the embodiment.

FIG. 23 shows a flowchart representing a typical alternate-address information restructure process. This process can be carried out typically before the step F303 of the flowchart shown in FIG. 22.

At a step F351, pieces of alternate-address information ati cataloged on the TDFL stored in the cache memory 60a are searched to verify whether or not the following condition exists. The source and destination clusters represented by specific pieces of alternate-address information ati are respectively physical continuation of the source and destination clusters represented by the other specific pieces of alternate-address information ati.

If such specific pieces of alternate-address information ati were not been found in the search, the flow of the processing goes from the step F352 back to the step F303 of the flowchart shown in FIG. 11 without carrying out any process.

If such two specific pieces of alternate-address information ati were found in the search, on the other hand, the flow of the processing goes on to a step F353 at which the specific pieces of alternate-address information ati are synthesized for the purpose of restructuring them.

The steps F352 and F353 are executed repeatedly to synthesize any pair of such specific pieces of alternate-address information ati. After all such specific pieces of alternate-address information ati are processed, the flow of the processing goes from the step F352 back to the step F303.

FIG. 24 is an explanatory diagram showing the alternate-address information restructure process.

Figures 24A, 24B, 24C:
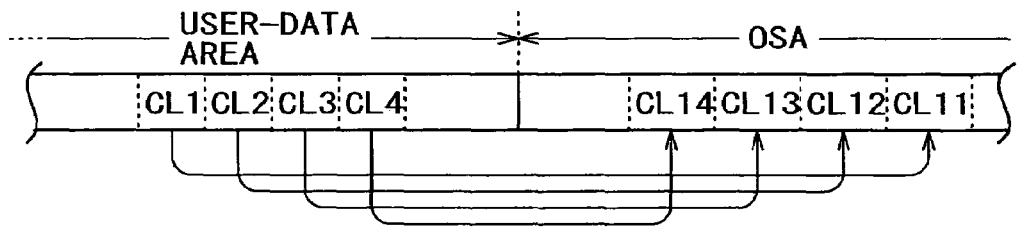
FIG. 24 is an explanatory diagram showing the process of restructuring alternate-address information in accordance with the embodiment.

Assume for example that, as shown in FIG. 24A, requests to write data into clusters CL1, Cl2, Cl3 and Cl4 are received separately, and data is written into clusters CL11, Cl12, Cl13 and Cl14 respectively in an OSA through an alternate-address process.

In this case, since the four requests to write data into the clusters are received separately, four pieces of alternate-address information ati are each cataloged as an entry having status 1 of 0000 as shown in FIG. 24B.

However, two pieces of alternate-address information ati having status 1 of 0101 and status 1 of 1010 respectively can be applied to four alternate-address continuous destination clusters CL1, Cl2, Cl3 and Cl4 and four alternate-address continuous source clusters CL11, Cl12, Cl13 and Cl14 used in this example.

Thus, as shown in FIG. 24C, the four entries can be restructured into a start entry with status 1 of 0101 indicating start source cluster Cl1 as well as start destination cluster Cl11 and an end entry with status 1 of 1010 indicating end source cluster Cl4 as well as end destination cluster Cl14. As a result, the number of pieces of alternate-address information ati recorded on the disk 1 can be reduced.

It is to be noted that such restructuring of alternate-address information can of course be applied to any pair of entries with status 1 of 0101 and 1010 indicating a plurality of continuous source and a plurality of destination clusters as described above. For example, a first pair of entries represents a plurality of first continuous source clusters and a plurality of first continuous destination clusters. By the same token, a second pair of entries is a pair provided for a plurality of second continuous source clusters and a plurality of second continuous destination clusters. If the second continuous source clusters are a continuation of the first continuous source clusters and the second continuous destination clusters are a continuation of the first continuous destination clusters, the first pair of entries and the second pair of entries can be restructured into a new pair of entries.

In addition, if a plurality of continuous source and destination clusters represented by a pair of entries with status 1 of 0101 and status 1 of 1010 as described above are respectively continuations of source and destination clusters represented another entry with status 1 of 0000, the pair of entries can be restructured into a new pair including the other entry.

5-4: Conversion into Compatible Disks

By the way, in a writable optical disk, management of alternate addresses is executed by using alternate-address management information stored in the DMA recorded on the disk. That is to say, unlike the disk 1 provided by the embodiment, a TDMA is not provided so that the alternate-address management information stored in the DMA itself is renewed to keep up with an executed alternate-address process. The data structure of the DMA recorded on a writable optical disk is the same as the DMA recorded on the disk 1 provided by the embodiment.

In the write-once optical disk provided by the embodiment, on the other hand, data can be written into an area including the TDMA only once so that the embodiment must adopt a technique to update the TDMA by adding alternate-address management information to the TDMA.

Thus, in order make a disk drive for a writable optical disk capable of reproducing data from the disk 1 provided by the embodiment, it is necessary to reflect most recent alternate-address management information recorded in the TDMA in the DMA.

In addition, in the case of a writable optical disk or the like, alternate-address information ati is recorded in the DMA for each cluster even if an alternate-address process is carried out on clusters located in a contiguous area. In the case of a write-once optical disk like the one provided by the present invention, that is, in the case of a disk with a recording capacity decreasing due to data written therein, however, it is specially important to effectively utilize the limited area of the TDMA. It is thus desirable to adopt a method of not increasing the size of the TDFL even in an alternate-address process carried out on clusters of a contiguous area. Thus, instead of including all cluster addresses completing an alternate-address process as alternate-address information ati in the temporary defect management information TDFL recorded in the TDMA, a burst-transmission format represented by a pair of entries with status 1 of 0101 and status 1 of 1010 as described above is adopted so as to reduce the number of pieces of recorded alternate-address information ati. That is to say, if addresses of three or more continuous clusters are subjected to an alternate-address process, a contiguous area is allocated as alternate-address destinations for the addresses so that only two entries of the alternate-address information ati need to be cataloged on the TDFL.

In the case of a write-once optical disk provided by the embodiment, alternate-address information ati is cataloged on the TDFL every time an alternate-address process is carried out. Thus, the size of information cataloged on the TDFL changes. That is to say, as the number of clusters subjected to the alternate-address process increases, the size of information cataloged on the TDFL also rises. By collecting a plurality of continuous clusters subjected to an alternate-address process into a group of clusters dealt with by carrying out the alternate-address process only once as described above, however, the increase in TDFL used area can be reduced.

If compatibility of the write-once optical disk implemented by the embodiment with the writable optical disk is taken into consideration, it is desirable to provide the write-once optical disk with the format of a DFL in the DMA identical with the corresponding format in the writable optical disk. The DFL in the DMA is obtained as a result of conversion of a TDFL recorded in the TDMA.

To put it concretely, it is desirable to record all pieces of alternate-address information ati in a format with status 1 set at 0000. By using such a format, it is not necessary for the disk drive to switch processing related to information stored in the DMA from one compatible with the write-once optical disk to one compatible with the writable optical disk or vice versa so that a processing load borne by the disk driver can be reduced.

Figure 25:
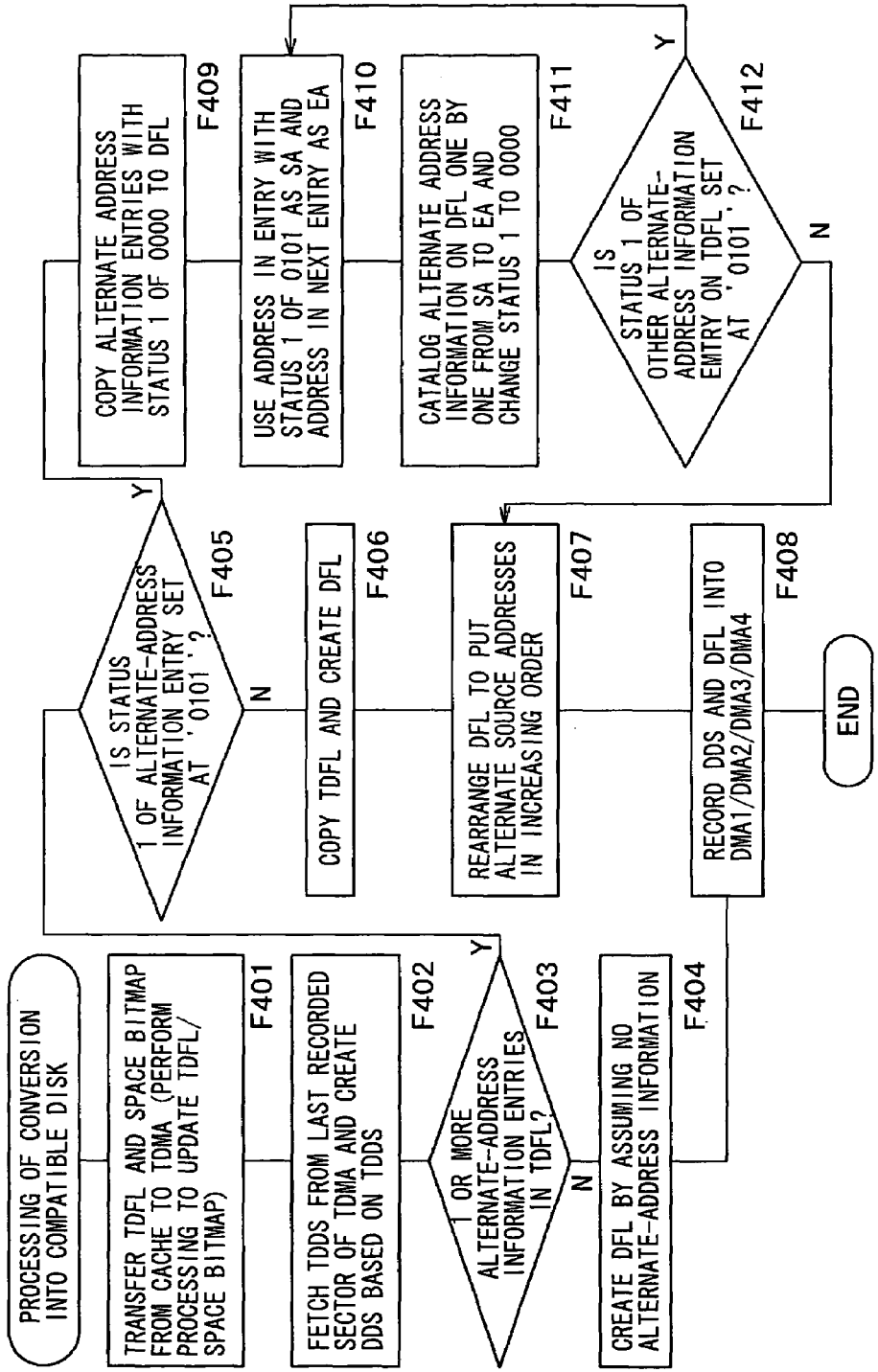
FIG. 25 shows a flowchart representing a process of converting a disk provided by the embodiment into a compatible disk in accordance with the embodiment.

For the reason described above, when information recorded in the TDMA is transferred to the DMA recorded on the disk 1, processing represented by a flowchart shown in FIG. 25 is carried out. It is to be noted that the information transferred to the DMA is final alternate-address management information so that data can no longer be renewed by using the TDMA. Thus, the processing to transfer information recorded in the TDMA to the DMA recorded on the disk 1 is carried out typically as a finalize-time process. In addition, the processing to transfer information recorded in the TDMA to the DMA recorded on the disk 1 means a process to convert the disk 1 into a disk having compatibility with a writable optical disk.

When the processing to transfer information recorded in the TDMA to the DMA to convert the disk 1 into a disk having compatibility with a writable optical disk is carried out, first of all, at a step F401 of the flowchart shown in FIG. 25, the system controller 60 carries out a process to transfer a TDFL and/or a space bit map from the cache memory 60a to the TDMA. Since this process is similar to the process represented by the flowchart shown in FIG. 22 as processing carried out at an injection time or the like, its detailed description is not repeated.

Then, at the next step F402, the most recent TDDS recorded in the last sector of the TDMA is read out to create information of the DDS shown in FIG. 5.

Subsequently, the flow of the processing goes on to the next step F403 to determine whether or not the TDFL includes one or more pieces of alternate-address information ati. Thus, first of all, the most recent TDFL is read out from the TDMA. As explained earlier by referring to FIG. 14, information on the recording location of the effective TDFL can be obtained from the TDDS. The number of cataloged pieces of alternate-address information ati can be obtained from the defect-list management information of the TDFL as the number of cataloged DFL entries.

The number of cataloged pieces of alternate-address information ati set at 0 indicates that no alternate-address information ati is cataloged. In this case, the flow of the processing goes on to a step F404 at which the TDDS is deleted from the TDFL to leave data for creating a DFL like the one shown in FIG. 6. This is because, as shown in FIG. 11, the TDFL includes the TDDS.

Then, at the next step F408, the created DDS and DFL are recorded in DMA 1, DMA2, DMA 3 and DMA 4, which have been allocated on the disk 1, before the execution of the processing is ended.

If the determination result obtained at the step F403 indicates that the number of cataloged pieces of alternate-address information ati is 1 or greater, on the other hand, the flow of the processing goes on to a step F405 to determine whether or not an alternate-address process has been carried out on continuous alternate-address source and destination areas.

At the step F405, first of all, status 1 of alternate-address information ati cataloged on the TDFL as an entry is fetched. Alternate-address information ati with status 1 of 0101 indicates that an alternate-address process has been carried out on continuous alternate-address source and destination areas represented by the alternate-address information ati.

On the other hand, all the entries cataloged on the TDFL having status 1 of 0000 indicate that no alternate-address process has been carried out on continuous alternate-address source and destination areas. In this case, the flow of the processing goes on to a step F406 at which the TDDS is deleted from the TDFL to leave data for creating a DFL.

If an alternate-address process has been carried out on continuous alternate-address source and destination areas, first of all, at a step F409, entries with status 1 of 0000 are copied to the DFL. These entries each represent alternate-address information ati for an alternate-address process carried out on a normal one-to-one pair consisting of a source cluster and a destination cluster.

Then, at the next step F410, alternate-address information ati with status 1 of 0101 is acquired and the alternate source address in the alternate-address information ati is saved as a start address SA. Then, alternate-address information ati following the alternate-address information ati with status 1 of 0101 is acquired and the alternate source address in the following alternate-address information ati is saved as an end address EA.

Then, at the next step F411, alternate-address information ati with status 1 of 0000 is cataloged on the DFL as alternate-address information ati including the start address SA as the alternate source address. Subsequently, the start address SA is incremented by 1 (SA=SA+1). Then, alternate-address information ati with status 1 of 0000 is cataloged on the DFL as alternate-address information ati including the incremented start address (SA+1) as the alternate source address. These processes are carried out repeatedly till the incremented start address SA reaches the end address EA. By carrying out these processes repeatedly as described above, alternate-address information ati representing continuous alternate-address source and destination areas is cataloged on the DFL as a plurality of entries each describing alternate-address information ati representing a normal one-to-one pair consisting of a source cluster and a destination cluster.

Then, at the next step F412, the TDFL is searched for other alternate-address information entry with status 1 of '0101'. If such an entry is found in the search, the flow of the processing goes back to the step F410 to repeat the processes described above. That is to say, the processes of the steps F410 and F411 are carried out on all pieces of alternate-address information ati with status 1 of 0101 on the TDFL.

Then, the flow of the processing goes on from the step F406 or the step F412 to a step F407 at which the pieces of alternate-address information ati cataloged on the created DFL are rearranged in an order of increasing alternate source addresses.

Then, at the next step F408, the created DDS and DFL are recorded in DMA 1, DMA 2, DMA 3 and DMA 4, which have been allocated on the disk 1, before the execution of the processing is ended.

By carrying out the processing described above, alternate-address information recorded in the TDMA is recorded in the DMA by converting the information into entries each having status 1 of 0000.

The disk drive designed for a writable optical disk reads out information from the DMA to verify the state of the alternate-address process. Since the disk 1 provided by the embodiment is converted into a disk having a DMA created as described above, it is possible to verify the state of the alternate-address process and carry out processing in accordance with the state in the same way as the ordinary writable optical disk.

6: Effects of the First TDMA Method

The disk 1 and the disk drive, which are implemented by the embodiment, have the following effects.

In accordance with the embodiment, a write request can be made more than once to write data at the same address in a write-once optical disk. Thus, it is possible to apply a file system, which used to be unusable, to the conventional write-once optical disk. For example, a file system for a variety of operating systems (OS) can be applied as it is. An example of such a file system is a FAT file system. In addition, data can be exchanged without being conscious of differences in OS.

On top of that, the write-once optical disk makes it possible to renew not only user data but, of course, directory information of the FAT or the like recorded in the user-data area. Thus, the write-once optical disk provides convenience that data such as directory information of the FAT or the like can be updated from time to time.

Assuming that the AV system 120 is used, video and musical data can be utilized as updateable media as long as a free area of an ISA or an OSA remains.

In addition, an operation to record data into an address specified by a host computer or the like as an address in the write-once optical disk or read out data from such an address is a heavy processing load for the disk drive. If a write instruction specifying an address is received and the address is known as an address at which data has already been recorded before, an error report can be returned without actually making an access to the write-once optical disk. In order to implement such a configuration, it is necessary to manage the recording states of the write-once optical disk and, in this embodiment, a space bitmap is used as means for implementing the management of the recording states.

By preparing a space bitmap, random recording on a write-once optical disk having a large storage capacity can be implemented without imposing a processing load on the disk drive. In addition, since recording states of alternate areas can be managed, an alternate destination address used in an alternate-address process of a defect or a logical overwriting process can be acquired without actually making an access to the write-once optical disk.

On top of that, by using the space bitmap for managing management/control information areas allocated on the disk as the lead-in and the lead-out zones, recording states of the management/control information can also be managed. In particular, the management of the test area OPC serving as an area for adjusting the power of the laser beam is effective. With the conventional technique, an access must be actually made to the disk in order to search the disk for the address included in the OPC as an address at which data should be written. It is thus quite within the bounds of possibility that an area in which data has been recorded by using a small laser power is interpreted as an unrecorded area. By using the space bitmap for also managing the OPC area, however, it is possible to avoid such misinterpretation.

By combining the overwrite function described before with the space bitmap, the processing load borne by the disk drive can be reduced. That is to say, as is obvious from the pieces of processing represented by the flowcharts shown in FIGS. 17 to 21, without actually making an access to the disk, it is possible to determine whether or not the overwrite function is to be activated.

In addition, by putting a defective area detected at a write time and surroundings of the area in recorded status in the space bitmap, it is possible to eliminate a time-consuming process to record data at a defective address caused by an injury. In addition, by combining this feature of the space bitmap and the overwrite function, it is possible to carry out a write process, which appears to the host as a process having no write error.

On top of that, an updated TDML serving as alternate address management information and an updated space bitmap are additionally recorded in the TDMA and, at the same time, information indicating the effective TDFL and/or the effective space bitmap is also recorded as well. Thus, the effective TDFL and/or the effective space bitmap can be identified at each point of time. That is to say, the disk drive is capable of correctly grasping the updating state of the alternate-address management information.

In addition, the fact that the space bitmap is recorded in the TDMA means that the data zone serving as a main area for recording the space bit map is not used. For example, the ISA or the like is not used. Thus, it is possible to carry out an alternate-address process effectively utilizing a data zone and any one of an ISA and an OSA, which each serve as an alternate-address area. For example, either an ISA or an OSA is selected as an alternate-address area to be used in an alternate-address process typically on the basis of preference of an area closer to the alternate source address. By selecting either an ISA or an OSA in this way, an operation to make an access to data completing the alternate-address process can be made efficient.

On top of that, in an operation to write data onto the disk 1, data may not be written into a specified area due to a defect detected in the area and, if data is received continuously thereafter, by carrying out an alternate-address process, the write operation can be continued without returning an error report. For clarity, refer to the flowcharts shown in FIGS. 17 and 18.

In addition, if an operation to write data into a specified area cannot be carried out due to a defect detected in the area, in many cases, areas surrounding the defective area are most likely also areas into which data cannot be recorded. In this case, a write process can be carried out as a process assuming that predetermined areas following the defective area are also defective areas to which no access is actually made. If data for these areas has already been received by the disk drive, an alternate-address process can be carried out on the areas. In this case, even if three or more continuous clusters are subjected to an alternate-address process, alternate-address information ati can be cataloged on the TDFL only as two entries so that the size of the used write area can be reduced.

On top of that, by carrying out a process on the space bitmap to treat a processed area as an area, in which data has been written in this way, an illegal access can be avoided.

If no data for areas following an area, in which data cannot be written, has been received by the disk drive, on the other hand, predetermined ones of the following areas are cataloged on the TDFL as defective clusters each having an allocated alternate destination and treated on the space bitmap as areas, in which data has already been written. If an instruction to write data into such an area is received from the host thereafter, the disk drive refers to the space bitmap to find out that the area is an area, in which data has already been written. In this case, the overwrite function can be executed to record the data without generating an error.

In addition, since the DMA has the same data structure as the writable disk, data can be reproduced by a reproduction system from the disk provided by the embodiment even if the reproduction system designed for a writable disk is used.

7: Second TDMA Method

7-1: TDMAs

Next, a second TDMA method is explained. It is to be noted that, basically, the second TDMA method has a number of similarities to the first one described so far. Thus, only differences between the two methods are mainly explained.

The structure of the disks are the same as those shown in FIGS. 1 to 3. In addition, the data structures of the DMA are also the same as those shown in FIGS. 4 to 8.

However, the second TDMA method is different from the first one in that, in the case of the second TDMA method, a space bitmap is not recorded in the TDMA. Instead, a space bitmap is recorded in the ISA.

The data structure of the TDMA is shown in FIG. 26. The size of the TDMA is 2,048 clusters. One to four clusters identified by cluster numbers 1 to 4 are used as clusters for recording a TDFL (temporary defect list).

A cluster identified by cluster number n is used as a cluster for recording a TDDS (temporary disk definition structure), which is detailed information on the optical recording medium.

In the TDMA, the TDFL and the TDDS are recorded as a set. If an updated set is additionally recorded in the TDMA, the set is written at the beginning of a free area in the TDMA. That is to say, the updated set is recorded in an area immediately following a recorded TDDS.

Not shown in a figure, the data structure of the TDFL having a size in the range one to four bytes is all but the same as that shown in FIG. 11. In the case of the second TDMA method, however, unlike the first method, a TDDS is not recorded in the last sector of the TDFL. That is to say, the area following the alternate-address information ati terminator as shown in FIG. 11 is all filled up with codes of 00h. Thus, the TDDS is recorded in a cluster different from the clusters used for recording the TDFL as shown in FIG. 26.

The data structure of the defect-list management information included in the TDFL is exactly the same as that shown in FIG. 7. In addition, the data structure of the alternate-address information ati is entirely identical with that shown in FIG. 8. A pair of pieces of alternate-address information ati with values of status 1 set at 0101 and 1010 is interpreted as a pair of entries representing a plurality of continuous clusters serving as an alternate source and a plurality of continuous clusters serving as an alternate destination.

FIG. 27 is a diagram showing the data structure of the TDDS, which is recorded in a cluster other than clusters for recording the TDFL. In this case, the size of the TDDS is one cluster, which is the same as the DDS shown in FIG. 5. The contents of the TDDS are all but the same as those explained before by referring to FIG. 5. As is obvious from comparison of the data structures shown in FIGS. 5 and 27, however, bytes starting with a byte at byte position 4 are bytes used for recording the sequence number of the TDDS, bytes starting with a byte at byte position 16 are bytes used for recording the physical address of the first sector in a drive area inside the TDMA and bytes starting with a byte at byte position 24 are bytes used for recording the physical address AD_DFL of the first sector in the TDFL inside the TDMA.

It is to be noted that, in the case of a two-layer disk, a TDMA is provided for each of layers 0 and 1. Much like the first TDMA method described above, it is possible to adopt a TDMA-utilizing technique whereby, first, the TDMA provided for layer 0 is used as a TDMA for updating the TDFL and the TDDS and, as the TDMA provided for layer 0 is used up entirely, the TDMA provided for layer 1 is used.

7-2: ISAs and OSAs

Figure 28:
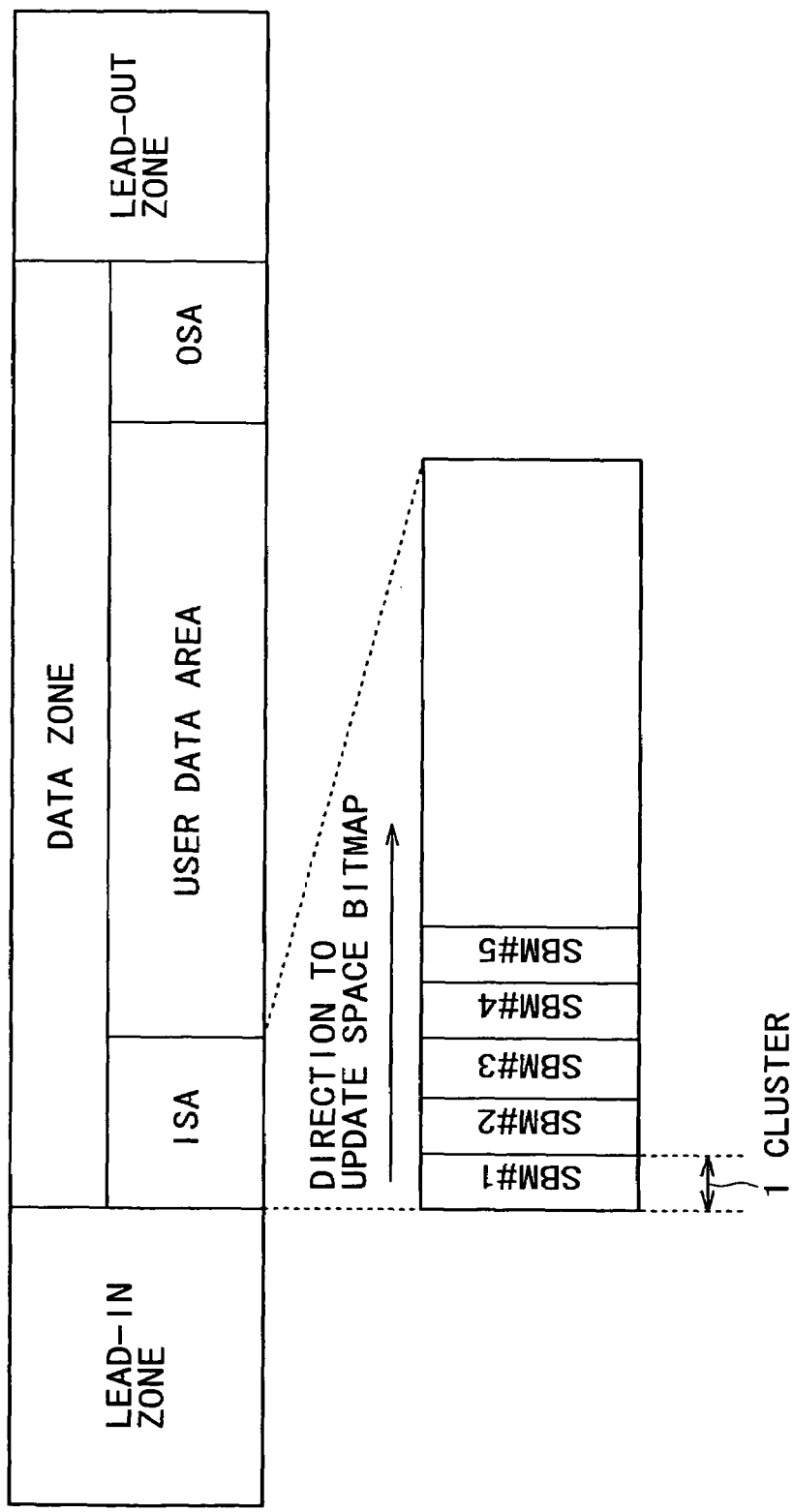
FIG. 28 is an explanatory diagram showing an ISA and OSA of a disk provided by the other embodiment.

FIG. 28 is a diagram showing an ISA and an OSA. In the case of this embodiment, only the OSA is used as an alternate area. The ISA is used as an area for recording space bitmaps.

The sizes of the ISA and the OSA are defined in the DDS and the TDDS. The size of the ISA is determined at an initialization time and remains constant thereafter. However, the size of the OSA can be changed even after data is recorded in the OSA.

When recording data into the OSA in an alternate-address process, the data is written in an area starting with the last cluster of the OSA in a direction toward the cluster at the beginning of the OSA without skipping any clusters located between the last and the beginning clusters.

The ISA is used one cluster after another starting with the cluster at the beginning of the ISA as an area for recording space bitmaps SBM#1 to SBM#5 as shown in the figure. To put it in detail, much like the first TDMA method described earlier, the size of a space bitmap is one cluster and the first space bitmap is recorded in the first cluster. When the space bitmap is updated thereafter, the updated space bitmap is recorded as a new bitmap at the beginning of the free area of the ISA, that is, in the area immediately succeeding the last recorded space bitmap, without creating a free space between the last recorded space bitmap and the new space bitmap.

Thus, the last space bitmap among bitmaps recorded in the ISA becomes the effective information. In the case of the ISA shown in FIG. 28, space bitmap SBM#5 is the effective information.

The data structure of the space bitmap is all but the same as that shown in FIG. 10 except that, in the case of the space bitmap for the second TDMA method, unlike the data structure shown in FIG. 10, the last sector is not used as a sector for recording a TDDS.

It is to be noted that, in the case of a two-layer disk, a space bitmap provided for layer 0 is recorded in the ISA for layer 0 while a space bitmap provided for layer 1 is recorded in the ISA for layer 1.

However, the ISA for layer 0 and the ISA for layer 1 can be regarded as a single area with a large size without regard to whether the space bitmap is a bitmap provided for layer 0 or 1. In this case, the ISA of layer 0 is first used as an area for storing space bitmaps provided for both layers and, as the ISA of layer 0 is used up entirely, the ISA of layer 1 is used.

By the way, when a disk 1 provided by this embodiment as a disk with an ISA thereof used for recording space bitmaps is mounted on another disk drive, it is necessary to prevent the ISA from being used inadvertently as an alternate area. In order to prevent such an ISA from being used inadvertently as an alternate area, spare area full flags of the TDDS shown in FIG. 27 are used.

In the case of a one-layer disk, the spare area full flags having a size of 1 byte has a format shown in FIG. 29A. In the case of a two-layer disk, on the other hand, the spare area full flags having a size of 1 byte has a format shown in FIG. 29B.

First of all, in the case of a one-layer disk shown in FIG. 29A, bits b7 to b2 are reserved. A bit b1 is an outer spare area full flag. A value of 1 is set in this outer spare area full flag to indicate that the whole OSA has been filled up with data recorded therein. A bit b0 is an inner spare area full flag. A value of 1 is set in this inner spare area full flag to indicate that the whole ISA has been filled up with data recorded therein.

In the case of a two-layer disk shown in FIG. 29B, on the other hand, in addition to bits b1 and b0 of a one-layer disk, bits b2 and b3 are respectively an OSA full flag and ISA full flag of the second layer. In this case, bits b0 and b1 are respectively an OSA full flag and ISA full flag of the first layer.

Thus, if a space bitmap is recorded in an ISA as is the case with this embodiment, the inner spare area full flag provided for the ISA is set at 1. By doing so, since the disk 1 appears to another disk drive as a disk with no free area left in the ISA, the other disk drive can be prevented from using the ISA for an alternate-address process.

8: Operations for the Second TDMA Method 8-1: Data Writing

Figure 30:
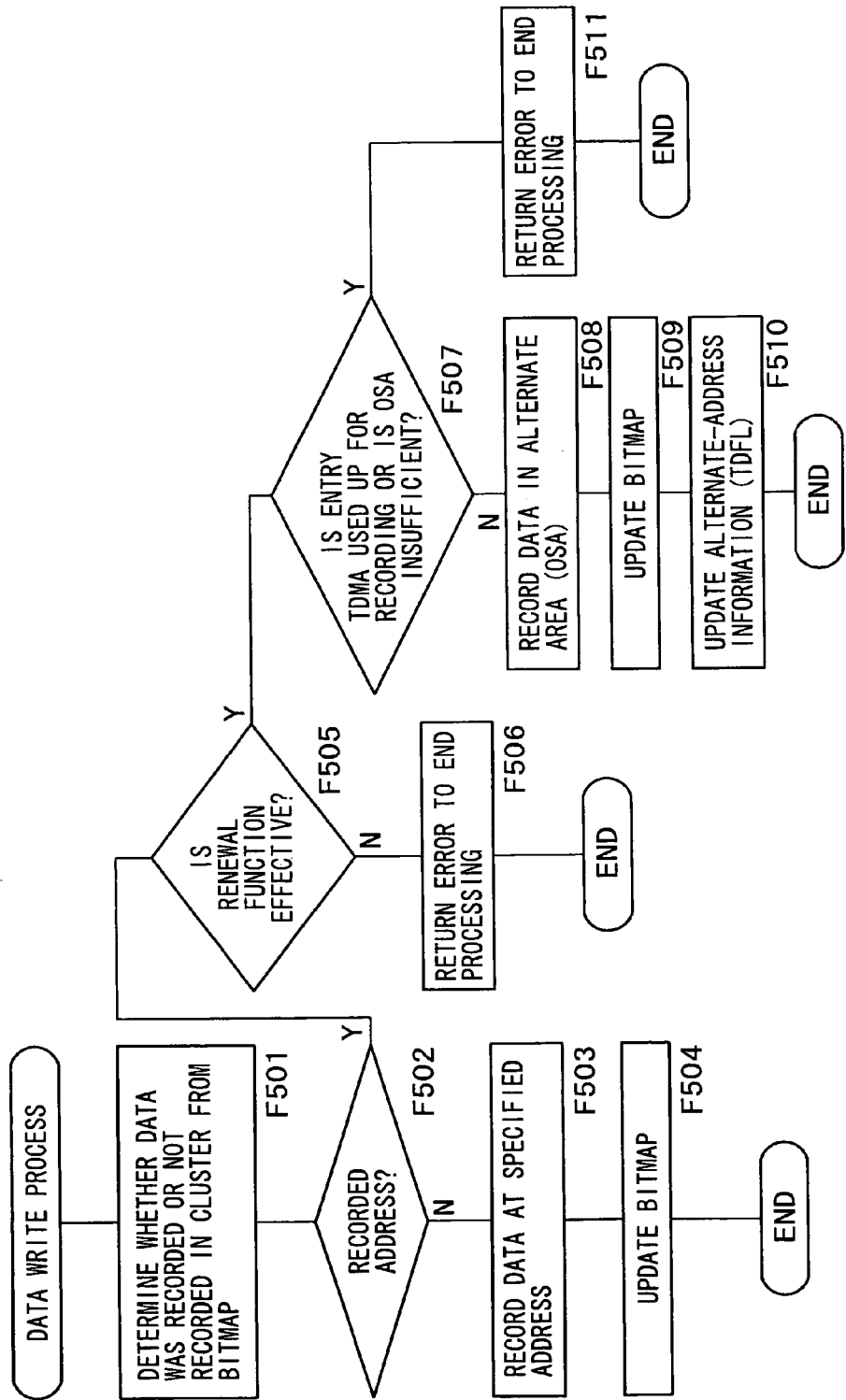
FIG. 30 shows a flowchart representing a data-writing process provided by the other embodiment.

In the case of the second TDMA method, the system controller 60 carries out data-writing processing represented by a flowchart shown in FIG. 30.

Also in the case of the second TDMA method, it is assumed that, at a point of time the data-writing processing described below is about to be carried out, the disk 1 has been mounted on the disk drive and a TDFL, a TDDS and a space bitmap have been transferred from the TDMA recorded on the mounted disk 1 to the cache memory 60a. In addition, explanation of a process to convert a logical address into a physical address from time to time is also omitted from the following description.

Let the system controller 60 receive a request to write data at a certain address from a host apparatus such as the AV system 120. In this case, the system controller 60 starts the processing represented by the flowchart shown in FIG. 30. The flowchart begins with a step F501 at which the system controller 60 refers to the space bitmap stored in the cache memory 60a (or the recent bitmap updated in the cache memory 60a) to determine whether or not data has been recorded at the address specified in the write request.

If no data has been recorded at the specified address, the flow of the processing goes on from the step F502 to a step F503, at which a normal write process is carried out to execute a command to write data at the address.

That is to say, at the F503, the system controller 60 executes control to write data at the specified address. In other words, the optical pickup 51 is driven to make an access to the specified address and record the data to be written as requested at the specified address.

As the data-writing process is normally ended, the flow of the processing goes on to a step F504 at which a space bitmap stored in the cache memory 60a is updated. That is to say, a bit allocated in the space bitmap to a cluster in which the data has been written is set at a value indicating that data has been written in the cluster. Then, the execution of the processing carried out in response to the write request is ended.

If an error is generated in the course of the write processing due to, among other causes, an injury on the disk 1, an alternate-address process may be carried out in some cases. In this case, an alternate-address process like the one explained earlier by referring to the flowchart shown in FIG. 18 is carried out. It is to be noted that a step to carry out this alternate-address process is not included in the description of the flowchart shown in FIG. 30.

If the determination result obtained at the step F502 reveals a space bitmap indicating that data has been recorded at the address specified in the write request received from the host apparatus, on the other hand, the flow of the processing goes on to a step F505. At this step, the system controller 60 determines whether or not the function to renew data is effective. It is to be noted that a function to enable the function to renew data will be explained later by referring to a flowchart shown in FIG. 31.

If the function to renew data is not effective, the flow of the processing goes on to a step F506 at which an error report is returned to the host apparatus before the execution of the processing is ended.

If the function to renew data is effective, on the other hand, the flow of the processing goes on to a step F507 to determine first of all whether or not an alternate-address process for renewing data can be actually carried out.

In order to carry out the alternate-address process, the spare area OSA must have a free area for at least recording the data requested in the write operation. In addition, the TDMA must have a margin allowing an entry of the alternate-address information ati for managing this alternate-address process to be added, that is, allowing the TDFL to be updated.

If the OSA has a free area and the TDMA has a margin allowing an entry of the alternate-address information ati for managing this alternate-address process to be added, the flow of the processing carried out by the system controller 60 goes on from the step F507 to a step F508 at which the optical pickup 51 is driven to make an access to the OSA and record the data to be written as requested this time in the OSA.

Then, at the next step F509, the space bitmap stored in the cache memory 60a is updated. That is to say, a bit allocated in the space bitmap to an OSA cluster including an address at which the data has been written in an alternate-address process carried out to renew data is set at a value indicating that data has been written in the cluster.

Subsequently, at the next step F510, the TDFL stored in the cache memory 60a is updated. That is to say, alternate-address information ati representing the alternate-address process carried out this time is newly added as an entry to the TDFL. As an alternative, if alternate-address information ati including the same alternate source address as the address specified in the write request already exists as an entry in the TDFL, this entry is renewed. In addition, an entry count included in the defect-list management information as a count representing the number of cataloged DFL entries is incremented in case alternate-address information ati is newly added to the TDFL, and the number of unused OSA clusters is decremented. Then, the execution of the processing carried out in response to the write request is ended.

By carrying out the processing to use the OSA as described above, the system controller 60 is capable of coping with a request to write data into an address, at which data has already been recorded before, that is, coping with a request to renew data.

If the determination result obtained at the step F507 indicates that the OSA does not have a free area for at least recording the data requested in the write operation or the TDMA does not have a margin allowing an entry of the alternate-address information ati for managing this alternate-address process to be added, on the other hand, an alternate-address process cannot be carried out. In this case, the flow of the processing goes on to a step F511 at which an error report indicating that there is no area for writing the data is returned to the host apparatus before the execution of the processing is ended.

It is to be noted that alternate-address information ati can be newly generated at the step F510 to reflect the executed alternate-address process by carrying out the processing represented by the flowchart shown in FIG. 20.

It is also worth noting that, if the ISA used as an area for recording a space bitmap does not include a free area, a recording operation for updating the space bitmap cannot be carried out. In this case, the following typical countermeasures can be taken to allow a process of recording user data to be carried out:

When a disk with the ISA thereof including recorded space bitmaps but having no left free area is mounted on the disk drive, the disk drive checks an RF signal serving as a reproduced-data signal for a free area available on the disk on the basis of the most recent space bitmap and reconstructs the space bitmaps.

For a disk with the ISA thereof including recorded space bitmaps but having no left free area, the disk drive allows only limited write operations (or sequential write operations) to be carried out to record data in an area following the last address of recorded user data.

By the way, in the case of the present embodiment, the ISA is used as a spare area for recording space bitmaps. Thus, it is necessary to make the data renewal function effective or ineffective in dependence on whether or not the disk 1 mounted on the disk drive is a disk allowing the ISA to be used as a spare area for recording space bitmaps.

Figure 31:
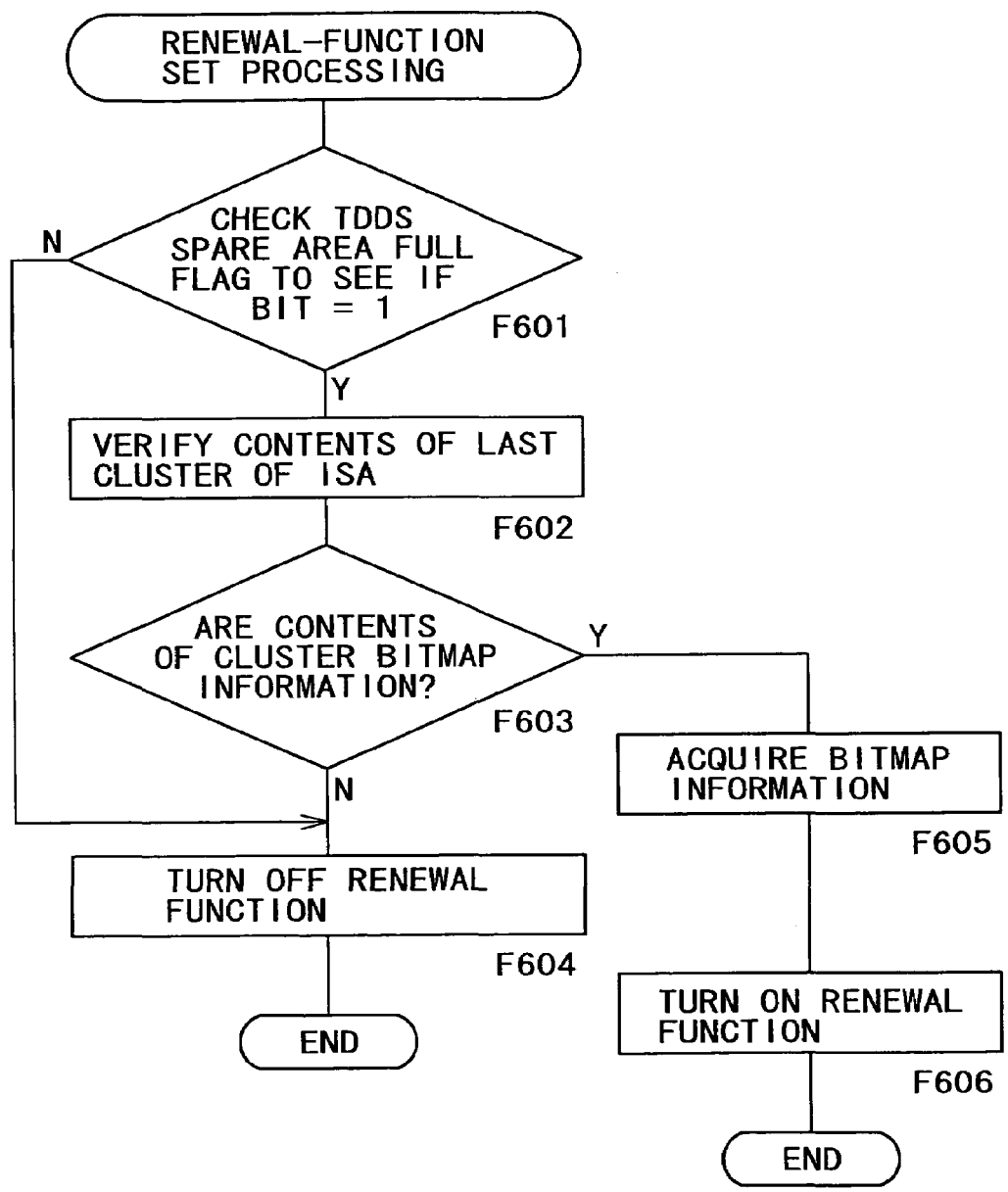
FIG. 31 shows a flowchart representing a process of setting a renewal function in accordance with the other embodiment.

At the step F505, the system controller 60 determines whether or not the function to renew data has been put in effective status, which is set by the processing represented by the flowchart shown in FIG. 31.

The processing to set the data renewal function as represented by the flowchart shown in FIG. 31 is carried out typically when the disk 1 is mounted on the disk drive.

When the disk 1 is mounted on the disk drive, the system controller 60 checks the TDDS of the disk 1 to examine bit b0 of the spare area full flags provided at byte position 52 at a step F601.

As described earlier by referring to FIGS. 29A and 29B, in the disk 1 provided by the present embodiment as a disk including the ISA used as an area for recording space bitmaps, bit b0 is set at 1. Even in the case of a disk including the ISA used as an alternate area, bit b0 is set at 1 as the entire ISA is used up. That is to say, at least, if the disk is a disk provided by the present embodiment, bit b0 is set at 1 and, if the disk is not a disk provided by the present embodiment, bit b0 is set at 0 or 1. Thus, at least, if bit b0 is set at 0, the disk is not a disk provided by the present embodiment.

Thus, if bit b0 is set at 0, the flow of the processing goes on to a step F604 at which the function to renew data is turned off.

In this case, the disk drive is not capable of carrying out an alternate-address process and a process to record a space bitmap on this disk. That is to say, the steps F507 to F511 of the flowchart shown in FIG. 30 are not executed. In addition, the step F504 of the flowchart shown in FIG. 30 to update a space bitmap for the case of an ordinary write operation is also not executed. However, details of operations for a disk not provided by the present embodiment are not explicitly included in the flowchart shown in FIG. 30.

Thus, the data renewal operation of the present embodiment is not carried out even though the state of the ISA and the reproduction compatibility are maintained.

If the examination result obtained at the step F601 indicates that bit b0 is 1, on the other hand, the flow of the processing goes on to a step F602 at which the last cluster of the ISA is examined. This is because it is quite within the bounds of possibility that the disk mounted on the disk drive is the disk provided by the present embodiment.

If the last cluster of the ISA is a cluster for recording a space bitmap, the flow of the processing goes on from the step F603 to a step F605 to read out the space bitmap and store the bitmap in the cache memory 60a. Then, at the next step F606, the function for renewing data is made effective.

If the examination result obtained at the step F603 reveals that the last cluster of the ISA is determined to be not a cluster for recording a space bitmap, on the other hand, the flow of the processing goes on to the step F604 at which the function to renew data is made ineffective.

By carrying out the processing to set the status of the data renewal function described above, the function to renew data is made effective for a disk provided by the present invention as a disk including an ISA as an area for recording a space bitmap. In the case of a disk using the ISA as an alternate area, on the other hand, the ISA is not used as an area for recording a space bitmap and the data renewal function provided by the present embodiment is not made effective either. An example of the disk using the ISA as an alternate area is a disk containing data recorded by another disk drive.

8-2: Data Fetching

Figure 32:
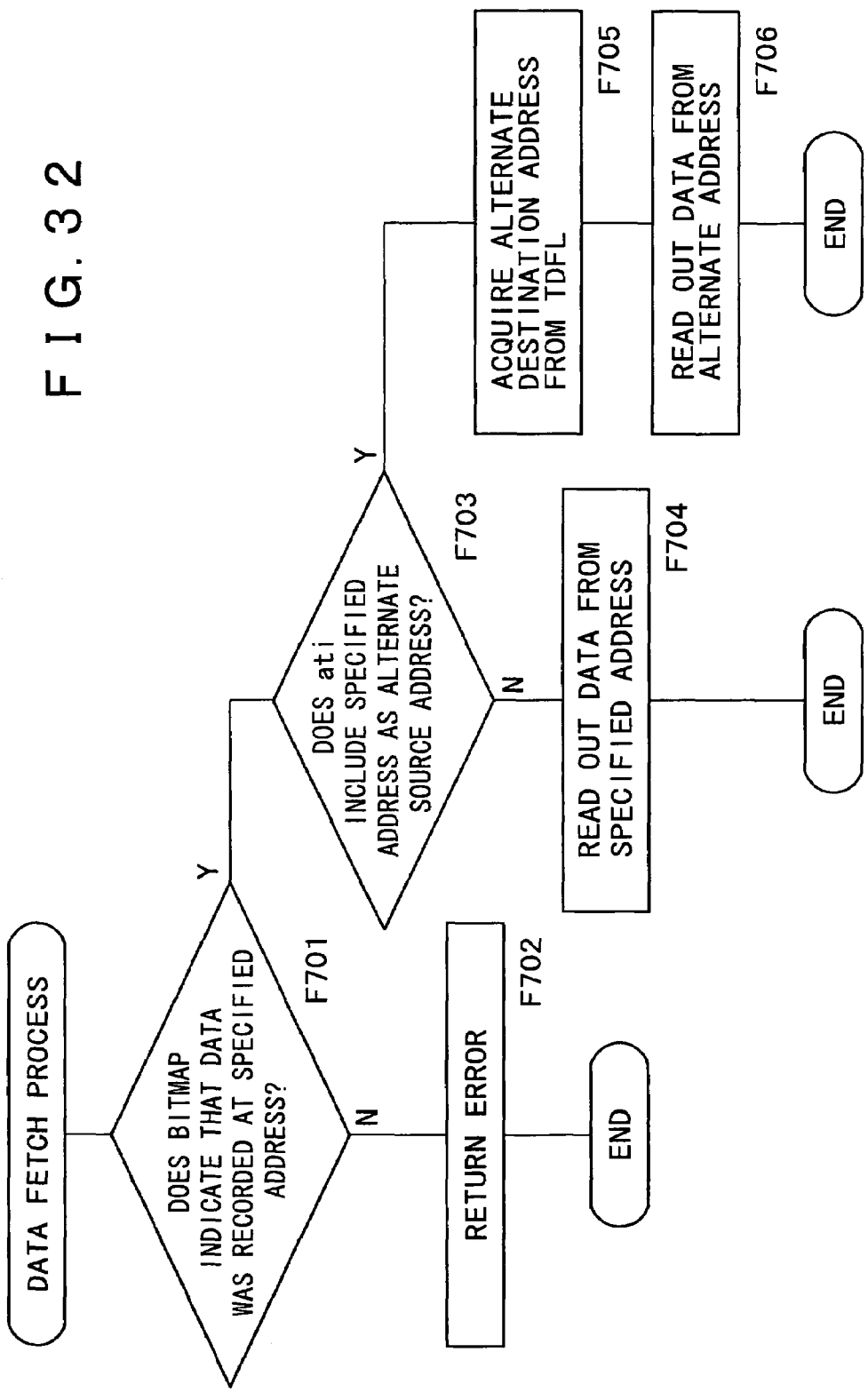
FIG. 32 shows a flowchart representing a data-fetching process provided by the other embodiment.

By referring to a flowchart shown in FIG. 32, the following description explains processing carried out by the system controller 60 employed in the disk drive to reproduce data from the disk 1 at a reproduction time.

Assume that the system controller 60 receives a request specifying an address in the disk 1 to read out data recorded at the address from a host apparatus such as the AV system 120.

In this case, the system controller 60 carries out the processing starting at a flowchart step F701 at which the space bitmap is referred to in order to determine whether or not data has been recorded in the address specified in the request.

If no data has been recorded in the address specified in the request, the flow of the processing goes on to a step F702 at which an error report indicating that the specified address is an incorrect address is returned to the host apparatus, and the execution of the processing is ended.

If data has been recorded in the address specified in the request, on the other hand, the flow of the processing goes on to a step F703 at which the TDFL is searched for alternate-address information ati including an alternate source address matching the address specified in the request.

If no alternate-address information ati including an alternate source address matching the address specified in the request was found in the search, the flow of the processing goes on from the step F703 to a step F704 at which the data is reproduced from the specified address before the execution of the processing is ended. This completed processing is a normal reproduction process to reproduce data from the user-data area.

If the search result obtained at the step F703 indicates that there is alternate-address information ati including an alternate source address matching the address specified in the request, on the other hand, the flow of the processing goes on from the step F703 to a step F705 at which an alternate source address is extracted from the alternate-address information ati. That is to say, an address in the OSA is acquired.

Then, at the next step F706, the system controller 60 executes control to read out the data from the acquired address in the OSA or the alternate source address extracted from the alternate-address information ati, and transfer the reproduced data to the host apparatus such as the AV system 120 before ending the execution of the processing.

By carrying out the processing described above, most recent data can be correctly reproduced and transferred to the host apparatus in response to even a data reproduction request made by the host after renewal of the data.

8-3: Updating of the TDFL/Space Bitmap and Conversion into Compatible Disks

Much like the first TDMA method described before, an updated TDFL and space bitmap are transferred from the cache memory 60*a* to the disk 1 at a predetermined point of time such as the time the disk 1 is ejected from the disk drive.

Figure 33:
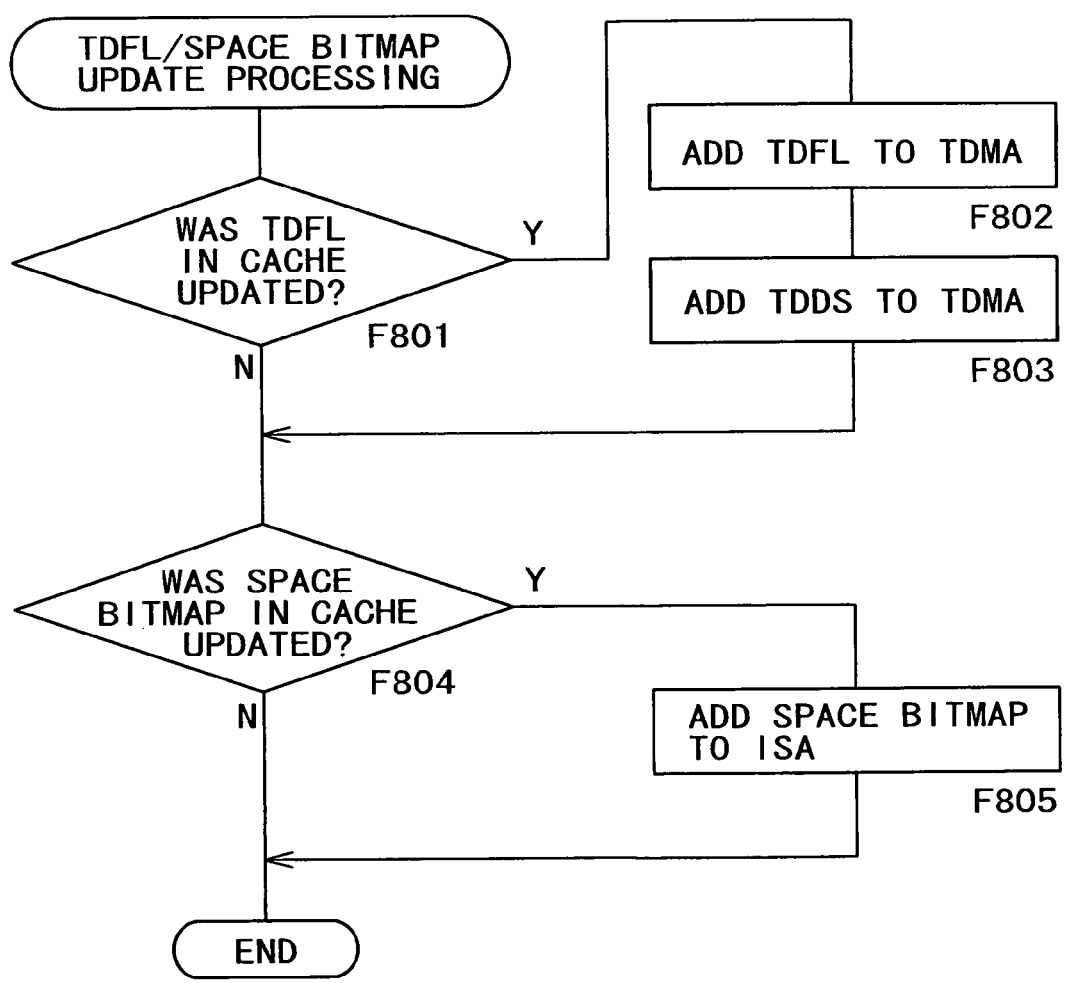
FIG. 33 shows a flowchart representing a TDFL/space-bitmap update process provided by the other embodiment.

In the case of the second TDMA method, alternate-address management information (including the TDFL and the TDDS) as well as a space bitmap are transferred from the cache memory 60*a* to the disk 1 in processing represented by a flowchart shown in FIG. 33.

The flowchart begins with a step F801 at which the system controller 60 determines whether or not the TDFL stored in the cache memory 60*a* has been updated. If the TDFL stored in the cache memory 60*a* has been updated, the flow of the processing goes on to a step F802 at which the TDFL is recorded at the beginning of a free area in the TDMA recorded on the disk 1.

Then, at the next step F803, the TDDS is recorded at the beginning of a free area in the TDMA recorded on the disk 1.

It is to be noted that, when the TDFL and the TDDS are recorded in the TDMA, the space bitmap stored in the cache memory 60*a* may need to be updated to reflect the recording.

At a step F804, the space bitmap stored in the cache memory 60*a* is examined to determine whether or not the bitmap has been updated.

If the space bitmap stored in the cache memory 60*a* has been updated, the flow of the processing goes on to a step F805 at which the space bitmap is transferred from the cache memory 60*a* to the beginning of a free area in the ISA recorded on the disk 1.

As described above, the TDFL and the TDDS are recorded in the TDMA whereas the space bitmap is recorded in the ISA so that alternate-address information and information indicating whether or not data has been recorded in each cluster are reflected in the disk 1.

In addition, the TDFL and the TDDS are updated in the TDMA but, in order to maintain reproduction compatibility with writable disks, information recorded in the TDMA is transferred to the DMA at a finalize time. At that time, the most recent TDFL and the most recent TDDS are recorded in the DMA. However, it is necessary to convert all pieces of alternate-address information ati with status 1 other than 0000 into pieces of alternate-address information ati with status 1 of 0000 by carrying out the processes of the steps F405 to F407 of the flowchart shown in FIG. 25.

9: Effects for the Second TDMA Method

Even by adopting the second TDMA method described above, basically, the same effects as the first TDMA method can be obtained.

In the case of the present embodiment, space bitmaps are stored in the ISA. Since the disk layout is not changed, however, the present embodiment is good from the standpoint of compatibility with existing disks.

In addition, for the ISA used as an area for recording space bitmaps, the spare area full flag is set at 1 so as to prevent another disk drive from using the ISA as an alternate area.

Since no space bitmaps are recorded in the TDMA, the TDMA can be used effectively as an area for updating the TDFL and the TDDS. That is to say, the alternate-address management information can be updated more times to keep up with a larger number of data renewals.

Disks provided by preferred embodiments and disk drives designed for the disks have been described so far. However, the scope of the present invention is not limited to the preferred embodiments. That is to say, a variety of modifications within the range of essentials of the present invention are conceivable.

For example, as a recording medium of the present invention, a recording medium other than the optical-disk medium can be used. Examples of the recording medium other than the optical-disk medium are a magneto-optical disk, a magnetic disk and media based on a semiconductor memory.

As is obvious from the above descriptions, the present invention has the following effects.

In accordance with the present invention, a write-once recording medium can be used virtually as a recording medium allowing data already recorded thereon to be renewed. Thus, a file system such as a FAT file system for a writable recording medium can be used for a write-once recording medium. As a result, the present invention provides an effect that the usefulness of a write-once recording medium can be enhanced considerably. For example, the FAT file system, which is a standard file system for information-processing apparatus such as a personal computer, allows a variety of operating systems (OS) to reproduce data from a writable recording medium and record data onto only a writable recording medium. By virtue of the present invention, however, the FAT file system can also be applied to a write-once recording medium as it is and allows data to be exchanged without being conscious of differences between operating systems. These features are also good from compatibility-maintenance point of view.

In addition, in accordance with the present invention, a write-once recording medium can be used as a writable recording medium as long as an alternate area and an area for updating alternate-address management information remain in the write-once recording medium. Thus, the write-once recording medium can be used effectively. As a result, the present invention provides an effect that resource wasting can be reduced.

On top of that, a space bitmap can be referred to as information indicating whether or not data has been recorded in any cluster, which is used as a data unit, on the recording medium. In general, a host computer or the like makes a request to record data at an address specified in the request as an address in a recording medium mounted on a recording apparatus or a request to reproduce data from an address specified in the request as an address in a recording medium mounted on a reproduction apparatus, and such requests are a heavy processing load that must be borne by the recording and reproduction apparatus. By referring to such a space bitmap, however, it is possible to determine whether or not data has already been recorded at an address specified for example in a write request. If data has already been recorded at the specified address, an error report can be returned to the host computer without actually making an access to the recording medium. As an alternative, the data can be renewed by carrying out an alternate-address process. In particular, it is also possible to determine whether or not the function to renew data is effective (enabled) without actually making an access to the recording medium.

In addition, by referring to such a space bitmap, it is possible to determine whether or not data has already been recorded at an address specified for example in a read request. If no data has already been recorded at the specified address, an error report can be returned to the host computer without actually making an access to the recording medium.

That is to say, it is possible to reduce a processing load borne by the recording and reproduction apparatus in respectively recording and reproducing data onto and from the recording medium by making random accesses to the recording medium.

In addition, by using the information indicating whether or not data has been recorded in any cluster, recording states of alternate areas can be managed. Thus, it is possible to acquire an alternate destination address, which is to be used in an alternate-address process carried out due to the existence of a defect or carried out to renew data, without actually making an access to the recording medium.

On top of that, management/control areas such as the lead-in and lead-out areas can also be managed by using the information indicating whether or not data has been recorded in any cluster. Thus, the information indicating whether or not data has been recorded in any cluster is suitable for typically a process to grasp the used range of the OPC for adjusting a laser power or the like. That is to say, when the OPC is searched for a trial-write area for adjusting a laser power, it is not necessary to actually make an access to the recording medium and it is also possible to avoid incorrect detection as to whether or not data has been recorded in a cluster.

In addition, if the information indicating whether or not data has been recorded in any cluster reveals that an area used as a target of a write operation is defective due to an injury and data has been recorded in areas surrounding the target area, it is possible to eliminate a process for recording data at an address in the defective target area as a process that would otherwise take long time to carry out. On top of that, by combining this function with a function to renew data, it is possible to carry out a write process, which appears to the host as a process involving no write error.

In addition, in a process to update alternate-address management information, alternate-address management information is additionally recorded in the second alternate-address management information area of the recording medium, and information indicating effective alternate-address management information is also recorded. In this way, effective alternate-address management information in the second alternate-address management information area can be identified. That is to say, a recording or reproduction apparatus is capable of correctly grasping the updating state of the alternate-address management information at every point of time.

On top of that, in accordance with a data-writing process, a space bitmap serving as written/unwritten state indication information is also additionally recorded in the second alternate-address management information area of the recording medium and information indicating effective written/unwritten state indication information is recorded as well. Thus, effective written/unwritten state indication information can be identified correctly.

In addition, in this case, the written/unwritten state indication information is not recorded in a main data area. Thus, an alternate-address process effectively using an alternate-address area in the main data area can be carried out, and an operation to make an access to the data recorded by carrying out the alternate-address process can be made more efficient.

If the space bitmap serving as the written/unwritten state indication information is recorded in the main data area, on the other hand, the second alternate-address management information area can be utilized effectively as an area for updating alternate-address management information. That is to say, the number of times alternate-address management information is updated can be increased so that data can be renewed more times.

If the written/unwritten state indication information is recorded in a portion (such as the ISA) of an alternate-address area in the main data area, information is recorded as information indicating that the portion of the alternate-address area cannot be used for an alternate-address process. Thus, another recording/reproduction apparatus can be prevented from using the portion of the alternate-address area. As a result, an incorrect operation can be avoided. In addition, in the case of the recording apparatus provided by the present invention, if information exists as information indicating that the portion of the alternate-address area cannot be used for an alternate-address process, the data recorded in the portion of the alternate-address area is read out to determine whether or not data can be renewed. Thus, an incorrect operation can be avoided. As a result, the present invention provides an effect of maintaining compatibility with another recording/reproduction apparatus.

The invention claimed is:

1. A recording medium provided with a write-once area allowing data to be recorded therein once and comprising a main data area as well as a management/control area for recording management/control information for recording data into said main data area and reproducing data from said main data area wherein:

said main data area comprises a regular recording/reproduction area which data is recorded into and reproduced from as well as an alternate area for recording data due to a defect existing in said regular recording/reproduction area or for recording data in a process to renew data;

said management/control area comprises a first alternate-address management information area for recording first alternate-address management information for managing alternate-address processes using said alternate area and a second alternate-address management information area for recording said alternate-address management information in an updateable state; and said main data area or said management/control area is used for recording written/unwritten state indication information for each data unit of said main data area and each data unit of said management/control area as information indicating whether or not data has been written into said data unit.

2. The recording medium according to claim 1 wherein, in accordance with said alternate-address process, alternate-address management information is additionally recorded in said second alternate-address management information area and information indicating effective alternate-address management information is also recorded.

3. The recording medium according to claim 1 wherein, in accordance with a data-writing process, said written/unwritten state indication information is additionally recorded in said second alternate-address management information area and information indicating effective alternate-address management information is also recorded.

4. The recording medium according to claim 1 wherein a written/unwritten state indication information area for recording said written/unwritten state indication information is provided in said main data area, in accordance with a data-writing process, said written/unwritten state indication information is additionally recorded in said written/unwritten state indication information area and last written/unwritten state indication information in said written/unwritten state indication information area is made effective.

5. The recording medium according to claim 4 wherein a portion in an alternate area of said main data area is used as said written/unwritten state indication information area, and information is recorded to indicate that said portion of said alternate area is used as said written/unwritten state indication information area and, hence, cannot serve as an area used for said alternate-address process.

6. A recording apparatus provided for a recording medium provided with a write-once area allowing data to be recorded therein once and comprising a main data area as well as a management/control area for recording management/control information for recording data into said main data area and reproducing data from said main data area wherein:
said main data area comprises a regular recording/reproduction area which data is recorded into and reproduced from as well as an alternate area for recording data due to a defect existing in said regular recording/reproduction area or for recording data in a process to renew data;
said management/control area comprises a first alternate-address management information area for recording first alternate-address management information for managing alternate-address process using said alternate area and a second alternate-address management information area for recording said alternate-address management information in an updateable state; and
said main data area or said management/control area is used for recording written/unwritten state indication information for each data unit of said main data area and each data unit of said management/control area as information indicating whether or not data has been written into said data unit,
said recording apparatus comprising:
write means for writing data onto said recording medium;
confirmation means for determining whether or not data has been recorded at an address related to a data-writing request to write data in said main data area on the basis of said written/unwritten state indication information;
determination means for determining whether or not an alternate-address process using said alternate area as well as said second alternate-address management information area can be carried out; and
write control means for controlling said write means to write data at said address related to said data-writing request and updating said written/unwritten state indication information if said confirmation means determines that data has not been recorded at said address related to said data-writing request but controlling said write means to write data related to said data-writing request in said alternate area as well as updating said alternate-address management information and said written/unwritten state indication information if said confirmation means determines that data has been recorded at said address related to said data-writing request whereas said determination means determines that said alternate-address process can be carried out.

7. The recording apparatus according to claim 6 wherein said write control means updates said alternate-address management information by additionally recording alternate-address management information in said second alternate-address management information area of said recording medium and recording information indicating effective alternate-address management information.

8. The recording apparatus according to claim 6 wherein said write control means updates said written/unwritten state indication information by additionally recording said written/unwritten state indication information in said second alternate-address management information area of said recording medium and recording information indicating effective written/unwritten state indication information.

9. The recording apparatus according to claim 6 wherein said write control means updates said written/unwritten state indication information by additionally recording written/unwritten state indication information in said main data area of said recording medium.

10. The recording apparatus according to claim 9, said apparatus further comprising set means for setting an indicator as to whether or not data can be renewed on the basis of information recorded on said recording medium as information indicating that said portion of said alternate area in said main data area of said recording medium is used as said written/unwritten state indication information area and, hence, cannot serve as an area used for said alternate-address process and on the basis of the substance of data recorded in said portion existing in said alternate area as said written/unwritten state indication information area in a configuration wherein said write control means uses said portion of said alternate area as said written/unwritten state indication information area and additionally records said written/unwritten state indication information in said written/unwritten state indication information area.

11. A reproduction apparatus provided for a recording medium provided with a write-once area allowing data to be recorded therein once and comprising a main data area as well as a management/control area for recording management/control information for recording data into said main data area and reproducing data from said main data area wherein:
said main data area comprises a regular recording/reproduction area which data is recorded into and reproduced from as well as an alternate area for recording data due to a defect existing in said regular recording/reproduction area or for recording data in a process to renew data;
said management/control area comprises a first alternate-address management information area for recording first alternate-address management information for managing alternate-address process using said alternate area and a second alternate-address management information area for recording said alternate-address management information in an updateable state; and
said main data area or said management/control area is used for recording written/unwritten state indication information for each data unit of said main data area and each data unit of said management/control area as information indicating whether or not data has been written into said data unit,
said reproduction apparatus comprising:
read means for reading out data from said recording medium;
first confirmation means for determining whether or not data has been recorded at an address related to a read request to read out data from said main data area on the basis of said written/unwritten state indication information;
second confirmation means for determining whether or not said address related to said read request to read out data from said main data area is an address completing an alternate-address process on the basis of said alternate-address management information; and read control means for controlling said read means to read out data from said address related to said read request if said first confirmation means determines that data has been recorded at said address related to said read request and said second confirmation means determines that said address related to said read request is not an address completing an alternate-address process, but controlling said read means to read out data related to said read request from said alternate area on the basis of said alternate-address management information if said first confirmation means determines that data has been recorded at said address related to said read request and said second confirmation means determines that said address related to said read request is an address completing an alternate-address process.

12. A recording method provided for a recording medium provided with a write-once area allowing data to be recorded therein once and comprising a main data area as well as a management/control area for recording management/control information for recording data into said main data area and reproducing data from said main data area wherein:

said main data area comprises a regular recording/reproduction area which data is recorded into and reproduced from as well as an alternate area for recording data due to a defect existing in said regular recording/reproduction area or for recording data in a process to renew data;

said management/control area comprises a first alternate-address management information area for recording first alternate-address management information for managing alternate-address process using said alternate area and a second alternate-address management information area for recording said alternate-address management information in an updateable state; and said main data area or said management/control area is used for recording written/unwritten state indication information for each data unit of said main data area and each data unit of said management/control area as information indicating whether or not data has been written into said data unit, said recording method comprising:

a confirmation step of determining whether or not data has been recorded at an address related to a data-writing request to write data in said main data area on the basis of said written/unwritten state indication information;

a determination step of determining whether or not an alternate-address process using said alternate area and said second alternate-address management information area can be carried out;

a first write step of writing data at said address related to said data-writing request and updating said written/unwritten state indication information if a determination result obtained at said confirmation step indicates that data has not been recorded at said address related to said data-writing request; and a second write step of writing data related to said data-writing request in said alternate area as well as updating said alternate-address management information and said written/unwritten state indication information if a determination result obtained at said confirmation step indicates that data has been recorded at said address related to said data-writing request whereas a determination result obtained at said determination step indicates that said alternate-address process can be carried out.

13. A reproduction method provided for a recording medium provided with a write-once area allowing data to be recorded therein once and comprising a main data area as well as a management/control area for recording management/control information for recording data into said main data area and reproducing data from said main data area wherein:

said main data area comprises a regular recording/reproduction area which data is recorded into and reproduced from as well as an alternate area for recording data due to a defect existing in said regular recording/reproduction area or for recording data in a process to renew data;

said management/control area comprises a first alternate-address management information area for recording first alternate-address management information for managing alternate-address process using said alternate area and a second alternate-address management information area for recording said alternate-address management information in an updateable state; and said main data area or said management/control area is used for recording written/unwritten state indication information for each data unit of said main data area and each data unit of said management/control area as information indicating whether or not data has been written into said data unit, said reproduction method comprising:

a first confirmation step of determining whether or not data has been recorded at an address related to a read request to read out data from said main data area on the basis of said written/unwritten state indication information;

a second confirmation step of determining whether or not said address related to said read request to read out data from said main data area is an address completing an alternate-address process on the basis of said alternate-address management information;

a first read step of reading out data from said address related to said read request if a determination result obtained at said first confirmation step indicates that data has been recorded at said address related to said read request and a determination result obtained at said second confirmation step indicates that said address related to said read request is not an address completing an alternate-address process; and a second read step of reading out data related to said read request from said alternate area on the basis of said alternate-address management information if a determination result obtained at said first confirmation step indicates that data has been recorded at said address related to said read request and a determination result obtained at said second confirmation step indicates that said address related to said read request is an address completing an alternate-address process.

* * * * *